United States Patent [19]

Nakanishi et al.

[11] Patent Number: 5,421,915
[45] Date of Patent: Jun. 6, 1995

[54] METHOD FOR PREPARING SAME AND MAGNETIC HEAD

[75] Inventors: Kanji Nakanishi, Hadano; Osamu Shimizu, Minami-ashigara; Satoshi Yoshida, Hachioji; Masaaki Katayama, Odawara; Tatsuya Isomura, Minami-ashigara, all of Japan

[73] Assignee: Fuji Photo Film Co., Ltd., Japan

[21] Appl. No.: 878,624

[22] Filed: May 5, 1992

Related U.S. Application Data

[60] Continuation-in-part of Ser. No. 707,359, May 29, 1991, abandoned, which is a division of Ser. No. 470,662, Jan. 26, 1990, Pat. No. 5,117,321.

[30] Foreign Application Priority Data

| Jan. 26, 1989 | [JP] | Japan | 1-15112 |
| Feb. 8, 1989 | [JP] | Japan | 1-27518 |
| Feb. 15, 1989 | [JP] | Japan | 1-33726 |
| Aug. 9, 1989 | [JP] | Japan | 1-204586 |
| Nov. 27, 1989 | [JP] | Japan | 1-304811 |
| Dec. 1, 1989 | [JP] | Japan | 10310607 |
| Dec. 6, 1989 | [JP] | Japan | 1-315361 |
| Jan. 17, 1990 | [JP] | Japan | 2-006242 |
| May 15, 1991 | [JP] | Japan | 3-138561 |
| Jul. 19, 1991 | [JP] | Japan | 3-203696 |

[51] Int. Cl.⁶ .................................................. H01F 1/147
[52] U.S. Cl. .................................... 148/304; 148/306
[58] Field of Search ............. 148/304, 306, 310, 311

[56] References Cited

U.S. PATENT DOCUMENTS

| 4,772,976 | 9/1988 | Otomo | 360/125 |
| 4,836,865 | 6/1989 | Sakakima et al. | 148/306 |
| 4,969,962 | 11/1990 | Watanabe et al. | 148/306 |
| 5,084,795 | 1/1992 | Sakakima et al. | 148/311 |
| 5,262,248 | 11/1993 | Ihara et al. | 148/306 |

FOREIGN PATENT DOCUMENTS

| 0150049 | 7/1985 | European Pat. Off. |
| 430504 | 6/1991 | European Pat. Off. | 148/306 |
| 3707522 | 9/1987 | Germany |
| 63-236304 | 10/1988 | Japan |
| 63-299219 | 12/1988 | Japan |

OTHER PUBLICATIONS

Carey, R. et al., *Magnetic Domains and Techniques for Their Observation* Academic Press, 1966, pp. 150–153 and 160–163.

Thermal Stability of Compositionally Modulated Amorphous Nitride Alloy Films, Sakakima et al, The Journal of the Magnetics Society of Japan, vol. 12, No. 2, (1988), pp. 299–304.

Magnetics Properties of Amorphous Films Prepared by $N_2$ Reactive Sputtering, Sakakima et al, IECE Technical Report MR 86-4, No. 27, pp. 25–32 (IECE: Institute of Electronics & Communication Engineers of Japan).

*Primary Examiner*—George Wyszomierski
*Attorney, Agent, or Firm*—Sughrue, Mion, Zinn, Macpeak & Seas; Richard C. Turner

[57] ABSTRACT

A soft magnetic thin micro-crystalline film of $FeT_bN_c$ (at %) wherein T is at least one of Zr, Hf, Ti, Nb, Ta, V, Mo and W, and $0<b\leqq20$ and $0<c\leqq22$ except the range of $b\leqq7.5$ and $c\leqq5$, exhibits low coercivity Hc of 80–400 $Am^{-1}$ (1–5 Oe) which is stable upon heating at elevated temperature for glass bonding.

This film is produced by crystallizing an amorphous alloy film of the similar composition at 350°–650° C. to a crystal grain size up to 30 nm to provide uniaxial anisotropy and increased magnetic permeability at higher frequency. It can also provide low magnetostriction around $\lambda s=0$.

Composite magnetic head is made using this thin film. Diffusion preventive $SiO_2$ layer disposed between ferrite core and this thin film in the magnetic head prevents an interdiffusion layer and suppress beat in the output signal.

13 Claims, 32 Drawing Sheets

AS DEPO $1 Oe = 79.6 Am^{-1}$ 10 kG
5 Oe

HEAT TREATED AT 350°C

EASY DIRECTION 10 kG
5 Oe

HARD DIRECTION

HEAT TREATED AT 550°C 10 kG
5 Oe

Fe91.2 Zr 3.9 N 4.9

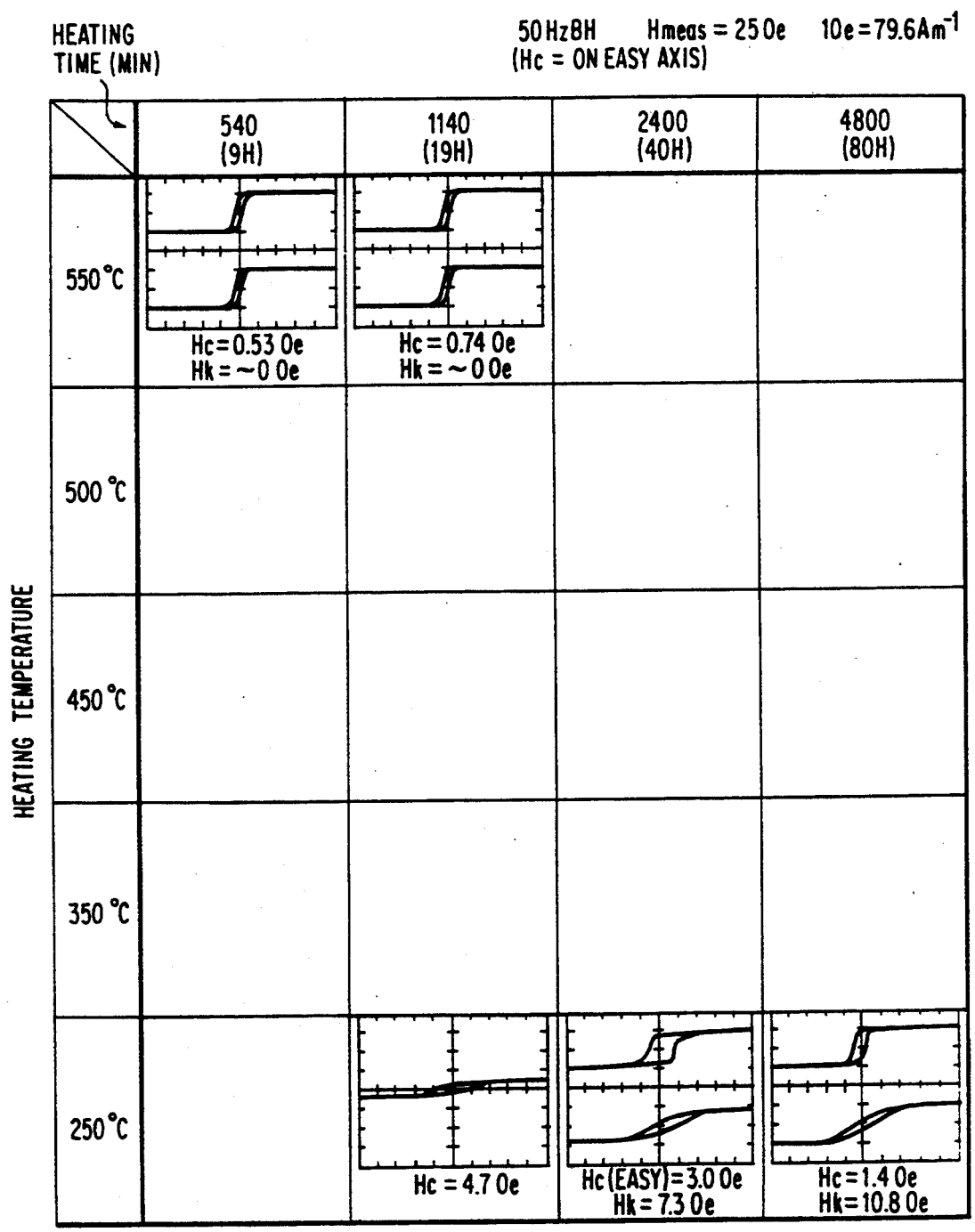

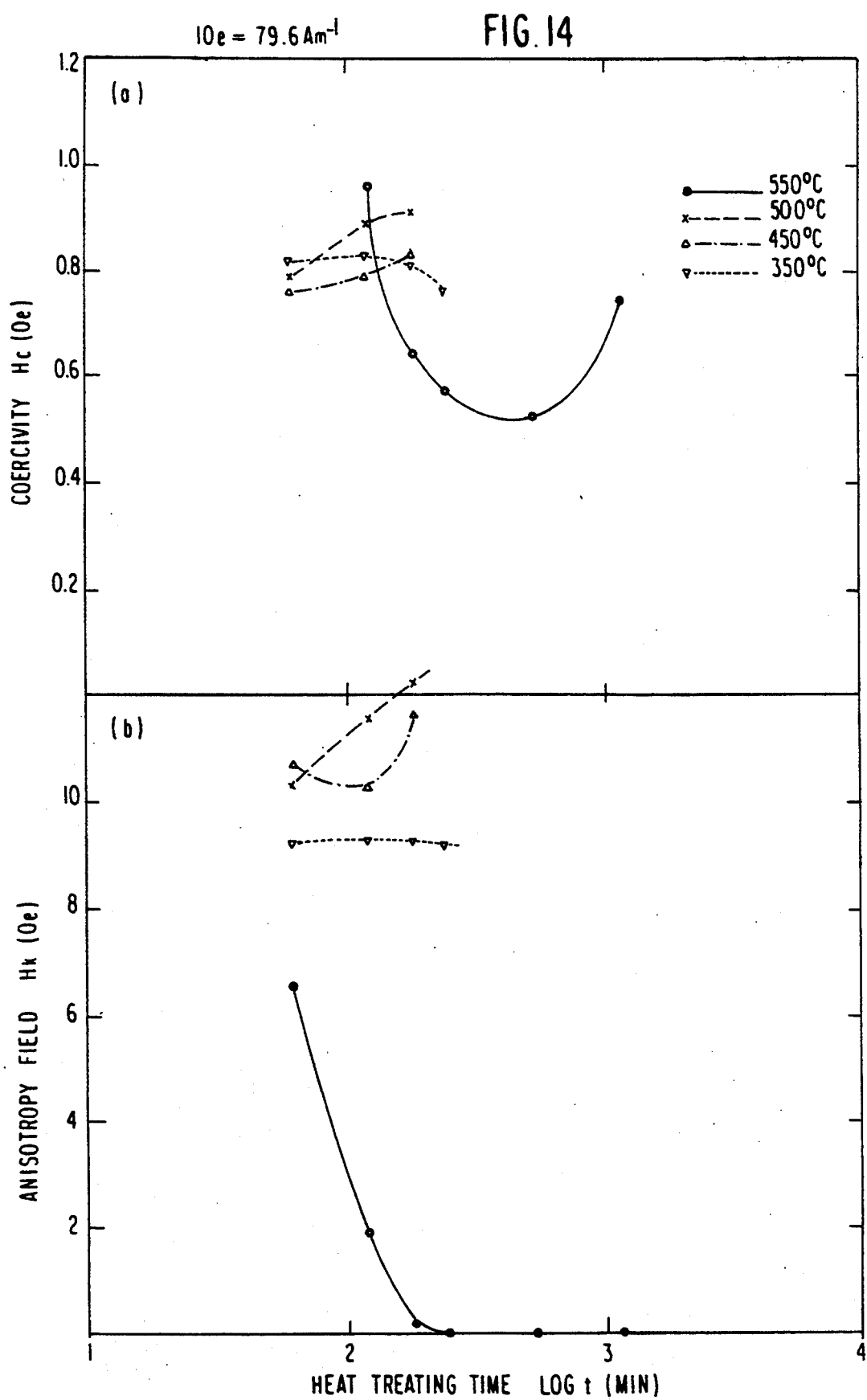

FIG. 21A
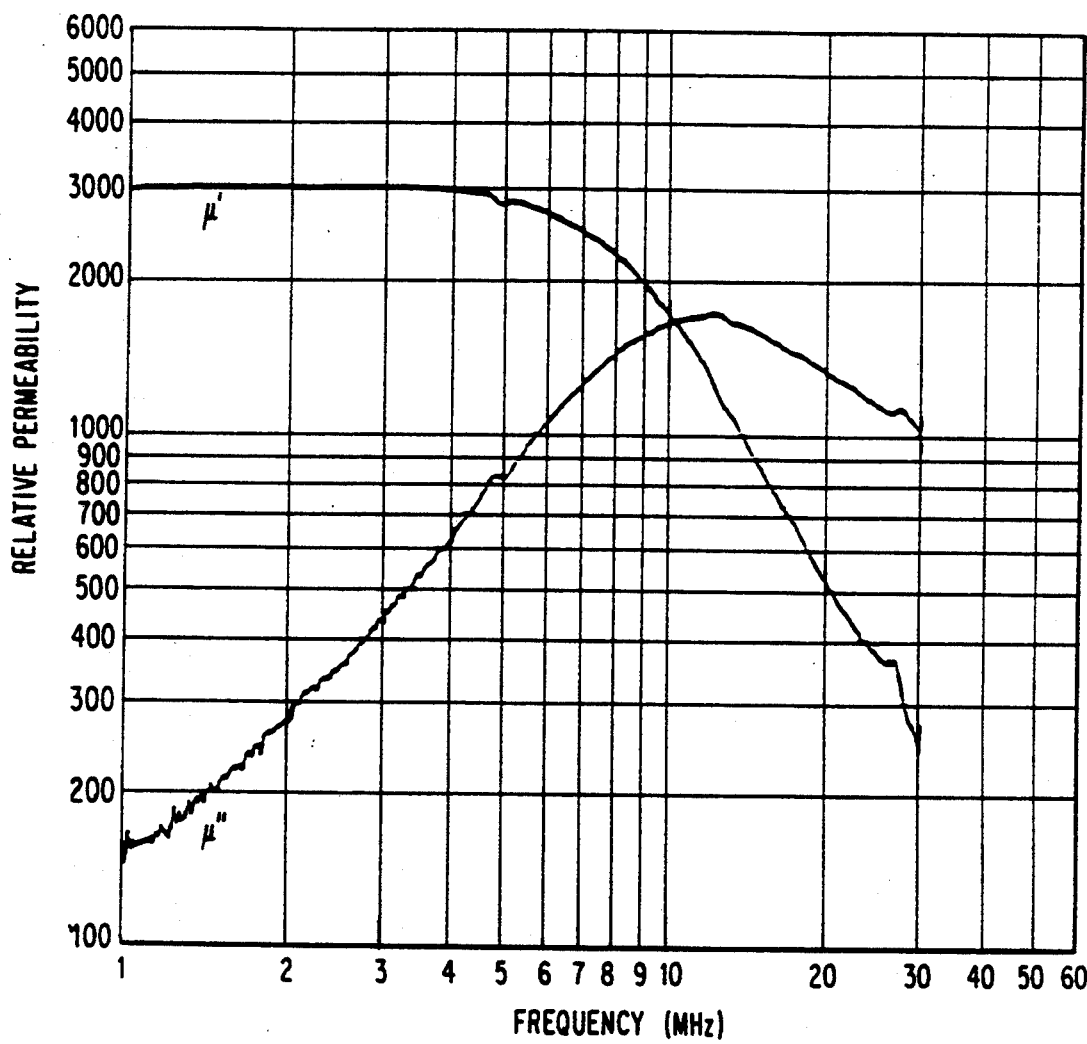
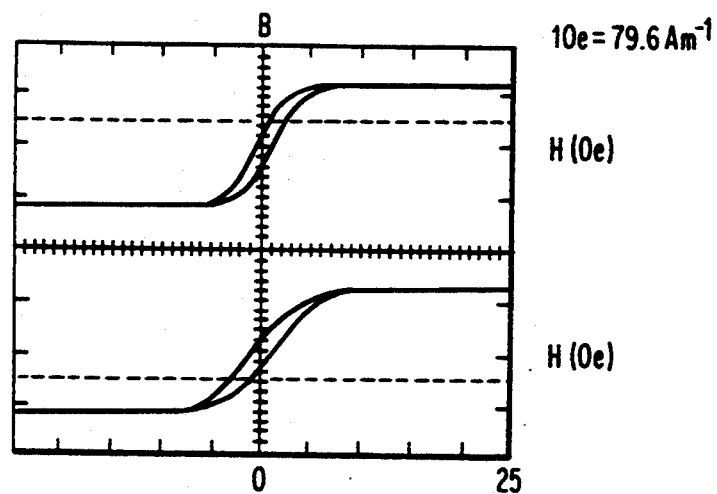
FIG. 21B
10e = 79.6 Am⁻¹

METHOD FOR PREPARING SAME AND MAGNETIC HEAD

This application is a continuation in-part of Ser. No. 707,359, filed May 29, 1991, now abandoned, which is a divisional of Ser. No. 470,662, entitled SOFT MAGNETIC THIN FILM, METHOD FOR PREPARING SAME AND MAGNETIC HEAD filed on Jan. 26, 1990, now U.S. Pat. No. 5,117,321.

FIELD OF THE INVENTION

This invention relates to a soft magnetic thin film having high saturation magnetic flux density and magnetic permeability at higher frequencies and advantageously employed, e.g., as a core material for a magnetic head adapted for high density recording and/or reproduction, a method for producing the same, and a magnetic head for high density recording and/or reproduction wherein use is made of soft magnetic layers exhibiting a high saturation magnetic flux density and a high frequency magnetic permeability as the core material for the magnetic head.

The present invention further relates to a magnetic head for high density recording and/or reproduction having a diffusion inhibiting layer between a ferrite core and a particular soft magnetic layer.

BACKGROUND OF THE INVENTION

In the field of magnetic recording and/or reproducing apparatus, such as audio tape recorder or a video tape recorder (VTR), for example, the general tendency is towards a higher recording density and a higher quality of recording signals. In keeping with this tendency towards the higher recording density, a so-called metal tape in which powders of metals such as Fe; Co or Ni, or alloys thereof, are used as the magnetic powders, or a so-called vacuum-deposited tape in which, a magnetic metal material is directly deposited on a base film by the thin film forming vacuum technique, has been developed and put to practical use in many technical fields.

Prior Art and Problem To Be Solved

Meanwhile, if the characteristics of the magnetic recording medium having a predetermined coercive force is to be displayed fully, it is required of the core material for the magnetic head to exhibit a higher saturation magnetic flux density as its magnetic properties or characteristics. In addition, if reproduction is to be achieved with the same magnetic head as that used for recording, it is also required of the core material to exhibit a higher magnetic permeability.

Although the Sendust alloy (Fe—Si—Al, Bs about equal to 10 KG) or a Co-base amorphous alloy has so far been used, it is difficult with the Sendust alloy to increase the film thickness because of the larger inner stress imposed on the film and the difficulty in making a thick film due to the susceptibility of the film to growth of the crystal grains. Also the Sendust alloy has the saturation magnetic flux density Bs of about 10 KG, which however falls short in view of the tendency towards an increasing higher recording density. On the other hand, while the Co-base amorphous alloy has satisfactory magnetic properties and may be fabricated with a high saturation magnetic flux density Bs, it has a drawback that, since it is crystallized at 450° C. or thereabouts, it cannot be glass bonded at elevated temperatures for preparing the magnetic head, such that it is not possible to develop a high enough bonding strength.

Among other soft magnetic materials is iron nitride, which is usually formed into a thin film by ion beam vacuum deposition or sputtering in a nitrogen-containing atomosphere, using iron as the target. However, the soft magnetic thin film of iron nitride has a drawback that the coercive force is markedly increased due to heating upon glass bonding and the magnetic properties thereof are inferior in stability.

In the JP Patent KOKAI 63-299219 (1988), there is disclosed a soft magnetic thin film which is aimed at obtaining the above mentioned drawback and which is represented by the formula $Fe_xN_yA_z$ wherein x, y and z each denote the compositional ratios in atomic percent and A denotes at least one of Si, Al, Ta, B, Mg, Ca, Sr, Ba, Cr, Mn, Zr, Nb, Ti, Mo, V, W, Hf, Ga, Ge and rare earth elements, and wherein the compositional ratios are such that $0.5 \leq y \leq 5.0$ $0.5 \leq z \leq 7.5$ and $x + y + z = 100$.

However, it is not preferred to use the soft magnetic thin film described in the JP Patent KOKAI 63-299219 (1988) in preparing a magnetic head by a process including the heating step, such as a glass bonding step, because its coercive force is inevitably increased on heating.

The above film has also a drawback that, because it does not assure uniaxial anisotropy, its magnetic permeability cannot be increased at higher frequencies.

Also, the crystal materials in general tend to be turned into columnar crystals, during the film depositing process, due to the self-shadowing effect, depending on the film forming conditions, so that voids tend to be formed in the grain boundary region resulting in magnetic discontinuity and inferior soft magnetic properties. These self-shadowing effect becomes particularly outstanding when there is a step-like surface irregularity on the underlayer or substrate as in the case of preparation of the magnetic head, or when a thicker film is to be produced, so that sufficient magnetic properties cannot be obtained.

The soft magnetic thin film disclosed in the above prior art publication is not desirable as the magnetic head core material in view of the above mentioned drawbacks.

It is an object of the present invention to provide a novel soft magnetic thin film, a novel method for preparing a soft magnetic thin film and a novel magnetic head, which are free from the above-mentioned problems of the conventional art.

According to the present invention, the above object may be accomplished by a soft magnetic film, a method for producing the soft magnetic film and a magnetic head, which may be summarized in the following manner.

First Aspect

There is provided a soft magnetic thin film represented by the compositional formula $Fe_aT_bN_c$, wherein the a, b and c each stand for atomic percent and B stands for at least one of Zr, Hf, Ti, Nb, Ta, V, Mo and W, and wherein the composition is in the range of $0 < b \leq 20$ and $0 < c \leq 22$ with the exclusion of the range defined by $b \leq 7.5$ and $c \leq 5$. Such compositional range is defined by a line connecting points E, F, G, H, I and J in FIG. 1 (referred to as "EFGHIJ composition" hereinafter).

As will become clear hereinafter, this soft magnetic thin film has a saturation magnetic flux density markedly higher than that of the Sendust alloy or the amorphous soft magnetic alloys and can provide a preferred embodiment with a zero magnetostriction to enable excellent soft magnetic properties such as the low coercive force and high magnetic permeability.

On the other hand, the soft magnetic thin film of the present Aspect has an electrical resistivity as high as that of Sendust and may be subjected to heat treatment in the magnetic field to develop uniaxial anisotropy, the magnitude of which can be controlled depending on the composition of the thin film and the duration of heat treatment to realize the high magnetic permeability at higher frequencies meeting requirements of the intended use and application. The thin film of the present Aspect has superior thermal resistance against the glass bonding since its characteristics are not deteriorated by heat treatment up to 650° C. The thin film of the present Aspect also has high hardness and corrosion resistance and hence a high abrasion resistance, in the all, turning out to be a highly reliable material.

The soft magnetic thin film of the present invention exhibits satisfactory step coverage in film formation since the film material can be formed as an amorphous alloy for preparing a film and can be subsequently heat-treated so as to be turned into a microcrystalline state. In addition, a mirror surface can be easily developed, while the crystal grains can be inhibited from coarsening (excessive grain growth) without the necessity of resorting to a multilayered structure so that a film of a larger thickness (thick film) may be produced.

Thus the soft magnetic thin film of the present Aspect may be employed as the core material for a magnetic head to cope with the high coercivity magnetic recording medium to realize high quality and bandwidth as well as high recording density.

Second Aspect (i) There is provided

A soft magnetic thin film represented by the compositional formula $Fe_{a-m}M_mT_bN_c$, wherein a, b, c and m stand for atomic percent, M stands for at least one selected of Co, Ru and Cr and T stands for at least one selected from the group consisting of Zr, Hf, Ti, Nb, Ta, Mo and W, and wherein the composition is in the range of $0 < m/a < 0.1$, $0 < b \leq 20$ and $0 < c \leq 22$ with the exclusion of the range defined by $b \leq 7.5$ and $c \leq 5$.

(ii) There is further provided

A soft magnetic thin film represented by the compositional formula $Fe_{a-m}M_mT_bN_c$, wherein a, b, c and m stand for atomic percent, M stands for at least one of Co, Ru, Cr, V, Ni, Mn, Pd, Ir and Pt and T stands for at least one selected from the group consisting of Zr, Hf, Ti, Nb, Ta, Mo and W, and wherein the composition is in the range of $0 < m/a < 0.3$, $0 < b \leq 20$ and $0 < c \leq 22$ with the exclusion of the range defined by $b \leq 7.5$ and $c \leq 5$.

These compositional ranges are shown by points E, F, G, H, I and J in FIG. 27.

In the above compositional range (ii), it is preferred that $0 < m/a < 0.2$.

In the above compositional formula, $a+b+c=100$ (at %).

The present application filed a patent application (JP Patent Application Hei-1(1990)-304811) on the following soft-magnetic thin film for overcoming the above-mentioned problems of the prior art.

"A soft magnetic thin film represented by the compositional formula $Fe_aT_bN_c$, wherein a, b and c stand for atomic percent and T stands for at least one selected from the group consisting of Zr, Hf, Ti, Nb, Ta, V, Mo and W and wherein the composition is in the range of $0 < b \leq 20$ and $0 < c \leq 22$ with the exclusion of the range defined by $b \leq 7.5$ and $c \leq 5$."

On the other hand, the following merits are derived with the soft magnetic thin film of the present invention in which part of Fe is replaced with the above mentioned particular quantity of the element M. The magnetostriction can be changed in the positive direction in the conformity to the amount of the element M or adjusted to a value (absolute value) close to zero. The saturation magnetic flux density Bs can be increased further (above all, when M is Co). Even if the magnetostriction is small, the anisotropic magnetic field may be several Oe (at least up to about 2 Oe) so that high magnetic permeability may be obtained when the film is used at a higher frequency (above all, when M is Co). Corrosion resistance may be increased further (above all, when M is at least one or more of Cr, Co, Ni, Pd, Ir, Pt and Ru). The electric resistivity may be increased so that eddy current losses may be reduced and high magnitude permeability may be obtained even with the use of a higher frequency (above all, when M is at least one or more of V, Cr, and Mn).

Third Aspect (i) There is provided

A soft magnetic thin film represented by the compositional formula $Fe_{a-d-e}X_bN_cRu_dZ_e$, wherein a, b, c, d and e stand for atomic percent, X stands for at least one or more of Zr and Hf and Z stands for at least one or more of Cr, V and Mn, and wherein the composition is in the ranges of $0 < b \leq 20$, $0 < c \leq 22$, $0 < d \leq 10$ and $0 < e \leq 5$, with the exclusion of the ranges defined by $b \leq 7.5$ and $c \leq 5$.

In the above compositional formula, $a+b+c=100$ (at %).

At least one of b, c, d and e preferably is in the ranges and more preferably all of them are in the ranges defined by $2 \leq b \leq 15$, $5 \leq c \leq 27$, $0.1 \leq d \leq 10$ and $0.1 \leq e \leq 5$.

If part of Fe is replaced by Ru, corrosion resistance may be improved further, as discussed above. If part of Fe is to be replaced by Ru up to 10 atomic percent of the thin film in its entirety, it is preferred that part of the remaining Fe is replaced by the above-mentioned element Z, that is, at least one of Cr, V and Mn up to 5 atomic percent of the thin film in its entirety. In this case, even when heat treatment is carried out for an extended period of time (e.g., for about four hours) during and after preparation of the soft magnetic thin film, nitrogen in the thin film is not reduced significantly, while soft magnetic characteristics are not lowered. This is probably due to the fact that the elements Cr, V or Mn exhibit higher affinity with respect to N. It is noted that, if heat treatment is performed for about one hour, significant reduction in nitrogen in the soft magnetic thin film or worsening of the soft magnetic characteristics is not produced.

Fourth Aspect

There is provided a method for producing a soft magnetic thin film comprising the steps:

forming an amorphous alloy film of the EFGHIJ composition represented by the compositional formula $Fe_aT_bN_c$, wherein a, b and c each stand for atomic percent and T stands for at least one of Zr, Hf, Ti, Nb, Ta, V, Mo and W and wherein the composition is in the range of $0 < b \leq 20$ and $0 < c \leq 22$ with the exclusion of the ranges of $b \leq 7.5$ and $c \leq 5$, and crystallizing the resultant amorphous alloy film by heat treatment.

Although the amorphous alloy film of the above composition exhibits satisfactory step coverage when formed on a substrate having step differences, it fails to exhibit satisfactory soft magnetic properties. The present inventors have found that a thin film exhibiting satisfactory soft magnetic may be obtained by crystallizing the amorphous alloy film by heat treatment to a microcrystalline state, and that a soft magnetic thin film exhibiting uniaxial anisotropy may be obtained when the heat treatment is carried out in a magnetic field. These findings have led to completion of the present invention. (Note here, the term "crystallize" denotes to provide a microcrystalline state.)

As will become clear hereinafter, the soft magnetic thin film produced by the method of the present invention has a saturation magnetic flux density markedly higher than that of the Sendust alloy or the amorphous soft magnetic alloy and can provide a preferred embodiment with a zero magnetostriction to realize excellent soft magnetic properties such as the low coercive force and high magnetic permeability.

On the other hand, the soft magnetic thin film of the present invention has an electrical resistivity as high as that of Sendust and may be subjected to heat treatment in the magnetic field to develop uniaxial anisotropy, the magnitude of which can be controlled depending on the composition of the thin film and the duration of heat treatment to realize the high magnetic permeability at higher frequencies meeting requirements of the intended use and application. The thin film of the present invention has superior thermal resistance against the glass bonding since its characteristics are not deteriorated by heat treatment up to 650° C. Thus the resultant thin film of the present Aspect has the same advantages as those mentioned in the first Aspect.

The soft magnetic thin film of the present Aspect exhibits satisfactory step coverage in film formation since the film material can be formed as amorphous alloy for preparing a film and can be subsequently heat-treated so as to be turned into the microcrystalline state. In addition, a mirror surface can be easily developed, while the crystal grains can be inhibited from becoming coarse without the necessity of resorting to a multilayered structure so that a film of a larger thickness may be produced (These advantages are the same as mentioned in the first Aspect).

Thus the soft magnetic thin film produced by the method of the present Aspect may be employed as the core material for a magnetic head to cope with the high coercivity magnetic recording medium to realize high quality and bandwidth as well as high recording density as is the case with the first Aspect.

Fifth Aspect

There is provided a composite magnetic head composing a magnetic head core which includes end faces opposing each other and a recess set back from each of said end faces, and a soft magnetic layer exposed to outside provided on each of said end faces, each of said soft magnetic layers having the EFGHIJ composition $Fe_aT_bN_c$.

Sixth Aspect

There is provided a thin film magnetic head comprising:

a substrate, a lower soft magnetic layer, an insulating layer, a coil conductor layer and an upper soft magnetic layer which are provided in this order on the substrate, and a magnetic gap layer which extends to a surface of the magnetic head directed to the recording medium, and which is provided between the lower soft magnetic layer and the upper soft magnetic layer, wherein each of the soft magnetic layers has the EFGHIJ composition $Fe_aT_bN_c$.

As will become clear hereinafter, the soft magnetic thin film of the magnetic head according to the present Aspect has a saturation magnetic flux density markedly higher than that of the Sendust alloy or the amorphous soft magnetic alloy and can provide a preferred embodiment of a zero magnetostriction, to realize excellent soft magnetic properties such as the low coercive force and high magnetic permeability.

This soft magnetic thin film has the same advantageous properties as mentioned in the previous Aspects.

Thus the magnetic head of the present Aspect may be employed as a magnetic head to cope with the high coercivity magnetic recording medium to realize high quality and bandwidth as well as high recording density.

Seventh Aspect

There is provided a composite magnetic head comprising:

a ferrite core including end faces opposing each other, a recess receded from each of said end faces, soft magnetic layers provided between said end faces of said ferrite core and defining a gap, and a diffusion preventing layer formed of $SiO_2$ and provided at an interface between said core and the soft magnetic layer, wherein each of said soft magnetic layers has the EFGHIJ composition $Fe_aT_bN_c$, particularly B is Zr (i.e., $Fe_aZr_bN_c$).

Eighth Aspect

There is provided a thin film magnetic head comprising:

a ferrite core including end faces opposing each other, a recess receded from each of said end faces, soft magnetic layers provided between said end faces of said ferrite core and defining a gap, and a diffusion preventing layer formed of SiO$_2$ and provided at an interface between said cord and the soft magnetic layer, wherein each of the soft magnetic layers is represented by the formula Fe$_a$X$_b$N$_c$, where a, b and c each denote the compositional ratios in atomic percent, and X denotes at least one of Hf, Ti, Nb, Ta, V, Mo and W and the composition range is such that $$0<b\leqq20 \text{ and}$$

$$0<c\leqq22$$

with the exclusion of the case in which b≦7.5 and c≦5. (This composition is the case where T=X in the EFG-HIJ composition Fe$_a$T$_b$N$_c$.)

The composite magnetic head having the diffusion preventing layer according to the 5th and 6th Aspects includes a ferrite core having each other opposing end faces and recesses receded from these end faces, soft magnetic layers of the above mentioned specified compositions which are provided between the opposing end faces of the core for defining a gap, and an diffusion preventive SiO$_2$ layer provided at the interface between the core and the soft magnetic layer, so that it becomes possible to prevent the formation and growth of a diffusion layer with deteriorated magnetic properties between the ferrite core and the soft magnetic layers of the above mentioned specified compositions. Thus it is possible with the composite magnetic head of the present invention to suppress periodic fluctuations (so called beat) of the frequency characteristics of the reproduced signal during reproduction to 1 dB or less. It is also possible to make use of the soft magnetic thin film of the above mentioned specified composition, which is freed of the inconveniences of the prior art soft magnetic thin film, as one of the constituent material of the composite magnetic head.

The present inventors arrived at a soft magnetic thin film which is freed of the previously mentioned disadvantages of the prior art soft magnetic thin film, and which is represented by the compositional formula Fe$_a$Zr$_b$N$_c$ or Fe$_a$X$_b$N$_c$, wherein a, b and c each denote atomic percent and X denotes at least one of Hf, Ti, Nb, Ta, V, Mo or W, and the compositional ranges are such that $$0<b\leqq20 \text{ and}$$

$$0<c\leqq22$$

with the exclusion of b≦7.5 and c≦5 (generally, Fe$_a$T$_b$N$_c$ composition).

However, it has been found that a composite magnetic head utilizing the above mentioned soft magnetic thin film suffers from periodic fluctuations (beat) of frequency characteristics of the reproduced signals during reproduction and hence is insufficient as the magnetic head. The term "composite magnetic head" used herein means a magnetic head having a magnetic head core having each other opposing end faces and recesses receded from said end faces, soft magnetic layers exposed to at least said end faces and defining a gap, and glasses filling said recesses. It has also been found that the above mentioned periodic fluctuations are observed when the ferrite is used as the magnetic head core but are not observed when the nonmagnetic material is used as the magnetic head core.

The present inventors have now found following facts:

(i) a diffusion layer with markedly deteriorated magnetic properties is formed at an interface between the ferrite core and the soft magnetic layer of the above mentioned specific composition as a result of inevitable heating at the time of preparing the composite magnetic head, such as during or after formation of the soft magnetic layer of the specified composition on the ferrite core surface:

(ii) this diffusion layer is formed substantially parallel to the gap and hence acts as a pseudo-gap to affect the reproduced output of the head, such as by the above mentioned periodic fluctuations, and (iii) formation of such diffusion layer may be prevented from occurring by providing an SiO$_2$ diffusion preventive layer on the surface of the ferrite core on which the soft magnetic layers of the above mentioned composition are to be formed. These findings have led to completion of the present invention.

Meanwhile, it is described in the JP Patent KOKAI Publication 63-298806 and 1-100714 to provide a thin film of nonmagnetic nitride film or a thin of an oxide of Si or the like, respectively, at the interface between the magnetic metal thin film and the magnetic oxide material constituting the core of the composite magnetic head to suppress reactions between the magnetic oxide material and the magnetic metal thin film to prevent formation of the pseudo-gap.

However, there is no teaching in these KOKAI Publications as to the problem which has been newly found by the present inventors and which occurs when the soft magnetic thin film of the aforementioned composition found by the present inventors is used in the composite magnetic head.

The composite magnetic head of the present Aspect includes a ferrite core having the opposing end faces and the recesses receded from said end faces, soft magnetic layers of the above mentioned composition provided between the opposing end faces of the core for defining the gap, and the diffusion preventive SiO$_2$ layer provided at the interface between the ferrite core and the soft magnetic layer.

It is possible in this manner to prevent the formation and growth of the diffusion layer of deteriorated magnetic properties between the ferrite core and the soft magnetic layer of the above mentioned composition due to heating which inevitably occurs in the course of the preparation of the composite magnetic head of the present invention. In the following, the description will be made on the case where the soft magnetic layer an Fe—Zr—N soft magnetic layer having the above composition, but the same applies for the Fe$_a$T$_b$N$_c$ system.

For example, the Fe—Zr—N soft magnetic layer of the above composition is formed in general by heat-treating a non-soft-magnetic Fe—Zr—N amorphous alloy film at, 550° C. However, when the Fe—Zr—N amorphous alloy film is directly formed on the ferrite core surface and subjected to heat treatment, the Fe—Zr—N amorphous alloy film is changed into the Fe—Zr—N soft magnetic layer of the above composition, while a diffused layer with deteriorated magnetic properties is formed and caused to grow at the interface between the ferrite core and the Fe—Zr—N soft magnetic layer.

In contrast, when preparing the composite magnetic head of the present Aspect, the diffusion preventive SiO$_2$ layers are provided at the interface of the Fe—Z- r—N amorphous alloy film to prevent the formation of the diffusion layer with deteriorated magnetic properties. In producing a ferrite core composite magnetic head, a set of multilayered composite magnetic head halves, in each of which a soft magnetic layer and a gap layer are sequentially formed on the opposing end faces and recesses receded from said end faces, are abutted to each other in a predetermined direction, and fused glass is filled and allowed to cool in the recesses of the ferrite core halves. However, when the Fe—Zr—N soft magnetic layers of the above composition are directly formed on the ferrite core halves to produce the composite magnetic head in accordance with the above mentioned method, the diffused layer with deteriorated magnetic properties is formed and allowed to grow at the interface between the ferrite core half and the Fe—Zr—N soft magnetic layer of the above composition.

In the above mentioned method for preparing the inventive composite magnetic head of the 7th or 8th Aspect, distortion or strain of the multi-layered composite magnetic head halves may be relieved by heating. In preparing the composite magnetic head of the Eighth Aspect, since the diffusion preventive $SiO_2$ layers are provided at the interface between the ferrite core halves of the multi-layered composite magnetic head and the Fe—Zr—N soft magnetic layers of the above composition, distortion or strain of the composite magnetic head halves may be relieved by heating without allowing the formation of the diffusion layer with deteriorated magnetic properties. FIGS. 23 and 24 exhibit the effect of the diffusion preventive. $SiO_2$ layer which will be discussed in detail later.

BRIEF DESCRIPTION OF THE DRAWINGS

FIG. 14 shows the relation between the anisotropic magnetic field Hk and the coercive force Hc of the Fe—Zr—N soft magnetic thin film with respect to the heat-treating time.

FIGS. 19A, 20A and 21A each illustrate frequency characteristics of the magnetic permeability of the soft magnetic thin film according to an embodiment of the present invention.

FIGS. 19B, 20B and 21B each illustrate A. C. B-H curves of a soft magnetic thin film according to an embodiment of the present invention along the axis of easy magnetization (upper portion) and along the axis of difficult magnetization (lower portion), where B is based on an arbitrary unit.

PREFERRED EMBODIMENTS

Soft Magnetic Thin Film and Magnetic Head (I) Preferably, the compositional range $Fe_aT_bN_c$ is such that $$69 \leq a \leq 93,$$

$$2 \leq b \leq 15 \text{ and}$$

$$5.5 \leq c \leq 22.$$

Figure 1:
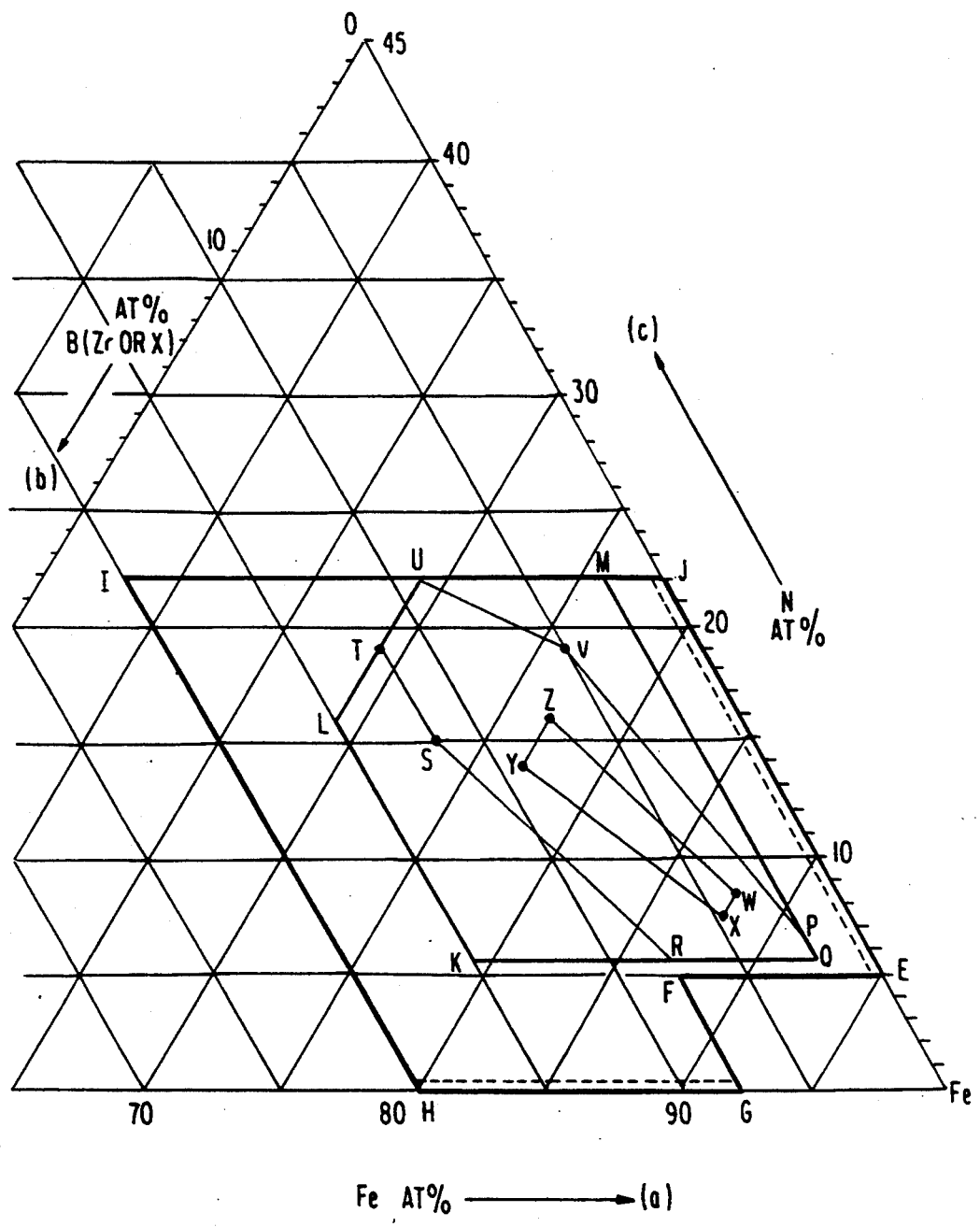
FIG. 1 shows the compositional range of a soft magnetic thin layer, an amorphous alloy film or a soft magnetic layer.

This compositional range is indicated by a line connecting points Q, K, L, U and M in FIG. 1 (referred to as "QKLUM composition").

More preferably, the above compositional range is delimited by line segments interconnecting points:
P(91, 2, 7),
Q(92.5, 2, 5.5),
R(87, 7.5, 5.5),
S(73, 12, 15),
T(69, 12, 19),
U(69, 9, 22) and
V(76, 5, 19).

This compositional range is shown by points P, Q, R, S, T, U and V in FIG. 1 and is referred to as PQRSTUV composition.

Still more preferably, the crystal grain size is 30 nm (300 Å) or less and the soft magnetic thin film or layer exhibits uniaxial anisotropy.

The soft magnetic thin film and the soft magnetic thin layer of the magnetic head of the present invention is composed of Fe, N and a specified additional element or elements T, namely at least one element selected from the group consisting of Zr, Hf, Ti, Nb, Ta, V, Mo and W, with the three components of Fe, N and T (one or more of the specified additional elements) being within the specific compositional ratios of the EFGHIJ composition.

If the compositional ranges are $0 < b \leq 20$ and $0 < c \leq 22$, with the exclusion of the case where $b \leq 7.5$ and $c \leq 5$, then preferably $b \geq 0.5$ and $c \geq 0.5$, because if $b < 0.5$ or $c < 0.5$, the effect due to the presence of the elements concerned may occasionally become unclear.

If the additional element B exceed 20 atomic percent or N exceeds 22 atomic percent, then satisfactory soft magnetism is not displayed.

If the compositional ratio $Fe_aT_bN_c$ is within the QKLUM composition ($69 \leq a \leq 93$, $2 \leq b \leq 15$ and $5.5 \leq c \leq 22$), then a more satisfactory soft magnetism is displayed.

More preferably, the above mentioned composition is within the PQRSTUV composition in a coordinate system for the ternary system composition (Fe, T, N). The composition within this range is suitable to be used as the core material or the like for the magnetic head because then the coercive force is extremely low. The most preferred composition is that for which the coercive force is not higher than 1.5 Oe and particularly not higher than 1.0 Oe.

(II) Preferably, the compositional range of second and third aspects of the present invention ($Fe_{a-m}M_mT_bN_c$ and $Fe_{a-d-e}X_bN_cRu_dZ_e$) is such that $$69 \leq a \leq 93,$$

$$2 \leq b \leq 15 \text{ and}$$

$$5 \leq c \leq 22.$$

Figure 28:
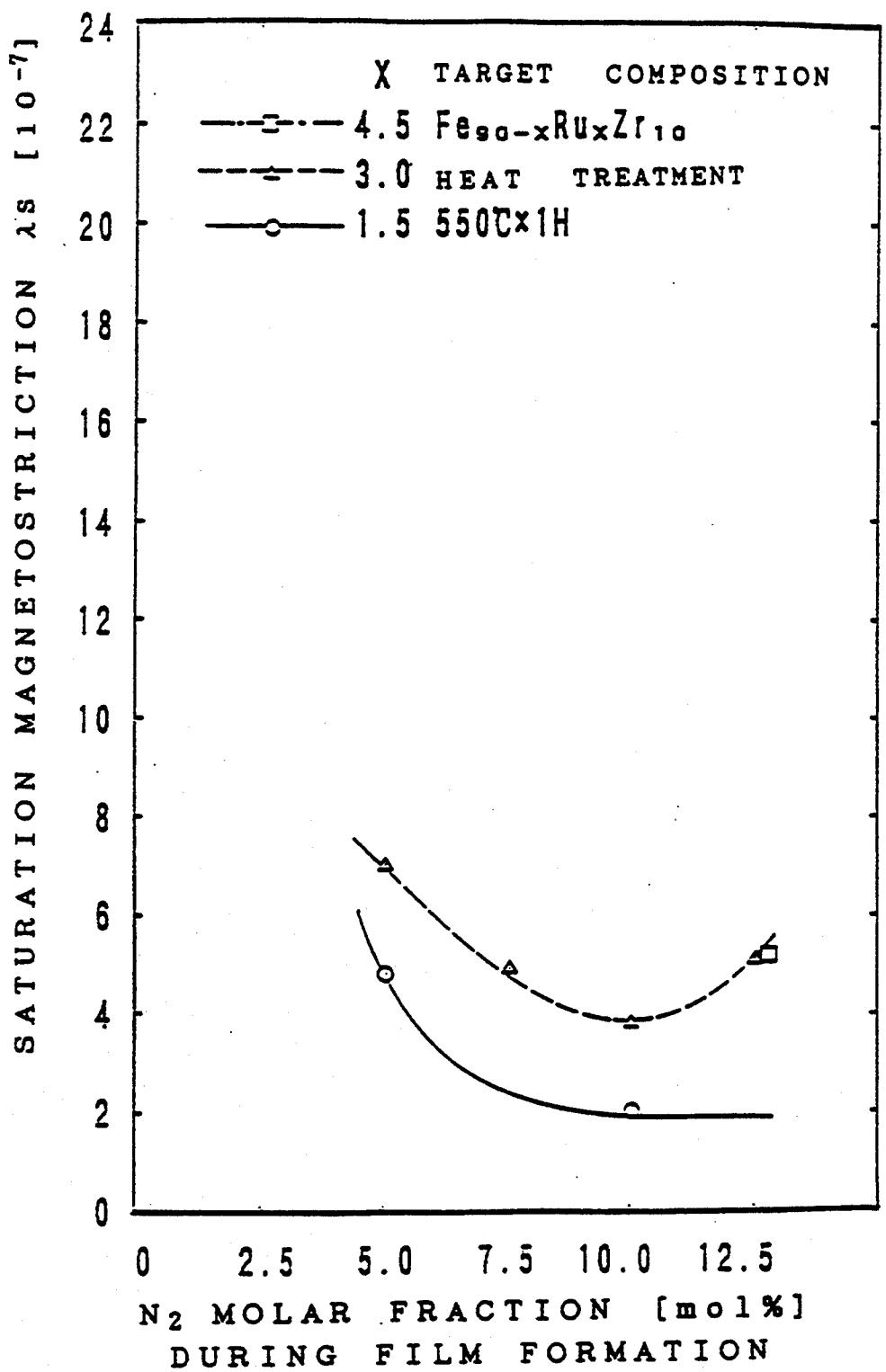
FIG. 28 is a graph showing the relation between the $N_2$ content proportion in the sputtering gas atmosphere during formation of the amorphous thin film and saturation magnetostriction λs of the produced soft magnetic thin film.

This compositional range is indicated by a line connecting points Q, K, L, U and M in FIG. 28 (referred to as "QKLUM composition").

More preferably, the above compositional range is delimited by line segments interconnecting points:
P(91, 2, 7),
Q(93, 2, 5),
R(88, 7, 5),
S(73, 12, 15),
T(69, 12, 19),
U(69, 9, 22) and
V(76, 5, 19).

This compositional range is shown by points P, Q, R, S, T, U and V in FIG. 28 and is referred to as PQRSTUV composition.

The soft magnetic thin film and the soft magnetic thin layer of the magnetic head of the present invention ($Fe_{a-m}M_mT_bN_c$) is composed of Fe, N, specified elements M, that is, at least one element of Co, Ru, Cr, V, Ni, Mn, Pd, Ir and Pt and a specified additional element or elements T, namely at least one element selected from the group consisting of Zr, Hf, Ti, Nb, Ta, V, Mo and W, with the three components of Fe, N, and the specified elements M and T (one or more of the specified additional elements) being within the specific compositional ratios of the above mentioned composition.

If the compositional ranges are $0 < b \leq 20$ and $0 < c \leq 22$, with the exclusion of the case where $b \leq 7.5$ and $c \leq 5$, then preferably $b \geq 0.5$ and $c \geq 0.5$, because if $b < 0.5$ or $c < 0.5$, the effect due to the presence of the elements concerned may occasionally become unclear.

If the additional element T exceeds 20 atomic percent or N exceeds 22 atomic percent, then satisfactory soft magnetism is not displayed.

If the compositional ratio of $Fe_{a-m}M_mT_bN_c$ and $Fe_{a-d-e}X_bN_cR_dZ_e$ is such that $69 \leq a \leq 93$, $2 \leq b \leq 15$ and $5 < c \leq 22$, preferably $5.5 \leq c \leq 22$, then a more satisfactory soft magnetism is displayed.

More preferably, the above mentioned composition is within the PQRSTUV composition in a coordinate system for the pseudo-ternary system composition (Fe+M, B, N) of the four components. The composition within this range is suitable to be used as the core material or the like for the magnetic head because then the coercive force is extremely low. The most preferred composition is that for which the coercive force is not higher than 1.5 Oe and particularly not higher than 1.0 Oe.

If the additional element T is Zr, the desired compositional range of the soft magnetic thin film or soft magnetic thin layer is $$Fe_d(Zr_eN_{1-e})_{100-d}$$

wherein $77 \leq d \leq 88$ and $0.3 \leq e \leq 0.38$. This compositional range is shown in FIG. 1 by points W, X, Y and Z (referred to as "WXYZ composition"). The coordinates for these points may be given substantially by W (88, 3.6, 8.4),
X (88, 4.56, 7.44),
Y (77, 8.74, 14.26) and
Z (77, 6.9, 16.1).

Namely, it is preferred that the amount of Fe is 77 to 88 atomic percent, whereas the ratio of the content c of N in atomic percent to the content b of Zr in atomic percent in the soft magnetic thin film or the soft magnetic thin layer is approximately 1.63 to 2.33. The soft magnetic thin film or layer within this compositional range exhibits satisfactory soft magnetism, for example, the coercive force Hc of less than 5 Oe. (The same applies generally for the case with $Fe_aT_bN_c$.)

The aforementioned additional elements may be one or more, if desired. For example, while only Zr may be added, it is also possible to substitute other element or elements for a part of Zr, for example, 30 atomic percent of Zr in the composition.

Similarly, a part of Fe may be replaced by one or more of elements Co, Ni and Ru. For example, up to about 30 atomic percent of Fe constituting the soft magnetic thin film or layer may be replaced by the above element or elements.

The soft magnetic thin film or soft magnetic thin layer of the magnetic head of the present invention may be formed by producing an amorphous layer of the above mentioned specific composition by vapor phase deposition such as RF sputtering, and heat-treating the amorphous layer at, e.g., 350° to 650° C. to crystallize at least a portion of the amorphous layer. Preferably, the above mentioned amorphous layer is heat-treated in a magnetic field to bring about a uniaxial magnetic anisotropy to crystallize at least a portion of the amorphous layer.

When forming the soft magnetic thin film or the soft magnetic thin layer of the thin film magnetic head of the present invention by the above described method, it may occur that the properties of the produced soft magnetic layer may be variable depending on the substrate types. Therefore, proper discretion is preferably exercised in selecting the substrate in preparation of the soft magnetic layer.

Method for Producing Soft Magnetic Thin Film

Preferably, the compositional range of the amorphous alloy film is within the QKLUM composition that is:

$69 \leq a \leq 93$, $2 \leq b \leq 15$ and $5.5 \leq c \leq 22$ (see FIG. 1),

More preferably, the above compositional range of the amorphous alloy film is delimited in the coordinate system for the ternary composition (Fe, T, N) within the PQRSTUV composition as shown in FIG. 1.

More preferably, the above mentioned heat treatment is performed in the magnetic field to produce a soft magnetic thin film exhibiting uniaxial anisotropy.

The grain size of the above crystals is preferably 30 nm (300 Å) or less.

According to the present invention, the amorphous alloy film composed of Fe, N and a specified additional element or elements T, is prepared within the defined composition EFGHIJ of $Fe_aT_bN_c$.

If the compositional ranges are $0 < b \leq 20$ and $0 < c \leq 22$, with the exclusion of the case wherein $b \leq 7.5$ and $c \leq 5$, then preferably $b \geq 0.5$ and $c \geq 0.5$, because if $b < 0.5$ or $c < 0.5$, the effect proper to the presence of the elements concerned may occasionally become unclear upon heat treatment.

If the additional element T exceeds 20 atomic percent or N exceeds 22 atomic percent, then satisfactory soft magnetism is not displayed by heat treatment.

If the above compositional ratios are within the QKLUM composition ($69 \leq a \leq 93$, $2 \leq b \leq 15$ and $5.5 \leq c \leq 22$), then a more satisfactory soft magnetism is displayed by heat treatment.

More preferably, the above mentioned composition of the amorphous alloy film is within the range delimited within the PQRSTUV composition in the ternary system (Fe, T, N) as shown in FIG. 1. The produced soft magnetic film is suitable to be used as the core material or the like for the magnetic head because a soft magnetic thin film with a low coercive force may be produced by heat treatment within this compositional range. The most preferred composition is defined such that a soft magnetic film with a coercive force of not higher than 1.5 Oe, or particularly not higher than 1.0 Oe may be produced.

If the additional element T is Zr, the desired compositional range $Fe_d(Zr_eN_{1-e})_{100-d}$ of the amorphous alloy film is within the WXYZ composition as shown in FIG. 1.

Namely, it is preferred that the amount of Fe is 77 to 88 atomic percent, whereas the ratio of the content c of N in atomic percent to the content b of Zr in atomic percent in the amorphous alloy film, or the ratio c/b, is approximately 1.63 to 2.33. If the amorphous alloy film within this compositional range is used, the thin film exhibiting satisfactory soft magnetism, such as coercive force Hc of less than 5 Oe, may be obtained by the method of the present invention. (The same applies generally for the case with $Fe_aT_bN_c$.)

The aforementioned additional elements may be one or more, if desired. For example, while only Zr may be added, it is also possible to substitute other element or elements for a portion of Zr, for example, 30 atomic percent of Zr in the composition.

Similarly, a part of Fe may be replaced by one or more of elements Co, Ni and Ru. For example, up to about 30 atomic percent of Fe constituting the soft magnetic thin film or layer may be replaced by the above element or elements.

The amorphous alloy film of the above composition of the present invention may be obtained by, for example, vapor deposition methods, such as RF sputtering. This amorphous alloy film is heat-treated at a temperature higher than its crystallization temperature and not higher than its Curie temperature to crystallize part of all of the amorphous alloy film. Preferably, the heat treatment is performed at 350° to 650° C. More preferably, the above heat treatment is performed in the magnetic field to bring about uniaxial magnetic anisotropy to crystallize part or all of the amorphous thin film. The above mentioned magnetic field is preferably sufficiently stronger than the demagnetizing field of the amorphous thin film.

When the soft magnetic film is formed on a substrate by the method of the present invention, it may occur that the properties of the produced soft magnetic thin film may be variable depending on the substrate types. Therefore, proper discretion is preferably exercised in selecting the substrate in preparation of the soft magnetic layer.

Composite Magnetic Head Having Diffusion Preventive Layer

Figure 23A:
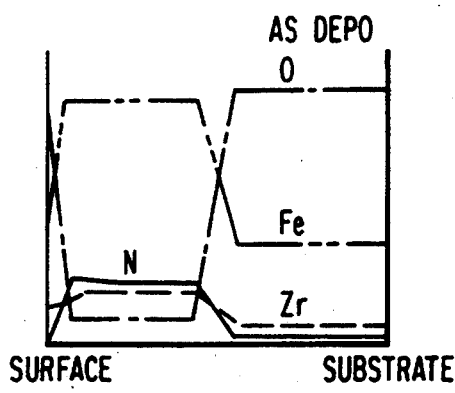
FIGS. 23 and 24 are Auger depth profile diagrams between the Fe—Zr—N thin film and the ferrite substrate for the case in which the $SiO_2$ diffusion preventive layer is not provided and such layer is provided, respectively.
Figure 24A:
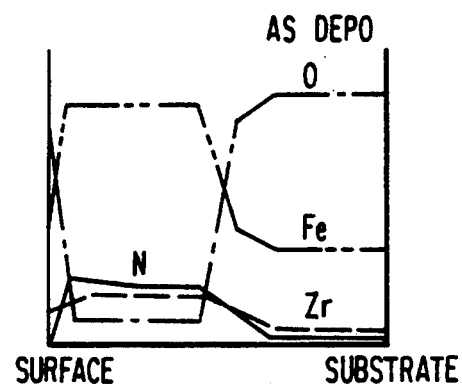
Figure 23B:
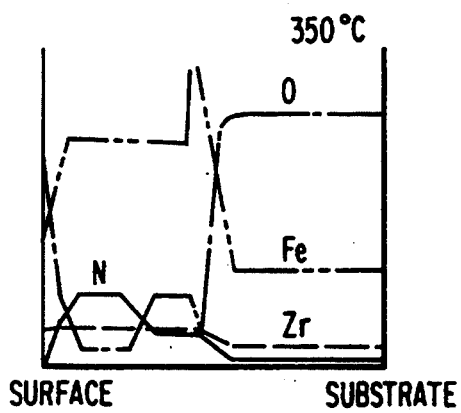
Figure 24B:
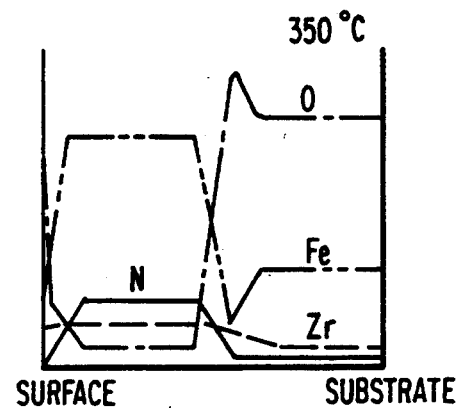
Figure 23C:
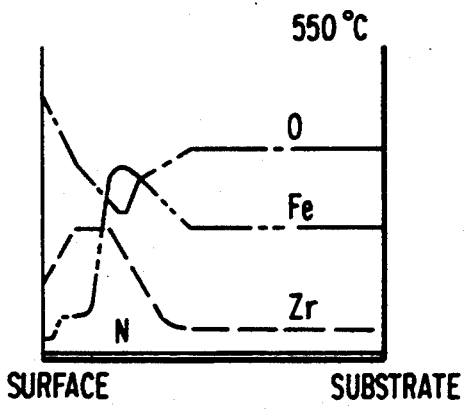
Figure 24C:
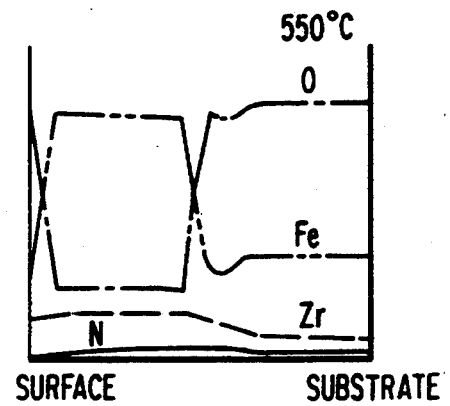

FIGS. 23 and 24 exhibit the effect of the diffusion preventive $SiO_2$ layer. FIG. 23 shows an Auger depth profile between the Fe—Zr—N thin film and each of three ferrite substrates, that is:

(a) an as-deposited substrate prepared by "reverse" sputtering for 10 minutes of the surface of a ferrite substrate (SSF-4 prepared by Shin-etsu Kagaku Co., Ltd.), followed by formation thereon, to a thickness of 100 nm (1000 Å), of the non-soft-magnetic Fe—Zr—N amorphous alloy thin film having the composition within the range specified by the present Aspect;

(b) a substrate obtained upon heat-treating the as-deposited substrate of (a) at 350° C. for one hour, and (c) a substrate obtained upon heating the as-deposited substrate of (a) at 550° C. for one hour, wherein the maximum value along the ordinate is 100 atomic percent. It is seen from FIGS. 23(a), (b) and (c) that, when the Fe—Zr—N amorphous alloy thin film is directly formed and heated in situ on the ferrite substrate, a diffusion layer is formed on the substrate-thin film interface. Thus it is seen that oxygen O in the ferrite substrate is diffused by heating into the Fe—Zr—N soft magnetic thin film, that is, the thin film produced by heating the non-soft-magnetic Fe—Zr—N amorphous alloy thin film, and that the iron Fe in the Fe—Zr—N amorphous alloy thin film is diffused into the ferrite substrate to form an interdiffused layer on the interface between the ferrite substrate and the Fe—Zr—N soft magnetic thin film.

FIG. 24 shows an Auger depth profile between the Fe—Zr—N thin film and each of three ferrite substrates, that is:

(a) an as-deposited substrate formed by applying "reverse" sputtering of the surface of a ferrite substrate (SSF-4 prepared by Shin-etsu Kagaku Co., Ltd.) for ten minutes, then depositing an $SiO_2$ thin film thereon to a thickness of 20 nm, followed by formation, on the $SiO_2$ thin film surface, of a non-soft-magnetic Fe—Zr—N amorphous alloy thin film within the compositional range of the present invention to a thickness of 100 nm (1000 Å);

(b) a substrate obtained upon heating the as-deposited substrate of (a) at 350° C. for one hour; and (c) a substrate obtained by heating the as-deposited substrate of (a) at 550° C. for one hour. It is seen from FIGS. 32(a), (b) and (c) that, when the $SiO_2$ thin film is formed at the interface between the ferrite substrate and the Fe—Zr—N amorphous alloy thin film and heated in situ, the aforementioned interdiffused layer, which should naturally be formed in the absence of the $SiO_2$ thin film, is not formed. Thus it is shown that, even upon heating, the oxygen O in the ferrite substrate is not diffused into the Fe—Zr—N soft magnetic thin film (i.e., the thin film formed by heating the non-soft-magnetic Fe—Zr—N amorphous alloy thin film), while the iron Fe in the Fe—Zr—N amorphous alloy thin film is not diffused into the ferrite substrate, so that the interdiffused layer is not produced at the interface between the ferrite substrate and the Fe—Zr—N soft magnetic thin film.

The "reverse" sputtering and the formation of the non-soft-magnetic Fe—Zr—N amorphous alloy thin film were performed continuously, using a sputtering device SPR-403, manufactured by Tokki Co., Ltd. The "reverse" sputtering is a so-called sputter-cleaning process which is performed for removing contaminants, such as air or water vapor, adsorbed on the ferrite surface, or amorphous surface layers with poor magnetic properties formed on the ferrite surface during its grinding or polishing. Such sputter cleaning process results in a roughened ferrite surface to improve the bonding properties between the ferrite surface and the layers formed thereon. The main operating conditions for the sputtering device for formation of the $SiO_2$ thin layers were as follows:

Ar gas pressure: 2 Pa
Power: 100 W
Electrode-to electrode distance: 55 mm.

At least a part of Zr of the soft magnetic layer may be replaced by at least one of Hf, Ti, Nb, Ta, V, Mo or W.

The diffusion preventive layer is preferably 5 to 20 nm (50 to 200 Å) thick.

The $SiO_2$ diffusion preventive layer may be formed by a vapor deposition method, such as sputtering. The thickness of the diffusion preventive layer is at least sufficient to prevent formation of the diffusion layer and preferably 5 nm (50 Å) or more. However, if the above layer is too thick, it acts more strongly as the pseudo gap. Therefore, the thickness of the diffusion preventive layer is preferably not more than 20 nm (200 Å).

The ferrite core is formed of ferrite, that is a series of iron oxides having in general the composition of $MO\cdot Fe_2O_3$, where M stands for one or two or more of divalent metal ions, such as $Mn^{2+}$, $Fe^{2+}$, $Co^{2+}$, $Ni^{2+}$, $Cu^{2+}$, or $Zn^{2+}$, Such ferrite may be typified by MnZn singlecrystal ferrite.

The soft magnetic layer is represented by the formula $Fe_aX_bN_c$, where a, b and c and within the EFGHIJ composition, and X denotes at least one of Hf, Ti, Nb, Ta, V, Mo and W as shown in FIG. 1.

Preferably, this compositional range is within the QKLUM composition as shown in FIG. 1.

More preferably, the above compositional range is delimited in the coordinate system for the ternary composition (Fe, Zr, N) or (Fe, X, N) within the PQRSTUV composition as shown in FIG. 1.

Still more preferably, the crystal grain size is 30 nm (300 Å) or less, and the soft magnetic thin film or layer exhibits uniaxial anisotropy.

As to the compositional ranges of the soft magnetic layer associated with the diffusion preventive $SiO_2$ layer, generally, the same applies as the case without the diffusion preventive layer.

Particularly, of c in the soft magnetic layer shown by the compositional formula $Fe_aX_bN_c$ exceeds 22 atomic percent, the coercive force Hc of as low as 1 or less may be exhibited. However, with a less than about 71 atomic percent, the lesser is the value of a, the lower tends to be the saturation magnetic flux density Bs. On the other hand, with b above 20 atomic percent, satisfactory soft magnetism is frequently not displayed.

The desired compositional range of the soft magnetic layer shown by the compositional formula $Fe_aZr_bN_c$ is $$Fe_d(Zr_eN_{1-e})_{100-d}$$

wherein $77 \leq d \leq 88$ and $0.3 \leq e \leq 0.38$ (WXYZ composition as shown in FIG. 1).

In the soft magnetic layer shown by the compositional formula $Fe_aZr_bN_c$, at least a portion of Zr, such as 30 atomic percent of Zr constituting the soft magnetic layer, may be replaced by at least one of Hf, Ti, Nb, Ta, V, Mo or W.

Further, a portion of Fe in the soft magnetic layer may be replaced by one or more of elements Co, Ni and For example, up to about 30 atomic percent of Fe constituting the soft magnetic layer may be replaced by the above element or elements.

The soft magnetic layer of the composite magnetic head of the present invention may be formed by producing an amorphous layer of the above mentioned specific composition by vapor deposition such as RF sputtering on the diffusion preventive layer, and heat-treating the amorphous layer at e.g. 350° to 650° C. to crystallize at least a portion of the amorphous layer. No diffusion layer is produced between the ferrite core and the soft magnetic layer after such heat treatment. Preferably, the above mentioned amorphous layer is heat-treated in a magnetic field to provide a uniaxial magnetic anisotropy to crystallize at least a portion of the amorphous layer.

EXAMPLES

A preparation example and properties of the soft magnetic thin film of the present invention, are first explained in detail.

Example 1

Alloy targets having a composition of $Fe_{100-y}Zr_y$, where y=5.0, 10.0 and 15.0 atomic percent, were prepared, and subjected to a radio frequency sputtering deposition under the conditions of the gas pressure of 0.6 Pa and applied power of 200 W, each in a nitrogen-containing argon gas atmosphere containing 2.5 to 12.5 mole percent of nitrogen to produce amorphous alloy films of various compositions. The resulting thin films were heat-treated in the magnetic field to produce soft magnetic thin films, and the saturation magnetic flux density Bs and the coercive force Hc thereof were measured using an A. C. BH tracer under an applied magnetic field of 25 Oe at a frequency of 50 Hz. (Magnetic field of 90 Oe was used with Hc>25, hereinafter the same.) Crystallized glass substrates (PEG 3130C prepared by HOYA) and single crystal sapphire substrates were employed as the substrates ('r' plane, {1$\bar{1}$02} plane}). The film thicknesses were set so as to be about 0.6 μm.

The results are shown in Table 1-A, wherein the coercive force Hc indicates the value as measured along the axis of easy magnetization. For certain soft magnetic thin films, magnetic permeability μ at 5 MHz and magnetostriction were measured. The sign of magnetostriction was determined from the changes in BH characteristics when the stress is applied to the film. The results are also shown in Table 1-A.

On the other hand, shown in Table 1-B are measured results of the composition, saturation magnetic flux density Bs and the coercive force Hc of three heat-treated thin films (Samples C11, C12 and C13 of Comparative Example C1) obtained on a crystallized glass substrate in the same way as in Example 1 except using the sputtering atmosphere free of nitrogen.

Figure 2:
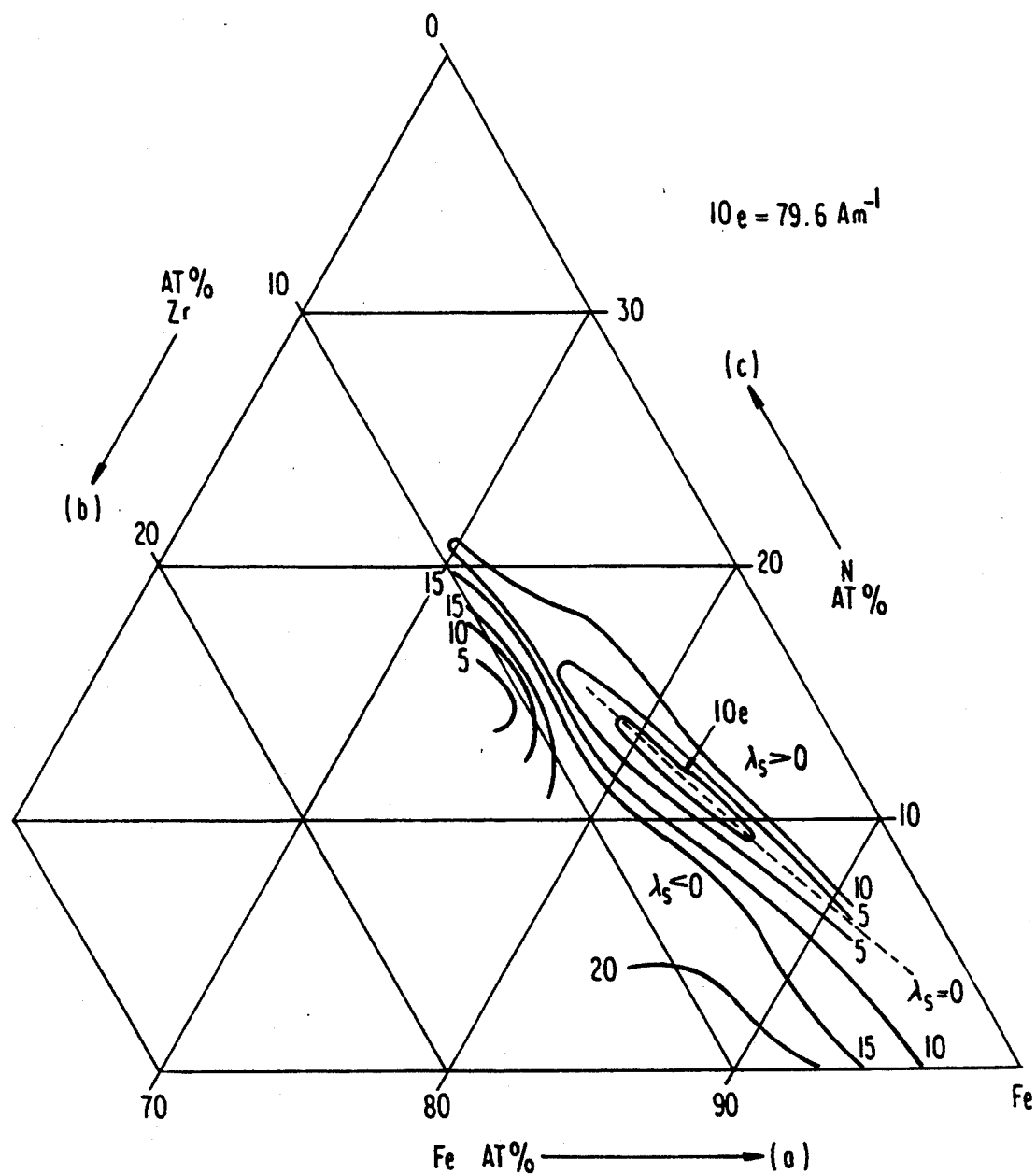
FIG. 2 shows the relation between the composition of the soft magnetic thin film produced by the preparation example of the soft magnetic thin film and the coercive force Hc and the manner of determining the sign of the magnetostriction.
Figure 3:
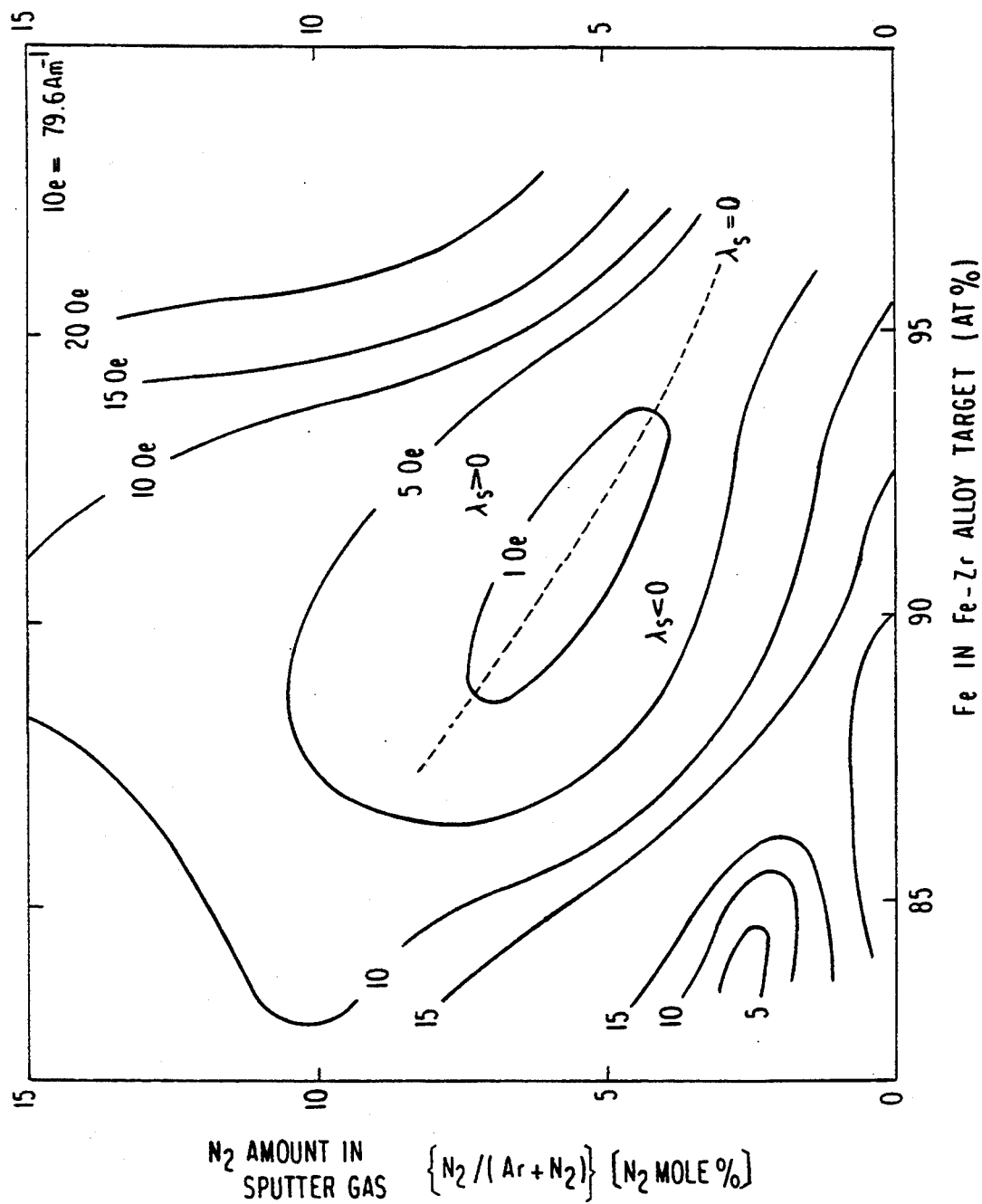
FIG. 3 shows the relation between the conditions for preparing the soft magnetic thin film, the coercive force Hc and the saturation magnetostriction Is of the thus produced soft magnetic thin film.

The relation between the compositions of the soft magnetic thin films prepared by the method of Example 1 and the coercive force Hc and the results of determination of the sign of the magnetostriction, are shown in FIG. 2, for the case in which a crystallized glass substrate was used as the substrate and heat treatment was performed at 550° C. The relation between the conditions of preparation of the soft magnetic thin film, i.e. the Fe content in the Fe—Zr alloy target and the $N_2$ content in the sputtering gas, the coercive force Hc and saturation magnetostriction λs, is shown in FIG. 3, for the case in which a crystal glass substrate was used as the substrate and the heat treatment was carried out at 550° C.

X-Ray Diffraction and Electrical Resistivity

Figure 4:
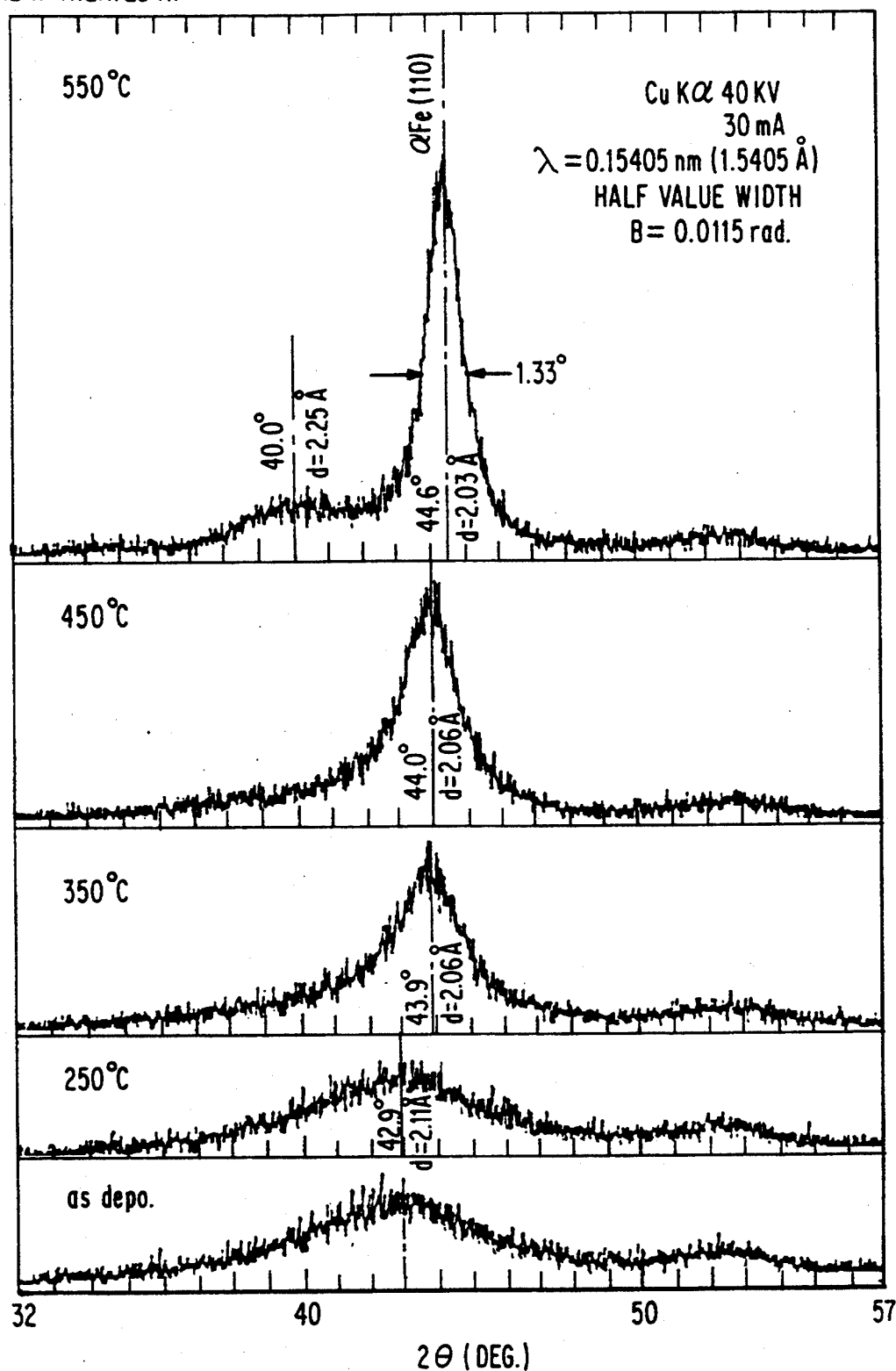
FIG. 4 shows the results of measurement of the X-ray diffraction of various thin films produced by using different heat treatment conditions.

For thin films not heat-treated, that is as deposited thin films, and for thin films heat-treated at 250° C., 350° C., 450° C. or 550° C., these thin films being among those prepared in accordance with above Example 1 so as to have the composition of $Fe_{80.9}Zr_{6.5}N_{12.6}$, the results of the X-ray analyses and the results of the measurement of the electrical resistivity, are shown in FIG. 4 and Table 2, respectively. Referring to FIG. 4, the crystal grain size of the thin film heat-treated at 550° C. is found from the half value width to be approximately 13 nm (130 Å). It is also seen that the as deposited film and the thin film heat-treated at 250° C. are amorphous, whereas the thin films heat-treated at 350° C. and 450° C. are formed by micro-crystallites and the thin film heat-treated at 550° C. is formed by micro-crystallites which are further grown in the grain size. These micro-crystallites are thought to contribute to the soft magnetism of the thin films, while the formation of the microcrystallites is thought to be ascribable to the presence of N and Zr. It is seen from Table 2 that, while the resistivity of the thin films is lowered with increase in the heat treatment temperature, the resistivity remains much higher than that of pure iron or permalloy and about equal to that of the Fe—Si alloy or Sendust. Thus, when used as the core of the magnetic head, the thin film conveniently exhibits lower easy current loss.

Vickers Hardness

The Vickers hardness Hv of the thin film having the composition of the $Fe_{80.9}Zr_{6.5}N_{12.6}$ was found to be 1000 kgf/mm$^2$ under a load of 10 g. This value is markedly higher than the value of 500 to 650 of the Sendust or Co base amorphous metal which has been hitherto used as the magnetic head material, so that the wear resistance can be increased markedly as compared with the conventional thin film.

BH Curve

Figure 5:
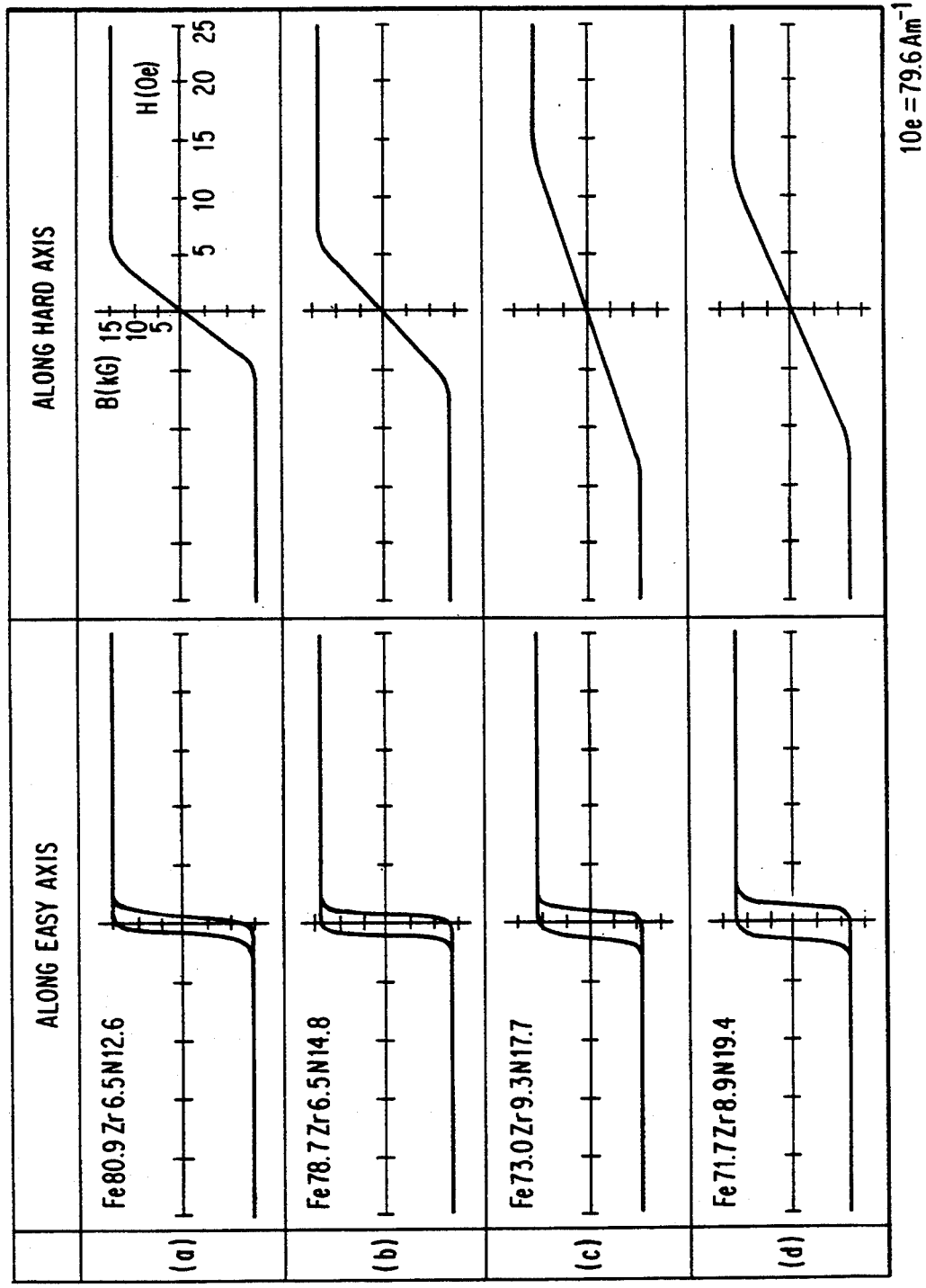
FIG. 5 shows A.C. BH curves for various thin films having different compositions.

FIG. 5 shows BH curves, as measured with an A. C. BH tracer, for several thin films prepared in the similar manner to the above Example 1 of the soft magnetic thin films.

The samples shown in FIG. 5 were heat-treated, after film formation, at 550° C. for 60 minutes in a magnetic field of 1 kOe and an $N_2$ atmosphere at 10 Torr. As may be seen from this figure, a definite in-plane uniaxial anisotropy is provided in the thin film by the heat treatment in the magnetic field. Thus, if the direction of the axis of difficult magnetization of the thin film samples is aligned with the direction of magnetization, the magnetic permeability at the frequency higher than 1 MHz may be sufficiently high, which renders the thin film samples particularly suitable as the magnetic head material. On the other hand, since the anisotropic magnetic field Hk is changed in the range of from 3 to 18 Oe with particular variation of the composition, the materials can be selected in accordance to the target value of magnetic permeability and the working frequency range. For example, when it is desired to obtain higher magnetic permeability at a frequency of 10 MHz or less, a composition which will give Hk=3 to 5 Oe can be employed, whereas, if it is desired not to lower the magnetic permeability at higher than 10 MHz, a composition which will give a higher value of Hk can be employed.

MH Curve

Figure 6:
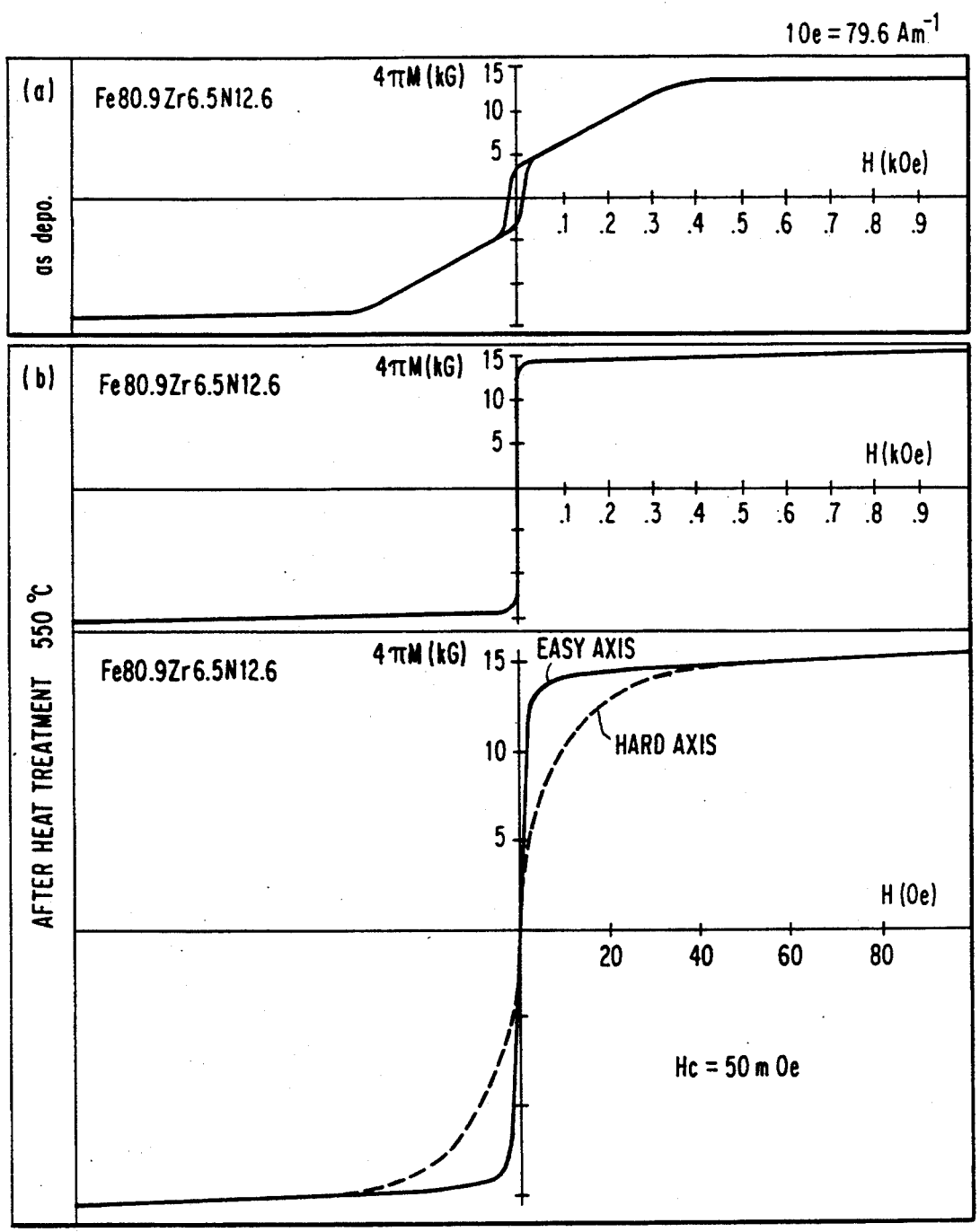
FIG. 6 shows MH curves of various thin films before and after heat treatment, as measured from VSM.

FIG. 6 shows the results of measurement by VSM of the MH curves of the thin films having the composition of $Fe_{80.9}Zr_{6.5}N_{12.6}$, among the thin films obtained in the above Example 1. In this figure, the MH curve for the as-deposited thin film is shown at (a), whereas the curve for the thin film after heat treatment in the magnetic field at 550° C. is shown at (b). It is noted that the correction for the demagnetizing field was not made and the film sample was 5 mm in diameter and 0.63 μm in thickness. The coercive force, as measured with the VSM, was smaller by at least one digit place than the value measured by the A. C. BH tracer, and was determined from the curve (b) to be approximately 50 mOe. This value is approximately equal to that of the Sendust or Co base amorphous alloys, which demonstrates the superior soft magnetic properties of the film sample. The coercive force is also found from the curve (b) to be 4 $\pi$Ms=14.5 KG, which is markedly higher as compared with the Sendust or Co base amorphous alloys, thus indicating that the film sample may be used advantageously as the magnetic head material for recording on a high coercive force recording medium.

The value of 4 $\pi$Ms of the thin film before heat treatment is 13.0 KG, which ms slightly smaller than the value after heat treatment. This thin film also exhibits vertical anisotropy (Hk about 400 Oe), a high coercive force Hc and poor soft magnetic properties.

Corrosion Resistance

The corrosion resistance of the thin film sample prepared in accordance with the above Example 1 so as to have to composition $Fe_{80.9}Zr_{6.5}N_{12.6}$ was evaluated from the change in the surface state after the sample was dipped in city water for about one week. It was found that the surface state of the present sample was not changed and remained to be the mirror surface. For comparison, similar tests were conducted on the $Co_{88.4}Nb_{8.0}Zr_{3.6}$ amorphous alloy films and Fe—Si alloy (magnetic steel plate). It was found that, while the Co—Nb—Zr alloy was also not changed in its surface state, the Fe—Si alloy was rusted on its overall surface. Thus it could be seen from above that the soft magnetic thin film employed as the soft magnetic thin film for the magnetic head of the present invention was also superior in corrosion resistance.

The following description refers to the soft magnetic thin film having a composition which is outside of that of the soft magnetic thin film of the present invention.

Comparative Example C2

Figure 7A:
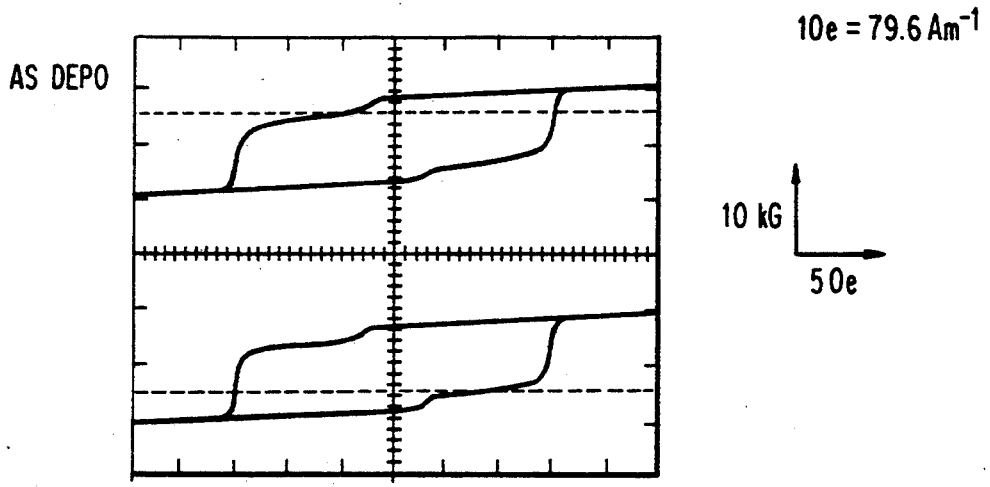
FIG. 7 shows A.C. BH curves of various soft magnetic thin films having the compositions outside the composition range of the soft magnetic thin film for the magnetic head of the present invention.
Figure 7B:
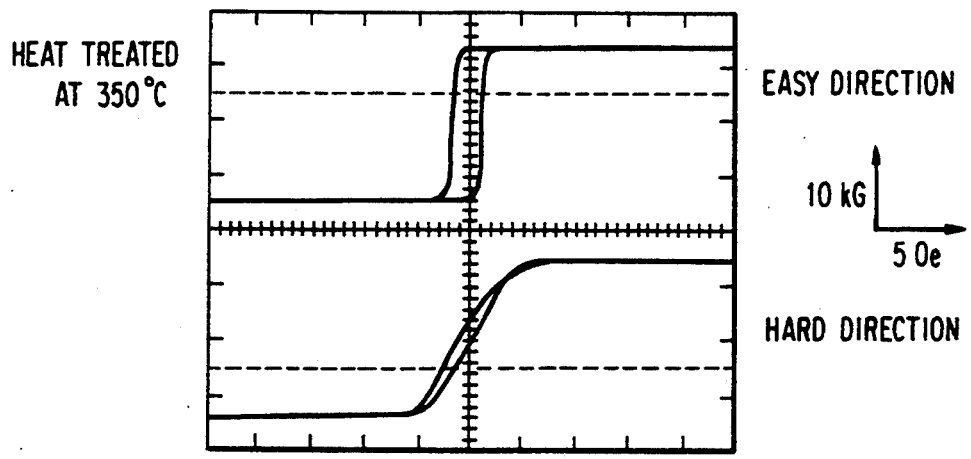
Figure 7C:
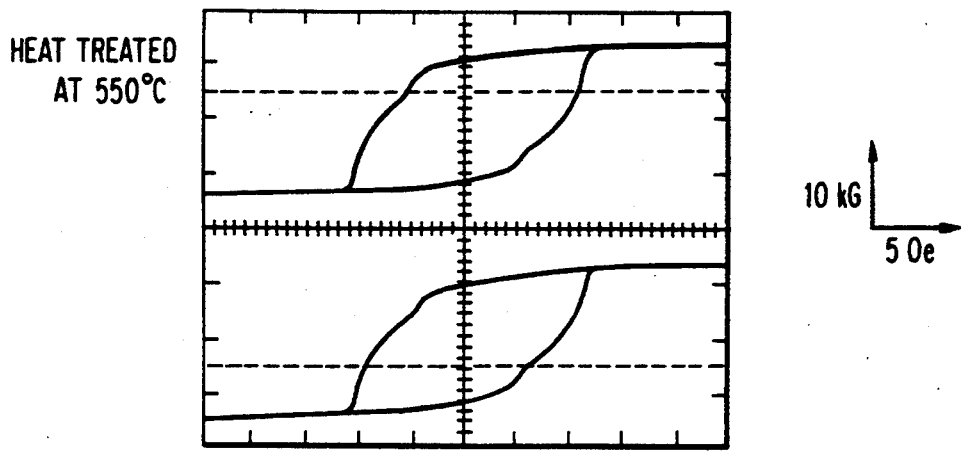

An amorphous alloy film having a composition of $Fe_{91.2}Zr_{3.9}N_{4.9}$ was formed and heat-treated for one hour at 350° C. and 550° C. in the magnetic field of 1 kOe. The BH curves, as measured with the A. C. BH tracer, for the above mentioned amorphous alloy film (as-deposited film), a film obtained after heat-treating the as-deposited film at 350° C. and a film obtained after heat-treating the as-deposited film at 550° C., are shown at (a) to (c) in FIG. 7, respectively. The as-deposited film exhibits no soft magnetism, as shown at (a) in FIG. 7, whereas the film obtained after heat treatment of the as-deposited film at 550° C. exhibits uniaxial anisotropy, as shown at (b) in FIG. 7. However, the film obtained after heat treatment at 550° C. is worsened in its properties, as shown at (c) in FIG. 7.

During the preparation of the magnetic head, bonding with fused glass, or so-called glass bonding, is frequently performed. This glass bonding is usually performed with heating to about 550° C. The film sample having the above mentioned compositional range does not exhibit satisfactory soft magnetic properties, when applied to the ultimate magnetic head, on account of the heating at the time of glass bonding. That is, with the above mentioned compositional range, only thermally unstable soft magnetic thin films can be obtained.

TABLE 1-A

| Example 1 Samples | Target composition (atom %) | | Amount of $N_2$ in sputtering gas (mole %) | Composition of soft magnetic thin film (atom %) | | | *Bs (kG) | Hc (Oe) After heat treatment at 350° C. | Hc (Oe) After heat treatment at 550° C. | μ 5 MHz | Magneto-striction λs | Substrate |
|---|---|---|---|---|---|---|---|---|---|---|---|---|
| | Fe | Zr | | Fe | Zr | N | | | | | | |
| 1 | 95 | 5 | 2.5 | | | | 16.2 | 2.4 | 3.2 | — | minus | Crystallized glass substrate (PEG 3130C, mfd. by HOYA) |
| 2 | 95 | 5 | 5.0 | 89.9 | 3.5 | 6.6 | 14.4 | 10.4 | 3.9 | — | — | |
| 3 | 95 | 5 | 7.5 | | | | 11.2 | 22.2 | 14.3 | — | — | |
| 4 | 95 | 5 | 10.0 | 89.0 | 3.4 | 7.6 | 8.7 | 34 | 16.6 | — | — | |
| 5 | 95 | 5 | 12.5 | | | | 9.5 | 45 | 17.9 | — | — | |
| 6 | 90 | 10 | 2.5 | | | | 12.2 | 11.7 | 7.7 | — | minus | |
| 7 | 90 | 10 | 5.0 | 80.9 | 6.5 | 12.6 | 14.0 | 5.5 | 0.9 | — | ~0 | |

1 kG = $10^{-1}$ T  1 Oe = 79.6 $Am^{-1}$

TABLE 1-A-continued $1\text{ kG} = 10^{-1}\text{ T} \quad 1\text{ Oe} = 79.6\text{ Am}^{-1}$

| Example 1 Samples | Target composition (atom %) Fe | Zr | Amount of N$_2$ in sputtering gas (mole %) | Composition of soft magnetic thin film (atom %) Fe | Zr | N | * Bs (kG) | Hc (Oe) After heat treatment at 350° C. | After heat treatment at 550° C. | μ 5 MHz | Magnetostriction λs | Substrate |
|---|---|---|---|---|---|---|---|---|---|---|---|---|
| 8  | 90 | 10 | 7.5  |      |     |      | 13.6 | 8.5  | 1.3  | —    | ~0    |  |
| 9  | 90 | 10 | 10.0 | 78.7 | 6.5 | 14.8 | 7.3  | 4.8  | 4.9  | —    | plus  |  |
| 10 | 90 | 10 | 12.5 |      |     |      | 8.6  | 4.3  | 6.7  | —    | —     |  |
| 11 | 85 | 15 | 2.5  |      |     |      | 12.0 | 8.6  | 5.4  | —    | —     |  |
| 12 | 85 | 15 | 5.0  | 73.0 | 9.3 | 17.7 | 3.6  | 14.8 | 16.5 | —    | —     |  |
| 13 | 85 | 15 | 7.5  |      |     |      | 6.8  | 13.3 | 10.7 | —    | —     |  |
| 14 | 85 | 15 | 10.0 | 71.7 | 8.9 | 19.4 | 5.5  | 7.7  | 6.4  | —    | —     |  |
| 15 | 85 | 15 | 12.5 |      |     |      | 9.1  | 2.4  | 13.7 | —    | —     |  |
| 16 | 90 | 10 | 2.5  |      |     |      | 14.2 | 0.8  | 1.2  | —    | minus | Single- |
| 17 | 90 | 10 | 5.0  | 80.9 | 6.5 | 12.6 | 13.4 | —    | 0.8  | 2260 | ~0    | crystal |
| 18 | 90 | 10 | 7.5  |      |     |      | 12.9 | 1.1  | 1.4  | —    | ~0    | sapphire |
| 19 | 90 | 10 | 10.0 | 78.7 | 6.5 | 14.8 | 14.8 | —    | 0.5  | 1190 | plus  | substrate |
| 20 | 90 | 10 | 12.5 |      |     |      | 12.9 | 4.9  | 10.5 | —    | —     | (R surface) |
| 21 | 85 | 15 | 2.5  |      |     |      | 12.3 | 1.0  | 1.0  | —    | —     |  |
| 22 | 85 | 15 | 5.0  | 73.0 | 9.3 | 17.7 | 10.0 | 5.7  | 1.2  | —    | —     |  |
| 23 | 85 | 15 | 7.5  |      |     |      | 12.5 | 1.0  | 1.5  | —    | —     |  |
| 24 | 85 | 15 | 10.0 | 71.7 | 8.9 | 19.4 | 10.4 | —    | 1.0  | 1450 | —     |  |
| 25 | 85 | 15 | 12.5 |      |     |      | 8.3  | 1.2  | 12.2 | —    | —     |  |

*after heat treatment at 550° C.

TABLE 1-B $1\text{ kG} = 10^{-1}\text{ T} \quad 1\text{ Oe} = 79.6\text{ Am}^{-1}$

| Samples | | Target composition [at %] Fe | Zr | N$_2$ in sputtering gas [mole %] | Film composition [at %] Fe | Zr | N | ** Bs [kG] | Hc [Oe] After heat treatment at 350° C. | After heat treatment at 550° C. |
|---|---|---|---|---|---|---|---|---|---|---|
| *C1 | C11 | 95 | 5  | 0 | 96.3 | 3.7  | 0 | 14.6 | 11.2 | 10.6 |
|     | C12 | 90 | 10 | 0 | 92.6 | 7.4  | 0 | 10.4 | 27   | 19.7 |
|     | C13 | 85 | 15 | 0 | 88.7 | 11.3 | 0 | 3.4  | 14.3 | 20   |

*C1 = Comparative Examples C1
**after heat treatment at 550° C.

TABLE 2

| Conditions of heat treatment | Electrical resistivity ρ |
|---|---|
| as-deposited | 159 μΩ · cm |
| 250° C. | 161 |
| 350    | 136 |
| 450    | 125 |
| 550    | 77  |

Example 2

Using alloy targets of a composition Fe$_{92.5}$Zr$_{7.5}$, radio frequency sputtering deposition was performed in nitrogen-containing argon gas atmospheres containing 2.5, 5.0, 7.5, 10.0 or 12.5 mole percent of nitrogen to form Fe—Zr—N amorphous thin films of various compositions on a sapphire substrate ('r' plane).

The amorphous thin films thus formed on the substrate were heat-treated at 350° or 550° C. for one hour to produce Fe—Zr—N soft magnetic thin films. The composition, the saturation magnetic flux density Bs and the coercive force Hc of the produced Fe—Zr—N soft magnetic thin films are shown in Table 3.

Comparative Example C3

The heat-treated thin films were produced in the same way as in Example 2 except using a sputtering atmosphere free of nitrogen. The composition, the saturation magnetic flux density Bs and the coercive force Hc are also shown in Table 3.

TABLE 3

$1\text{ kG} = 10^{-1}\text{ T} \quad 1\text{ Oe} = 79.6\text{ Am}^{-1}$

| Samples | | Target composition [at %] Fe | Zr | N$_2$ in sputtering gas [mole %] | Composition of thin film heat-treated at 550° C. [at %] Fe | Zr | N | ** Bs [kG] | Hc [Oe] After heat treatment at 350° C. | After heat treatment at 550° C. |
|---|---|---|---|---|---|---|---|---|---|---|
| Ex. 2 | No. 31 | 92.5 | 7.5 | 2.5  | 85.5 | 6.0 | 8.5  | 14.7 | 10.2  | 4.9 |
|       | No. 32 | 92.5 | 7.5 | 5.0  | 86.3 | 5.4 | 8.3  | 15.3 | 0.89  | 3.4 |
|       | No. 33 | 92.5 | 7.5 | 7.5  | 86.3 | 5.3 | 8.4  | 15.3 | 0.93  | 2.4 |
|       | No. 34 | 92.5 | 7.5 | 10.0 | 86.6 | 5.2 | 8.2  | 14.9 | 0.83  | 2.2 |
|       | No. 35 | 92.5 | 7.5 | 12.5 | 83.5 | 4.9 | 11.6 | 14.3 | 1.0   | 3.4 |
|       | C3     | 92.5 | 7.5 | 0    | 92.8 | 7.2 | —    | (B90) 6.7 | −12 | (H90) −25 |

C3 = Comparative Example C3
*after heat treatment at 550° C.

Example 3

Using a target having the composition of Fe$_{90}$Zr$_{10}$ (atomic percent), radio frequency sputtering deposition was performed in a nitrogen-containing argon gas atmosphere containing 6.0 mole percent of nitrogen under conditions of a gas pressure of 0.6 Pa and an applied power of 400 W, to form an amorphous thin film of Fe$_{75.9}$Zr$_{7.3}$N$_{16.8}$ on a sapphire substrate ('r' plane).

Figure 13A:
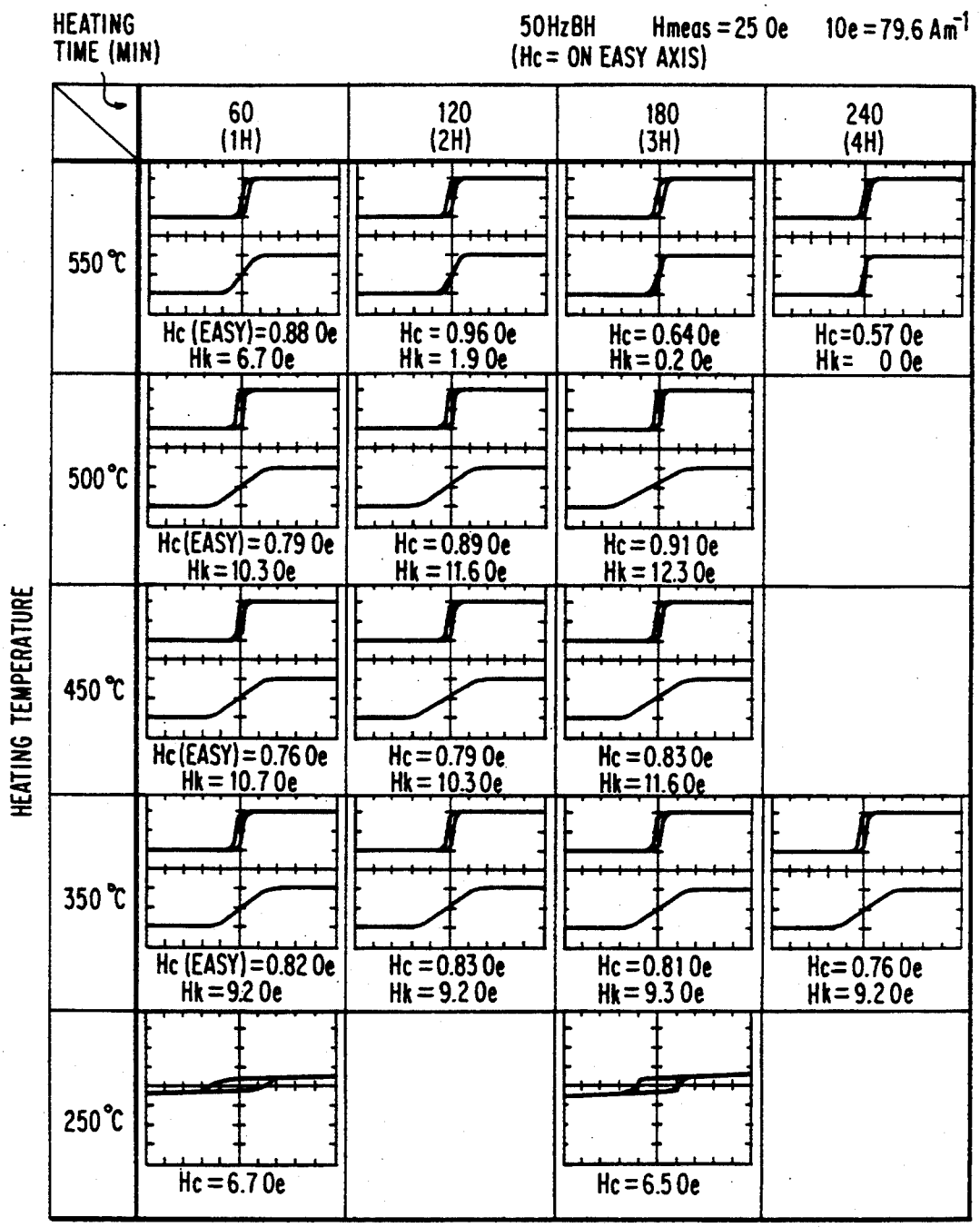
FIG. 13 shows B-H characteristics, the coercive force Hc and the anisotropic magnetic field Hk of the Fe—Zr—N soft magnetic thin film.

The amorphous thin film thus formed on the substrate was heat-treated in an isothermal magnetic field (1.1 kOe applied in the [0010] direction) at 250° C., 350° C., 450° C., 500° C. or 550° C. for 60 minutes, 120 minutes, 180 minutes, 240 minutes, 540 minutes, 1140 minutes, 2400 minutes or 4800 minutes, to produce soft magnetic thin films. FIG. 13 shows the BH characteristics, as measured under the measuring magnetic field Hm=25 Oe, the coercive force Hc and the anisotropic magnetic field of the produced Fe—Zr—N soft magnetic thin films.

Figure 15:
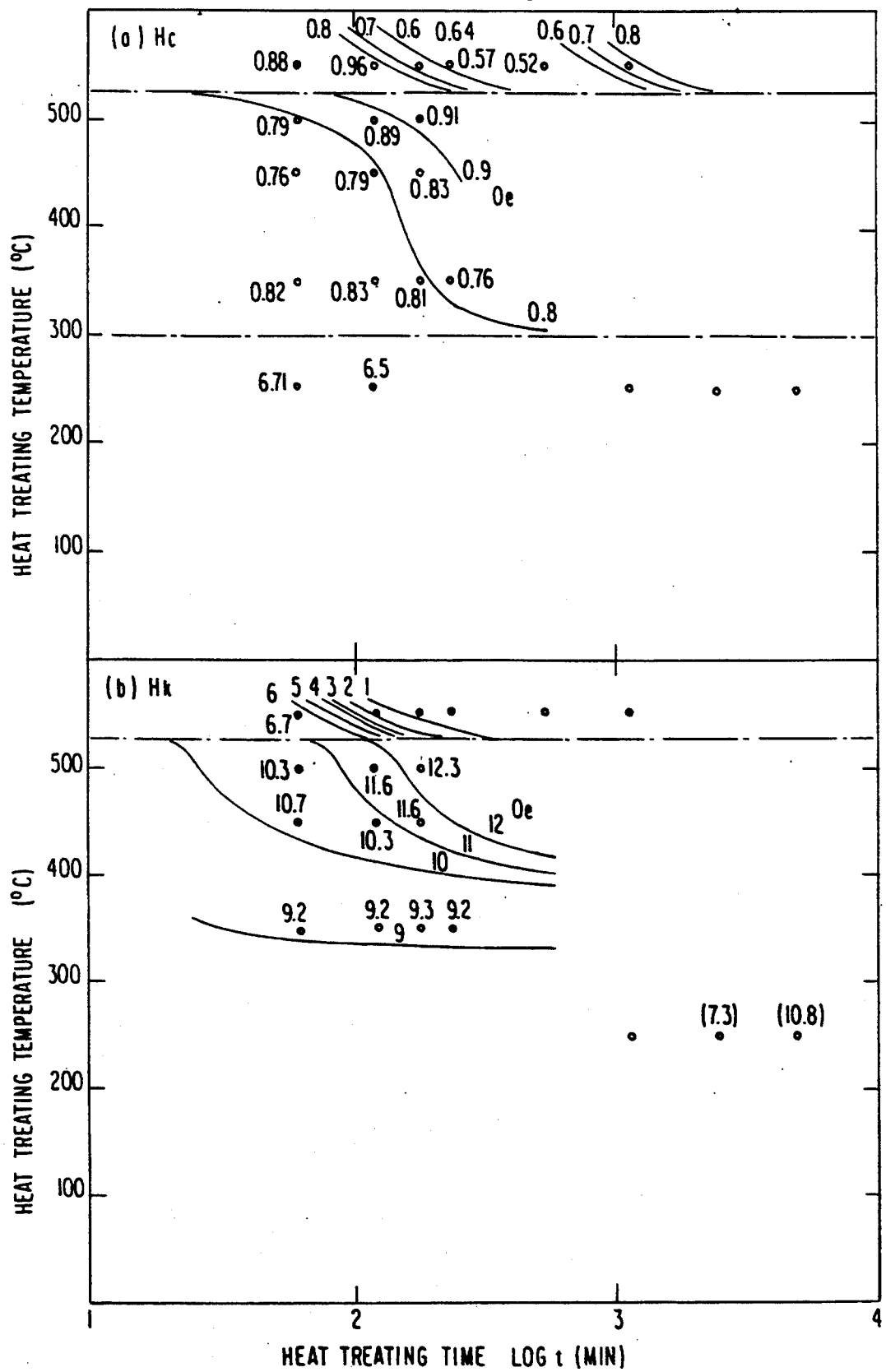
FIG. 15 shows the relation between the heat treatment time t, the heat treatment temperature and the coercive force Hc and the relation between the heat treatment time t, the heat treatment temperature and the anisotropic magnetic field Hk.

FIG. 14 shows the relation of (a) the coercive force Hc and (b) the anisotropic magnetic field Hk of the produced Fe—Zr—N soft magnetic thin film with respect to the heat treatment time t (min). FIG. 15 shows (a) the relation between the heat treatment time t (min), the heat treatment temperature and the coercive force Hc, and (b) the relation between the heat treatment time t (min), the heat treatment temperature and the anisotropic magnetic field Hk.

It is seen from these figures that different changes in the BH characteristics (curves) with the heat treatment temperature are observed in the temperature ranges of 350° to 500° C., over 500° C. and lower than 350° C.

Table 4 shows the compositions, the ratios of the Zr content (atomic percent) to the Fe content (atomic percent) or Zr/Fe, the ratios of the N content (atomic percent) to the Zr content (atomic percent) or N/Zr, and BH characteristics (measuring magnetic field Hm=25 Oe) of the five soft magnetic thin films obtained by heat treatment of the above Fe$_{75.9}$Zr$_{7.3}$N$_{16.8}$ amorphous thin film at 250° C. for 4800 minutes, 350° C. for 240 minutes, 450° C. for 180 minutes, 500° C. for 180 minutes or at 550° C. for 1140 minutes. The undermentioned compositions may be expressed by Fe$_{91.2}$(Zr.N$_x$)$_{8.8}$, where x may be expressed by x=N/Zr.

Table 4 shows that the value of the ratio N/Zr remains substantially constant in a range up to the heat treatment temperature of 250° C. and in a range of 350° C. to 500° C., and that the heat treatment temperature at which the ratio N/Zr is acutely changed exists presumably at heat treatment temperatures of about 300° C. and about 500°. C.

(1.5405 Å)) of the Fe—Zr—N soft magnetic thin film obtained in Example 3 and the amorphous Fe$_{75.9}$Zr$_{7.3}$N$_{16.8}$ thin film (as deposited thin film) before heat treatment. The X-ray diffraction pattern may be analyzed as follows:

The as-deposited thin film shows a typical halo pattern indicating that the film has been amorphasized.

The main peak position is shifted towards the large angle side with the rise in the heat treatment temperature and ultimately 2θ=44.6° at the 550° C. heat treatment, coinciding with the αFe (110) peak. At 250° C.×4800 minutes, 2θ=43.7°, coinciding with the Fe$_3$Zr (440) peak. For heat treatment from 350° C. to 500° C., 2θ≈44°, which corresponds to a value between the αFe (110) peaks and the Fe$_3$Zr (440) peak.

The crystal grain size, as measured by the half value width of the main peak in accordance with the Scherrer's formula, is about 10 nm (100 Å) at 250° to 450° C., about 12 nm (120 Å) at 500° C.×180 minutes, about 17 nm (170 Å) at 550° C.×1140 minutes and about 13 nm (130 Å) at 550° C.×60 minutes (see Example 1 and FIG. 4) thus increasing continuously with the temperature and time.

The relation between the time of 550° C. heat treatment, the main peak position and the crystal grains is as shown in the Table below.

| Time (min) | Main peak angle 2θ (degrees) | Crystal grain size (nm) |
| --- | --- | --- |
| 60 | 44.6 | 13 |
| 1140 | 44.6 | 17 |

It is seen from the above Table that the fine grain of αFe phase is precipitated at a relatively earlier time by the 550° C. heat treatment and that the crystal grain growth occurs to a slight extent with lapse of time.

With the 550° C. heat treatment, there are observed peaks, other than αFe, possibly ascribable to Fe$_3$Zr or ZrN, these having presumably been precipitated in micro-crystalline form.

Example 4

Using a target having a composition of Fe$_{90}$Zr$_{10}$ (atomic percent), radio frequency sputtering deposition was performed in a nitrogen-containing atmosphere containing 5 mole percent of nitrogen under conditions of the gas pressure of 0.6 Pa and an applied power of 200 W, to form an Fe—Zr—N amorphous thin film on a sapphire substrate ('r' plane).

The temperature-depending changes of magnetization (normalized with respect to the magnetization at room temperature) of an amorphous thin film (about 0.6

TABLE 4

| | | | | | | | 1 kG = 10$^{-1}$ T | |
| --- | --- | --- | --- | --- | --- | --- | --- | --- |
| | Heat treatment | Time | Composition [at %] | | | | | Bs |
| Samples | temperature | (min) | Fe | Zr | N | Zr/Fe | N/Zr | [kG] |
| 41 | 550° C. | 1140 | 83.2 | 8.0 | 8.8 | 9.58% | 1.1 | 14.5 |
| 42 | 500 | 180 | 78.5 | 7.6 | 13.9 | 9.71 | 1.8 | 14.6 |
| 43 | 450 | 180 | 76.8 | 7.4 | 15.8 | 9.62 | 2.1 | 14.2 |
| 44 | 350 | 240 | 77.5 | 7.4 | 15.1 | 9.59 | 2.0 | 13.9 |
| 45 | 250 | 4800 | 76.0 | 7.3 | 16.7 | 9.63 | 2.3 | 12.5 |
| | before heat treatment | — | 75.9 | 7.3 | 16.8 | 9.54 | 2.3 | — |
| | | | | | | 9.61 on an average | | |

X-Ray Diffraction Pattern

Figure 16:
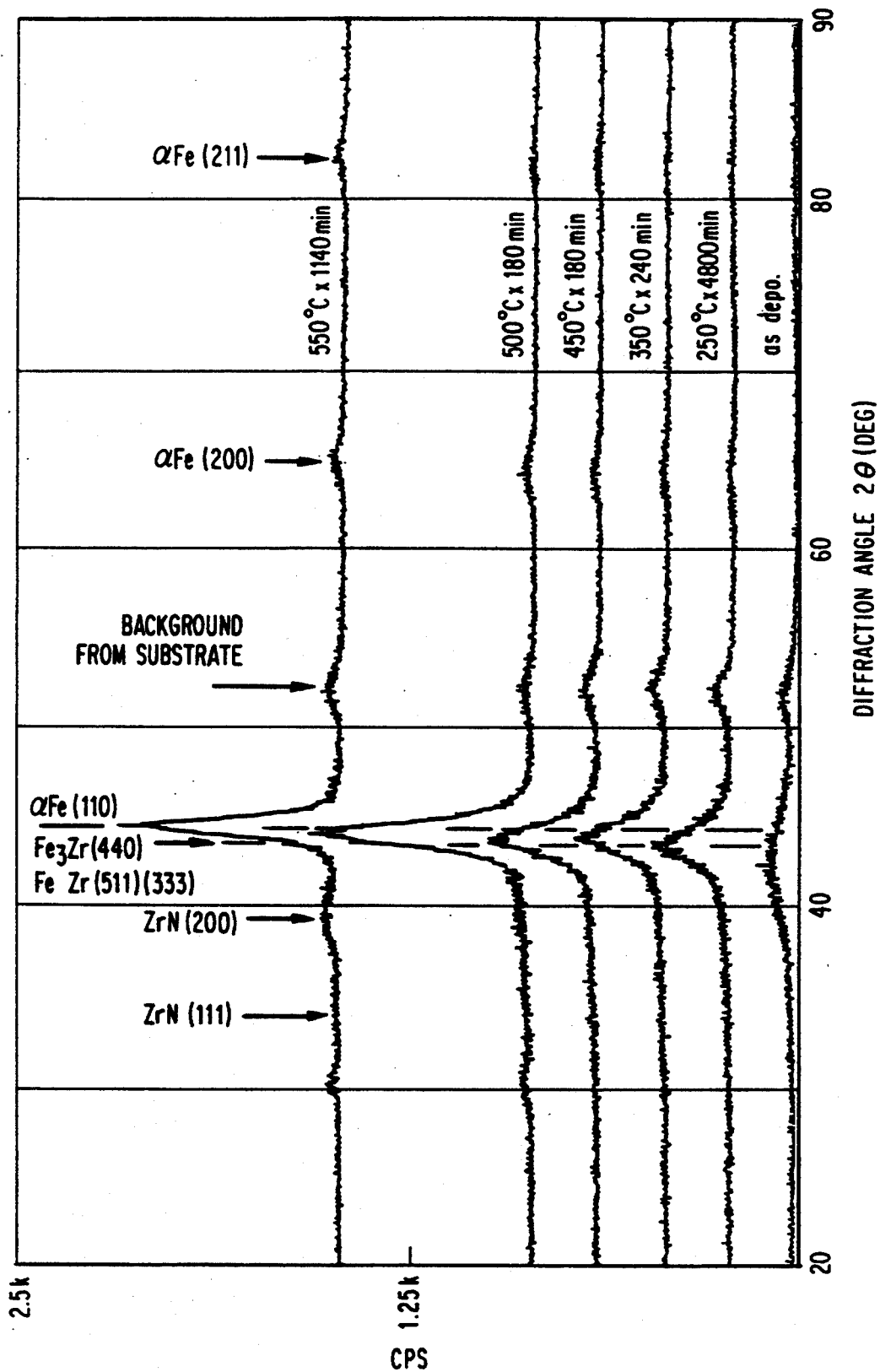
FIG. 16 shows the X-ray diffraction spectra of the amorphous thin film before hear treatment and the Fe—Zr—N soft magnetic thin film.
Figure 17:
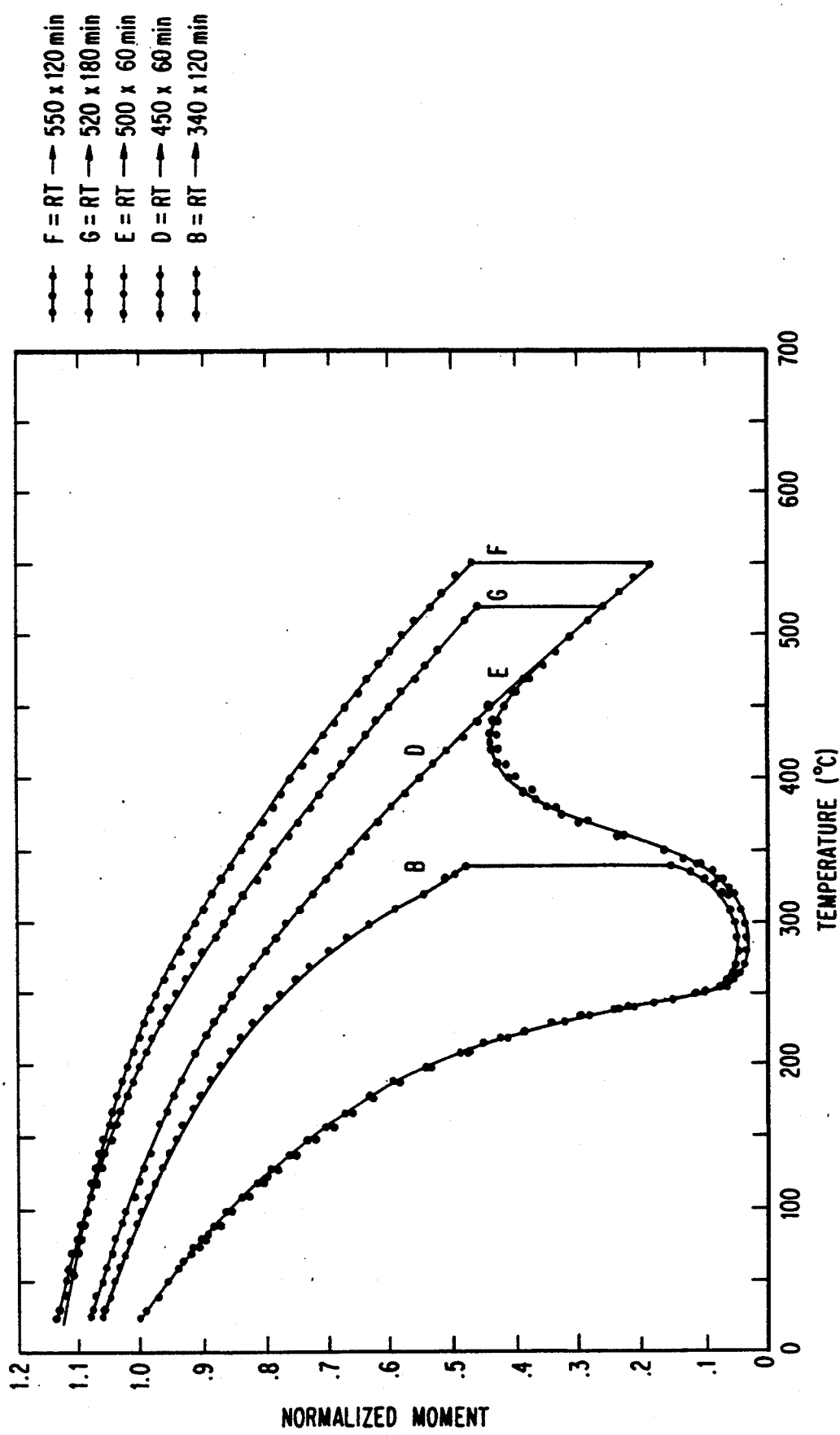
FIG. 17 shows changes, in magnetization of the Fe—Zr—N soft magnetic thin film as a function of temperature.

FIG. 16 shows the X-ray diffraction pattern (X ray source Cu Kα ray, 40 kV. 30 mA, λ=0.15405 nm μm thick) formed on the substrate, were measured by a VSM. The results are shown in FIG. 17. Measurement was made under elevating the temperature at the rate of temperature increase of about 3° C./min, starting from room temperature. Thus the samples B, D, E, G and F were maintained at 340° C. for 120 minutes, at 450° C. for 60 minutes, at 500° C. for 60 minutes, at 520° C. for 180 minutes and at 550° C. for 120 minutes. Measurement was then made under lowering the temperature to room temperature at the rate of −3° C./min. It is seen from FIG. 17 that the Curie temperature of the Fe—Zr—N amorphous as-deposited thin film before heat treatment is about 250° C. and that, when the temperature is maintained at least at 340° C., the value of magnetization increases and the Curie temperature also increases. It is seen that, when the temperature of 550° C. is maintained for 120 minutes, the Curie temperature is raised to 700° C. or higher and thus the Curie temperature 770° C. of αFe is approached by heat treatment. The magnetization at room temperature is higher in any cases than that of the as-deposited amorphous thin film and substantially saturated when the temperature of 520° C. to 550° C. is maintained, amounting to 1.12 to 1.14 times the magnetization of the as-deposited amorphous thin film.

The following has become evident from the Examples 3 and 4.

(a) Before Heat Treatment (as-deposited)

The film is structurally amorphous. Soft magnetism is not achieved, and the Curie temperature is rather low as compared with αFe while the magnetic moment is markedly lower than the value after heat treatment. The magnetic moment is lower than that after heat treatment. These are the properties expected of the Fe base amorphous alloys. The N content is as high as 16.8% while N/Zr=2.3.

(b) Heat Treatment at 250° C.

The BH characteristics are improved slightly as compared with those of the as-deposited film, with Hc amounting to 5 to 7 Oe. By prolonging the heat treatment, crystallization could be recognized by X-rays after 4800 minutes, and an uniaxial anisotropic film (Hc=1.4 Oe) was produced. The main peak position corresponds to the Fe$_3$Zr (440) peak. The N content after heat treatment is not changed from that of the as-deposited film.

(c) Heat Treatment at 350° C. to 500° C.

The main peak is at the intermediate between the αFe (110) peak and the Fe$_3$Zr (440), however, a broad rise is observed at near ZrN (200) demonstrating a complex state. As regards BH characteristics, the value of Hk tends to increase with increase in the product of heat treatment time × temperature under the conditions of Hc≈0.7 to 0.9 Oe and Hk=9 to 12 Oe. The Curie temperature varies continuously within this range, however, the magnetization at room temperature remains constant at 1.06 to 1.08 times that before heat treatment. The N content after heat treatment is slightly lowered at 500° C. from the value before heat treatment, while the ratio N/Zr is in the range approximately equal to 2.

(d) Heat Treatment at 500° C.

The main peak clearly corresponds to an αFe (110) peak and new peaks presumably ascribable to Fe$_3$Zr and ZrN are just appearing. It may be assumed from this that, after heat treatment at 550° C., micro-crystalline αFe grains (order of 10 to 20 nm) oriented in the (110) direction and Fe$_3$Zr or ZrN micro-crystalline grains are precipitated after heat treatment at 550° C. However, the Curie temperature is lower than 770° C. which is the Curie temperature of αFe, presumably in association with the finer crystal grain size.

It seems that the film is made up of almost α-Fe micro-crystallites and micro-crystallites of ZrN.

On prolonged heat treatment, Hc is lowered and reaches a local minimum after about 400 minutes, after which it is increased slightly. Hk is lowered with lapse of time and becomes substantially isotropic after about 250 minutes.

The N content after heat treatment depends on the heat treatment time such that N/Zr is lowered to about 1.8 after heat treatment of 60 minutes and to about 1.1 after heat treatment of 1140 minutes. After heat treatment at 550° C., part of nitrogen is presumably discharged out of the sample as the N$_2$ gas.

When the Fe—Zr—N amorphous thin film is heat-treated in this manner, the produced soft magnetic thin films differ in structure and properties depending on the heat treatment temperature, in agreement with Table 2 showing the electrical resistivity of the Example 1.

Figure 18:
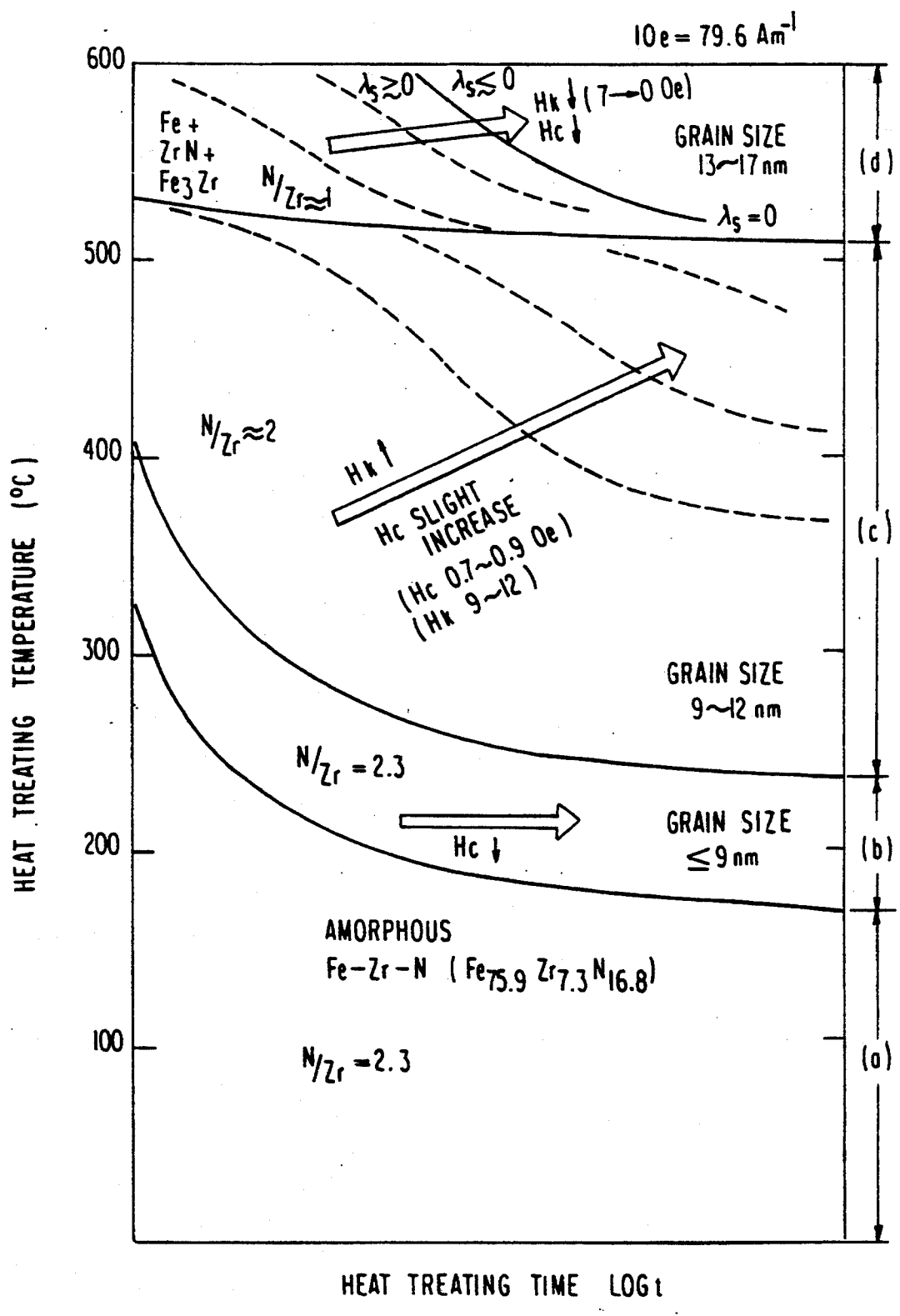
FIG. 18 shows estimated characteristics of the soft magnetic thin film obtained with the heat treatment time t and the heat treatment temperature.

The summary of the above analyses is shown diagrammatically in FIG. 18.

Example 5

Using an alloy target of the Fe$_{90}$Zr$_{10}$ composition, radio frequency sputtering deposition was performed in a nitrogen-containing argon gas containing 6.0 mole percent nitrogen to form an Fe$_{76.2}$Zr$_{7.3}$N$_{16.5}$ amorphous thin film and an Fe$_{75.9}$Zr$_{7.3}$N$_{16.8}$ amorphous thin film on a sapphire substrate ('r' plane). The sputtering was performed at a total pressure of 0.15 Pa and an applied power of 1 kW, using a target of 6 inch in diameter, for preparing the former film, and at a total pressure of 0.6 Pa and an applied power of 400 W, using a target of 4 inch in diameter, for preparing the latter film.

The Fe$_{76.2}$Zr$_{7.3}$N$_{16.5}$ amorphous thin film formed on the substrate was heat-treated in a magnetic field at 550° C. for 60 minutes to produce an Fe$_{77.8}$Zr$_{7.6}$N$_{14.6}$ soft magnetic thin film having a film thickness of about 1 μm. The Fe$_{75.9}$Zr$_{7.3}$N$_{16.8}$ amorphous thin film formed on the substrate was heat-treated at 550° C. in the magnetic field to produce a soft magnetic thin film. The composition of the soft magnetic thin film for the heat treatment time of 60 minutes and that for the heat treatment time of 1140 minutes were Fe$_{79.2}$Zr$_{7.5}$N$_{13.3}$ and Fe$_{83.2}$Zr$_{8.0}$N$_{8.8}$, respectively. The composition, the saturation magnetic flux density Bs, the coercive force Hc and the anisotropic magnetic field Hk of the produced soft magnetic thin films are shown in Table 5.

The value of the coercive force after heat treatment for 1140 minutes is almost the same as the value of 60 minutes heat treatment. This data indicates the marked thermal stability of soft magnetic properties of Fe—Zr—N thin film.

TABLE 5

| | | Thin film composition [at %] | | | Bs | Hc | 1 kG = 10$^{-1}$T Heat treatment temperature | 1 Oe = 79.6 Am$^{-1}$ Heat treatment time | Hk |
|---|---|---|---|---|---|---|---|---|---|
| Samples | | Fe | Zr | N | [kG] | [Oe] | [°C.] | [min] | [Oe] |
| No. | Before | 76.2 | 7.3 | 16.5 | — | — | — | — | — |

TABLE 5-continued

| | | Thin film composition [at %] | | | Bs | Hc | Heat treatment temperature | Heat treatment time | Hk |
|---|---|---|---|---|---|---|---|---|---|
| | | | | | 1 kG = $10^{-1}$ T | | 1 Oe = 79.6 A$m^{-1}$ | | |
| Samples | | Fe | Zr | N | [kG] | [Oe] | [°C.] | [min] | [Oe] |
| 51 | heat treatment | | | | | | | | |
| | After heat treatment | 77.8 | 7.6 | 14.6 | 14.5 | 0.9 | 550 | 60 | 3.4 |
| No. 52 | Before heat treatment | 75.9 | 7.3 | 16.8 | — | — | — | — | — |
| | After heat treatment | 79.2 | 7.5 | 13.3 | 14.5 | 0.76 | 550 | 60 | 5.2 |
| | | 83.2 | 8.0 | 8.8 | 14.5 | 0.74 | 550 | 1140 | 0 |

Example 6

Using an alloy target having a composition $Fe_{100-y}Hf_y$, (y=5.0, 10.0, 15.0 atomic percent), radio frequency sputtering deposition was performed in a nitrogen-containing argon gas atmospheres containing 2, 4, 6, 8, 10 or 12 mole percent nitrogen, to form Fe—Hf—N amorphous thin films of various compositions on the sapphire substrate ('r' plane).

The amorphous thin films thus formed on the substrate were heat-treated for one hour in the magnetic field of 1.1 KOe at 350° C. or 550° C. to produce Fe—Hf—N soft magnetic thin films, each about 1 μm thick. The composition, the saturated magnetic flux density Bs and the coercive force Hc of the produced Fe—Hf—N soft magnetic films are drown in Table 6.

Comparative Example C4

The composition, saturation magnetic flux density Bs and the coercive force Hc of the three heat-treated thin films, produced in the same way as in Example 6 except using a sputtering atmosphere free of nitrogen, are also shown in Table 6.

Example 7

Using an alloy target having the composition $Fe_{100-y}Ta_y$, (y=5.0, 10.0, 15.0 atomic percent), radio frequency sputtering deposition was performed in an argon gas atmospheres containing 2, 4, 6, 8, 10 or 12 mole percent of nitrogen to form Fe—Ta—N amorphous thin films of various compositions on a sapphire substrate ('r' plane).

The amorphous thin films thus formed on the substrate, were heat-treated for one hour in a magnetic field of 1.1 KOe at 350° C. or 550° C. to produce Fe—Ta—N soft magnetic thin films, each about 1 μm thick. The composition, the saturation magnetic flux density Bs and the coercive force Hc of the produced Fe—Ta—N soft magnetic thin films are shown in Table 7.

Comparative Example C5

The composition, saturation magnetic flux density Bs and the coercive force Hc of the heat-treated thin films, produced in the same way as in Example 7 except using a sputtering atmosphere free of nitrogen, are also shown in Table 7.

TABLE 6

| | | Target composition [at %] | | N$_2$ in sputtering gas | Thin film composition [at %] | | | *Bs | 1 kG = $10^{-1}$ T   1 Oe = 79.6 A$m^{-1}$ Hc [Oe] | |
|---|---|---|---|---|---|---|---|---|---|---|
| Samples | | Fe | Hf | [mole %] | Fe | Hf | N | [kG] | After 350° C. heat treatment | After 550° C. heat treatment |
| Ex. 6 | 61 | 95 | 5 | 2 | — | — | — | 16.8 | 2.2 | 10.7 |
| | 62 | 95 | 5 | 4 | 85.9 | 4.0 | 10.1 | — | 17.0 | 9.9 |
| | 63 | 95 | 5 | 6 | 83.4 | 3.9 | 12.7 | — | 2.3 | 13.1 |
| | 64 | 95 | 5 | 8 | 82.2 | 3.8 | 14.0 | 15.5 | 1.51 | 4.0 |
| | 65 | 95 | 5 | 10 | 81.3 | 3.7 | 15.0 | — | 0.78 | 21.0 |
| | 66 | 90 | 10 | 2 | 81.3 | 7.5 | 11.2 | 16.3 | 2.0 | 2.0 |
| | 67 | 90 | 10 | 4 | 77.4 | 7.5 | 15.1 | 14.8 | 0.64 | 0.90 |
| | 68 | 90 | 10 | 6 | 75.4 | 7.2 | 17.4 | 14.2 | 0.88 | 0.87 |
| | 69 | 90 | 10 | 8 | 74.2 | 7.0 | 18.8 | 13.6 | 0.78 | 0.94 |
| | 70A | 90 | 10 | 10 | 73.1 | 6.8 | 15.1 | 12.9 | 0.92 | 1.13 |
| | 70B | 85 | 15 | 2 | 74.6 | 10.9 | 14.5 | 13.6 | 0.76 | 0.85 |
| C4 | C41 | 95 | 5 | 0 | 94.8 | 5.2 | 0 | — | 9.9 | 30.4 |
| | C42 | 90 | 10 | 0 | 89.8 | 10.2 | 0 | — | — | 41.5 |
| | C43 | 85 | 15 | 0 | 86.3 | 13.7 | 0 | — | — | 18.3 |

C4 = Comparative Examples C4
*after 550° C. heat treatment

TABLE 7

| | | Target composition [at %] | | N$_2$ in sputtering gas | Thin film composition [at %] | | | *Bs | 1 kG = $10^{-1}$ T   1 Oe = 79.6 A$m^{-1}$ Hc [Oe] of easy axis | |
|---|---|---|---|---|---|---|---|---|---|---|
| Samples | | Fe | Ta | [mole %] | Fe | Ta | N | [kG] | After 350° C. heat treatment | After 550° C. heat treatment |
| Ex. | 71 | 95 | 5 | 2 | 90.5 | 4.4 | 5.1 | — | 5.0 | 12.0 |

TABLE 7-continued

| | | Target composition [at %] | | $N_2$ in sputtering gas | Thin film composition [at %] | | | * Bs [kG] | 1 kG = $10^{-1}$ T  1 Oe = 79.6 Am$^{-1}$ Hc [Oe] of easy axis | |
|---|---|---|---|---|---|---|---|---|---|---|
| Samples | | Fe | Ta | [mole %] | Fe | Ta | N | | After 350° C. heat treatment | After 550° C. heat treatment |
| 7 | 72 | 95 | 5 | 4 | 87.1 | 3.9 | 9.0 | 18.0 | 14.3 | 2.12 |
| | 73 | 95 | 5 | 6 | 84.4 | 3.8 | 11.8 | 16.3 | 22.1 | 1.75 |
| | 74 | 90 | 10 | 4 | 82.1 | 8.4 | 9.5 | 14.7 | 22.9 | 5.5 |
| | 75 | 90 | 10 | 6 | 72.1 | 7.1 | 20.8 | 14.8 | 1.46 | 1.75 |
| | 76 | 90 | 10 | 8 | — | — | — | 14.0 | 9.7 | 1.38 |
| | 77 | 85 | 15 | 4 | 71.3 | 11.5 | 17.2 | 13.1 | 2.05 | 3.1 |
| | 78 | 85 | 15 | 6 | 69.8 | 11.5 | 18.7 | 14.0 | 4.7 | 0.90 |
| | 79 | 85 | 15 | 12 | — | — | — | 12.0 | 11.9 | 1.40 |
| C5 | C51 | 95 | 5 | 0 | 94.9 | 5.1 | 0 | — | 18.0 | 15.4 |
| | C52 | 90 | 10 | 0 | 89.7 | 10.3 | 0 | — | 26.7 | 47.0 |
| | C53 | 85 | 15 | 0 | 84.8 | 15.2 | 0 | — | 21.9 | — |

C5 = Comparative Examples C5
*after 550° C. heat treatment

Example 8

Using an alloy target having a composition $Fe_{100-y}Nb_y$, (y=5.0, 10.0, 15.0 atomic percent), radio frequency sputtering deposition was performed in argon gas atmospheres containing 2, 4, 6, 8 or 10 mole percent of nitrogen to form Fe—Nb—N amorphous thin films of various compositions on the sapphire substrate ('r' plane).

The amorphous thin films thus formed on the substrate were heat-treated for one hour in a magnetic field of 1.1 KOe at 350° C. or 550° C. to produce Fe—Nb—N soft magnetic thin films, each about 1 μm thick. The saturation magnetic flux density Bs and the coercive force Hc are shown in Table 8.

Comparative Example C6

The composition, saturation magnetic flux density Bs and the coercive force Hc of the heat-treated thin films, produced in the same way as in Example 8 except using the sputtering atmosphere free of nitrogen, are also shown in Table 8.

ferrite substrate was employed as the substrate. The amorphous thin film were formed on the surface of the $SiO_2$ films.

The amorphous thin films thus formed on the substrates were heat-treated in the magnetic field of 1.1 KOe at 550° C. for one hour to produce soft magnetic thin films, each being 5.9 μm thick and exhibiting uniaxial magnetic anisotropy. From the composition of the soft magnetic thin film, produced under the same conditions except using the sapphire substrate in place of the abovementioned substrate, the composition of the produced soft magnetic thin films was presumed to be $Fe_{77.8}Zr_{7.6}N_{14.6}$.

Figure 19A:
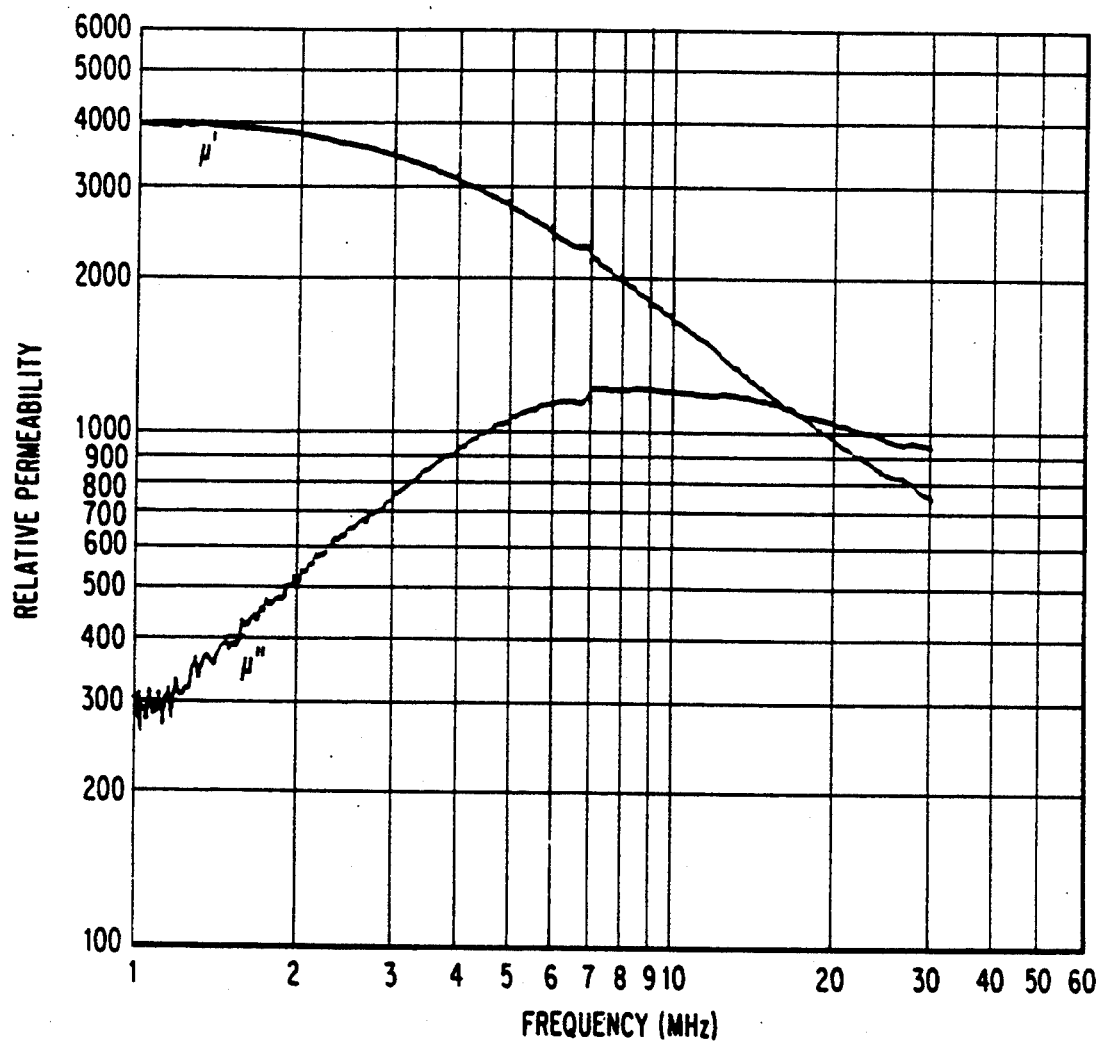
Figure 19B:
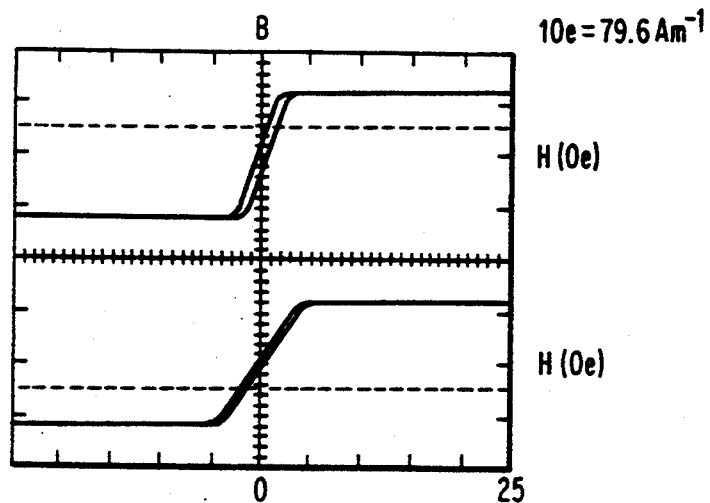

The electrical resistivity p and the Vickers hardness Hv of the produced soft magnetic thin film were 77 μΩ·cm and 1010 kgf/mm$^2$, respectively. The frequency characteristics of the magnetic permeability and the B-H curve of the produced soft magnetic thin films are shown in FIGS. 19A and 19B, respectively.

Example 10

Using a target having a composition of $Fe_{90}Hf_{10}$

TABLE 8

| | | Target composition [at %] | | $N_2$ in sputtering gas | Thin film composition [at %] | | | * Bs [kG] | 1 kG = $10^{-1}$ T  1 Oe = 79.6 Am$^{-1}$ Hc [Oe] of easy axis | |
|---|---|---|---|---|---|---|---|---|---|---|
| Samples | | Fe | Nb | [mole %] | Fe | Nb | N | | After 350° C. heat treatment | After 550° C. heat treatment |
| Ex. 8 | 81 | 95 | 5 | 2 | 92.8 | 4.0 | 3.2 | — | 4.9 | 18.1 |
| | 82 | 95 | 5 | 4 | 87.7 | 3.7 | 8.6 | 17.3 | 19.6 | 1.94 |
| | 82 | 95 | 5 | 6 | 82.9 | 3.4 | 13.7 | 16.3 | 19.9 | 8.1 |
| | 84 | 90 | 10 | 2 | 83.1 | 7.2 | 9.7 | — | 22.9 | 8.0 |
| | 85 | 90 | 10 | 4 | 79.4 | 6.6 | 14.0 | — | 8.0 | 5.0 |
| | 86 | 90 | 10 | 6 | 74.9 | 5.8 | 19.3 | 14.5 | 14.8 | 1.77 |
| | 87 | 90 | 10 | 8 | 72.4 | 5.4 | 22.2 | 14.3 | 6.9 | 1.59 |
| | 88 | 90 | 10 | 10 | 69.5 | 5.0 | 25.5 | 13.2 | 1.38 | 1.77 |
| | 89 | 90 | 10 | 12 | 67.1 | 4.7 | 28.2 | 12.7 | 0.75 | 2.2 |
| | 90 | 85 | 15 | 4 | 73.8 | 6.7 | 19.5 | 14.5 | 3.7 | 3.4 |
| | 91 | 85 | 15 | 8 | — | — | — | 13.2 | 6.2 | 1.60 |
| | 92 | 85 | 15 | 10 | — | — | — | 12.3 | 3.4 | 1.81 |
| C6 | C61 | 95 | 5 | 0 | 95.1 | 4.9 | 0 | — | 21.0 | 18.0 |
| | C62 | 90 | 10 | 0 | 91.7 | 8.3 | 0 | — | 24.3 | — |
| | C63 | 85 | 15 | 0 | 90.4 | 9.6 | 0 | — | — | — |

C6 = Comparative Examples C6
*after 550° C. heat treatment

Example 9

Using a target having the composition of $Fe_{90}Zr_{10}$ in atomic percent, radio frequency sputtering deposition was performed in argon gas atmospheres containing 0.6 mole percent nitrogen to produce an Fe—Zr—N amorphous thin film on the substrate. An $SiO_2$ film-coated (atomic percent), radio frequency sputtering deposition was performed in argon gas atmospheres containing 4.0 mole percent of nitrogen to form an Fe—Hf—N amorphous thin film on the substrate. $SiO_2$ film coated ferrite substrate was employed as the substrates. The amorphous thin films were formed on the surface of the SiO$_2$ films.

The amorphous thin films formed on the substrates, each 4.7 μm thick, were heat-treated at 550° C. in the magnetic field of 1.1 kOe to produce soft magnetic thin films. After the magnetic permeability and the anisotropic magnetic field Hk of the films were measured, additional heat treatment was performed under the same conditions as above except the heat treatment time duration, thus the heat treatment time being in total 3 hours. After the magnetic permeability and the anisotropic magnetic field were again measured, additional heat treatment was performed under the same conditions as above except the heat treatment duration, thus the heat treatment time being in total 6 hours. The magnetic permeability and the anisotropic magnetic field Hk were measured. As compared with the composition of the soft magnetic thin films obtained under the same conditions except using the sapphire substrate in place of the above mentioned SiO$_2$-coated substrate and the film thickness of 1 μm, the compositions of two of the produced three soft magnetic thin films were assumed to be Fe$_{77.4}$Hf$_{7.9}$N$_{15.1}$ (with 1-hour heat treatment) and Fe$_{82.6}$Hf$_{7.7}$N$_{9.7}$ (with 6-hour heat treatment), respectively.

Figure 20A:
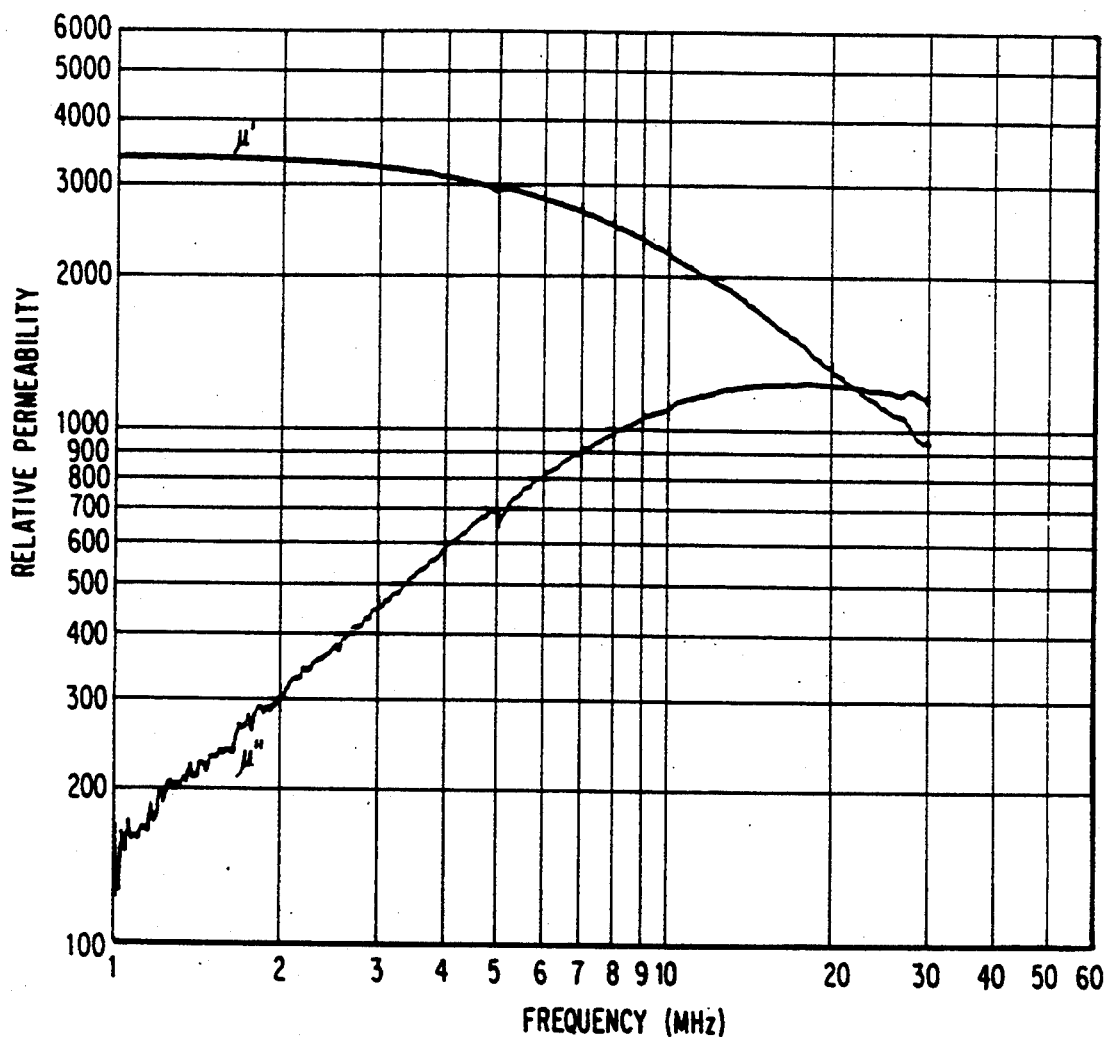
Figure 20B:
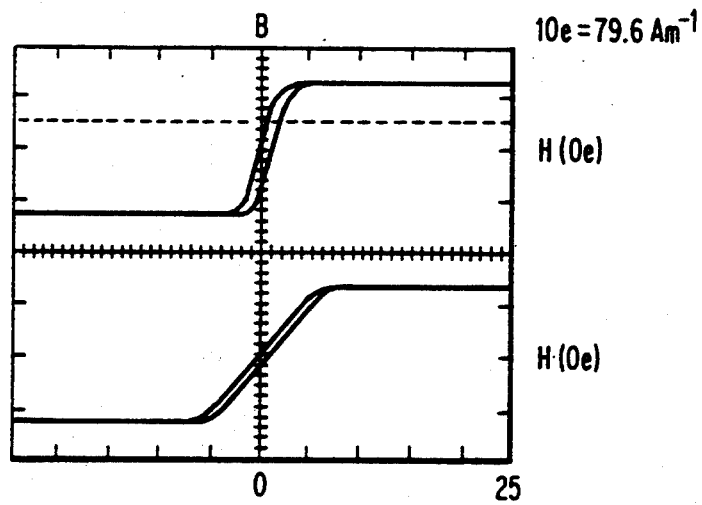

The electrical resistivity p and the Vickers hardness Hv of the produced soft magnetic thin films (6-hour heat treatment) were 60 μΩ·cm and 1100 kgf/mm$^2$, respectively. The frequency characteristics of the magnetic permeability and the B-H curves of the soft magnetic thin films (6-hour heat treatment) are shown in FIGS. 20A and 20B, respectively.

Figure 20C:
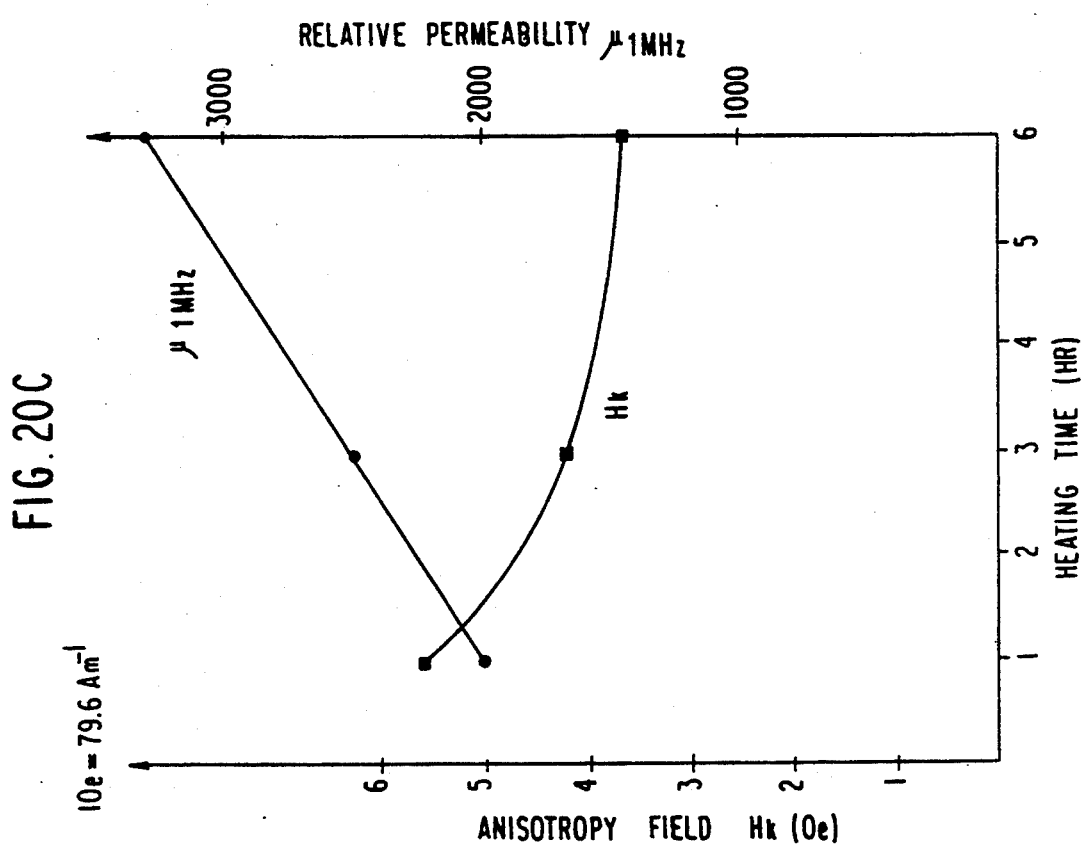
FIG. 20C shows changes in magnetic permeability and anisotropic magnetic field Hk of the Fe—Hf—N soft magnetic thin film with respect to the heat treatment time of the Fe—Zr—N amorphous thin film.

The magnetic permeability at 1 MHz and the anisotropic magnetic field Hk for the three heat treatment stages are shown in FIG. 20C, which illustrates changes in the magnetic permeability μ$_{1MHz}$ and anisotropic magnetic field Hk of the Fe—Hf—N thin films as a function of heat treating time.

Example 11

Using a target having the composition of Fe$_{85}$Ta$_{15}$ atomic percent, radio frequency sputtering deposition was performed in an argon gas atmosphere containing 6.0 mole percent of nitrogen to produce an Fe—Ta—N amorphous thin film. SiO$_2$-coated ferrite substrates were employed as the substrates. The amorphous thin films were formed on the SiO$_2$ thin films.

The amorphous thin films formed on the substrates were heat-treated at 550° C. in the magnetic field of 1.1 kOe for one hour to produce soft magnetic thin films, each having 5.6 μm thick and exhibiting uniaxial magnetic anisotropy. As compared with the composition of a soft magnetic thin film, obtained under the same conditions except using a sapphire substrate in place of the above mentioned SiO$_2$-coated substrate, the composition of the produced soft magnetic thin film was presumed to be Fe$_{69.8}$Ta$_{11.5}$N$_{18.7}$.

The electrical resistivity p and the Vickers hardness Hv of the produced soft magnetic thin film were 86 μΩ·cm and 1220 kgf/mm$^2$, respectively. The frequency characteristics of the magnetic permeability and the produced soft magnetic thin film and its B-H curve are shown in FIGS. 21A and 21B, respectively.

Reference Example

Using alloy targets having compositions of Fe$_{85}$Hf$_{15}$, Fe$_{90}$Ta$_{10}$, Fe$_{85}$Ta$_{15}$ or Fe$_{85}$Nb$_{15}$ (atomic percent), radio frequency sputtering deposition was performed in argon gas atmospheres containing 4, 6, 8, 10, 12 or 15 mole percent of nitrogen to produce amorphous thin films of various compositions on the sapphire substrate ('r' plane).

The amorphous thin films thus formed on the substrate were heat-treated for one hour at 350° C. or 550° C. in the magnetic field of 1.1 kOe to produce Fe—Hf—N, Fe—Ta—N or Fe—Nb—N soft magnetic thin films with the N content exceeding 22 atomic percent and with the film thickness being approximately 1 μm. The composition, the saturation magnetic flux density Bs and the coercive force Hc of these soft magnetic thin films are shown in Table 9. It is seen from Table 9 that, with N and Fe in the thin film exceeding 22 atomic percent and lower than 71 atomic percent, respectively, the saturation magnetic flux density Bs tends to be lowered with decrease in the Fe content.

TABLE 9

1 kG = 10$^{-1}$ T   1 Oe = 79.6 Am$^{-1}$

| Reference Example | Target composition [at %] Fe | Target composition [at %] X | N$_2$ in sputtering gas [mole %] | Thin film composition [at %] Fe | Thin film composition [at %] X | Thin film composition [at %] N | * Bs [kG] | Hc [Oe] After 350° C. heat treatment | Hc [Oe] After 550° C. heat treatment |
|---|---|---|---|---|---|---|---|---|---|
| No. R1  | 85 | 15 | 4  | 67.3 | 10.0 | 22.7 | 12.5 | 0.82 | 0.97 |
| No. R2  |    |    | 6  | 66.1 | 9.9  | 24.0 | 12.4 | 0.91 | 1.28 |
| No. R3  |    |    | 8  | 64.8 | 9.8  | 25.4 | 11.2 | 0.96 | 1.45 |
| No. R4  |    |    | 10 | 63.4 | 9.7  | 26.9 | 10.0 | 1.01 | 1.51 |
| No. R5  |    |    | 12 | 62.2 | 9.5  | 28.3 | 9.7  | 1.07 | 1.66 |
| No. R6  | 90 | 10 | 10 | 70.1 | 7.0  | 22.9 | 13.3 | 4.3  | 1.35 |
| No. R7  |    |    | 12 | 64.6 | 6.5  | 28.9 | 12.2 | 0.82 | 2.04 |
| No. R8  |    |    | 15 | 63.2 | 6.3  | 30.5 | —    | 1.18 | 9.5  |
| No. R9  | 85 | 15 | 10 | 66.9 | 10.8 | 22.3 | 12.9 | 10.1 | 1.38 |
| No. R10 |    |    | 15 | 60.7 | 10.0 | 29.3 | 10.7 | 5.1  | 2.16 |
| No. R11 | 85 | 15 | 6  | 70.5 | 6.2  | 23.3 | 13.8 | 11.6 | 1.62 |
| No. R12 |    |    | 12 | 63.7 | 5.2  | 31.2 | 11.9 | 2.2  | 1.85 |
| No. R13 |    |    | 15 | 58.4 | 4.6  | 36.6 | 10.0 | 0.93 | 14.8 |

X = Hf for Nos. R1 to R5 of Ref. Ex.
X = Ta for Nos. R6 to R10 of Ref. Ex.
X = Nb for Nos. R11 to R13 of Ref. Ex.
*after 550° C. heat treatment By referring to the drawings, examples of the magnetic head of the present invention will be explained hereinbelow.

Example 12

Figure 8:
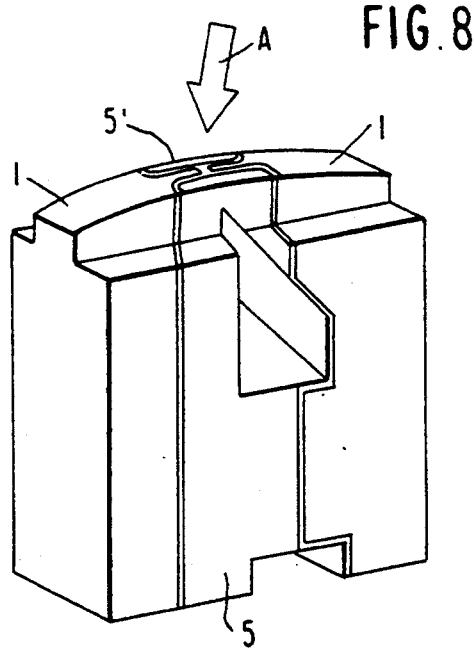
FIG. 8 is an enlarged diagrammatic perspective view showing the end part of a composite magnetic head according to the present invention.
Figure 9:
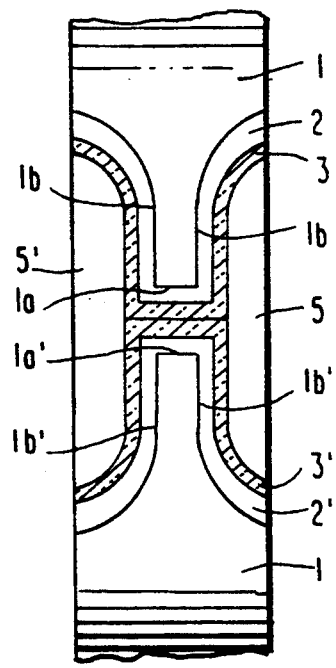
FIG. 9 is an enlarged diagrammatic view, viewed along an arrow A in FIG. 8 showing an embodiment of the composite magnetic head according to the present invention.

FIG. 8 is an enlarged perspective view showing an embodiment of a composite magnetic head according to the present invention, and FIG. 9 is an enlarged end view of the composite magnetic head viewed along the arrow A of FIG. 8, and showing the end face of the head directing to the magnetic recording medium.

A ferrite core 1 has end faces opposing to each other 1a, 1a' and recesses 1b, 1b' set back from the opposing end faces, and is formed of core halves bonded to each other at a junction, not shown in the Figure. The opposing end faces 1a, 1a' of the ferrite core and the recesses 1b, 1b', set back from these end faces 1a, 1a', are provided with the soft magnetic layers 2, 2' according to the present invention and $SiO_2$ layers 3, 3' constituting a gap, wherein the soft magnetic layers 2, 2' form a part of the core of the magnetic head. The portions of the soft magnetic layers interposed between the end faces 1a, 1a' of the ferrite core face each other and the magnetic gap is formed between the opposing surfaces of the soft magnetic layers. Those portions of the $SiO_2$ layers provided on the end faces and/or recesses of the ferrite core with interposition of the soft magnetic layer are connected to portions filled with glass 5, 5'.

As the soft magnetic layers, the following three soft magnetic layers are employed.

(i) a soft magnetic layer having a composition of $Fe_{80.9}Zr_{6.5}N_{12.6}$ and exhibiting uniaxial magnetic anisotropy, (ii) a soft magnetic layer having a composition $Fe_{82.6}Hf_{7.7}N_{9.7}$ and exhibiting uniaxial magnetic anisotropy, (iii) a soft magnetic layer having a composition $Fe_{69.8}Ta_{11.5}N_{18.7}$ and exhibiting uniaxial magnetic anisotropy.

A typical 2 method for preparing a composite magnetic head shown in FIGS. 8 and 9 will be explained briefly.

A soft magnetic layer 2 is formed by a method shown in the above preparation example of the soft magnetic thin film, or a method similar thereto, in one of opposing end faces 1a of a ferrite core half and a recess 1b set back from the opposing end face 1a. An $SiO_2$ layer is then formed on the soft magnetic layer by a method known per se. A multilayer core half is now completed, which is comprised of the ferrite core half and the above mentioned two layers formed on the ferrite core half. A counterpart multilayer core half constituting the magnetic head together with the above described multilayer core half is produced in the similar manner.

The two multilayer core halves, obtained as described above, are abutted in a predetermined direction and fused glass is charged into the recesses of the core halves and allowed to cool in situ to unify the core halves together to produce the composite magnetic head as shown in the drawing.

Example 13

Figure 10:
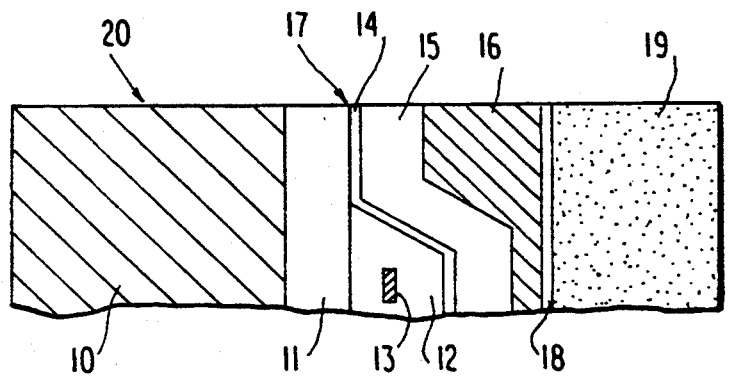
FIG. 10 is an enlarged diagrammatic cross-sectional view showing an embodiment of the thin film magnetic head according to the present invention, taken along the gap depth direction.

FIG. 10 is an enlarged diagrammatic cross-sectional view of another embodiment of the thin film magnetic head of the present invention, extending in the gap depth direction (in the direction normal to the head surface directed to the recording medium). The following description is made by referring to this Figure.

A ferrite core substrate 10 has a lower soft magnetic layer 11, an insulating layer 12, a coil conductor layer 13 and an upper soft magnetic layer 15. A magnetic gap layer 14 reaching a head surface 20 directed to the recording medium is interposed between the lower soft magnetic layer 11 and the upper soft magnetic layer 15. A protective layer 16 for protecting the soft magnetic layer is provided on the other surface of the upper soft magnetic layer 15. The protective layer 16 is bonded by a bonding glass layer 18 to a protective plate 19.

As the soft magnetic layers, the three soft magnetic layers the same as employed in Example 12 are employed.

A typical method for producing the thin film magnetic head shown in FIG. 10 will be now explained briefly.

The lower soft magnetic layer 11 is formed on the ferrite base plate 10 to a thickness of 10 μm. The lower soft magnetic film 11 is formed by the aforementioned preparation example for soft magnetic thin films or by the similar method. After the non-magnetic insulating layer 12 of, e.g., $SiO_2$ and the coil conductor layer 13 of, e.g., Cu or Al are formed at prescribed positions on the lower soft magnetic layer 11, the non-magnetic insulating layer 12, inclusive of the coil conductor layer 13, is etched to a substantially trapezoidal cross-section by ion milling or the similar method. The gap layer 14 is then formed and removed beyond a predetermined point towards the lower part of FIG. 10, not shown, at which the lower soft magnetic layer is to be directly combined with the upper magnetic layer 15, which is subsequently formed to a thickness of 10 μm by the method similar to that for forming the lower magnetic layer 11 so as to be unified at the above mentioned predetermined point (not shown) with the lower soft magnetic layer 11.

The protective layer 16 is then formed on the upper soft magnetic layer 15.

The protective layer 16 thus formed is flattened and bonded to the protective plate 19 by means of a bonding glass layer 18 formed of a $SiO_2$—PbO—$B_2O_3$ type glass. The head surface 20 directed to the recording medium is then flattened to complete the thin film magnetic head according to an embodiment of the present invention.

Example 14

Figure 11:
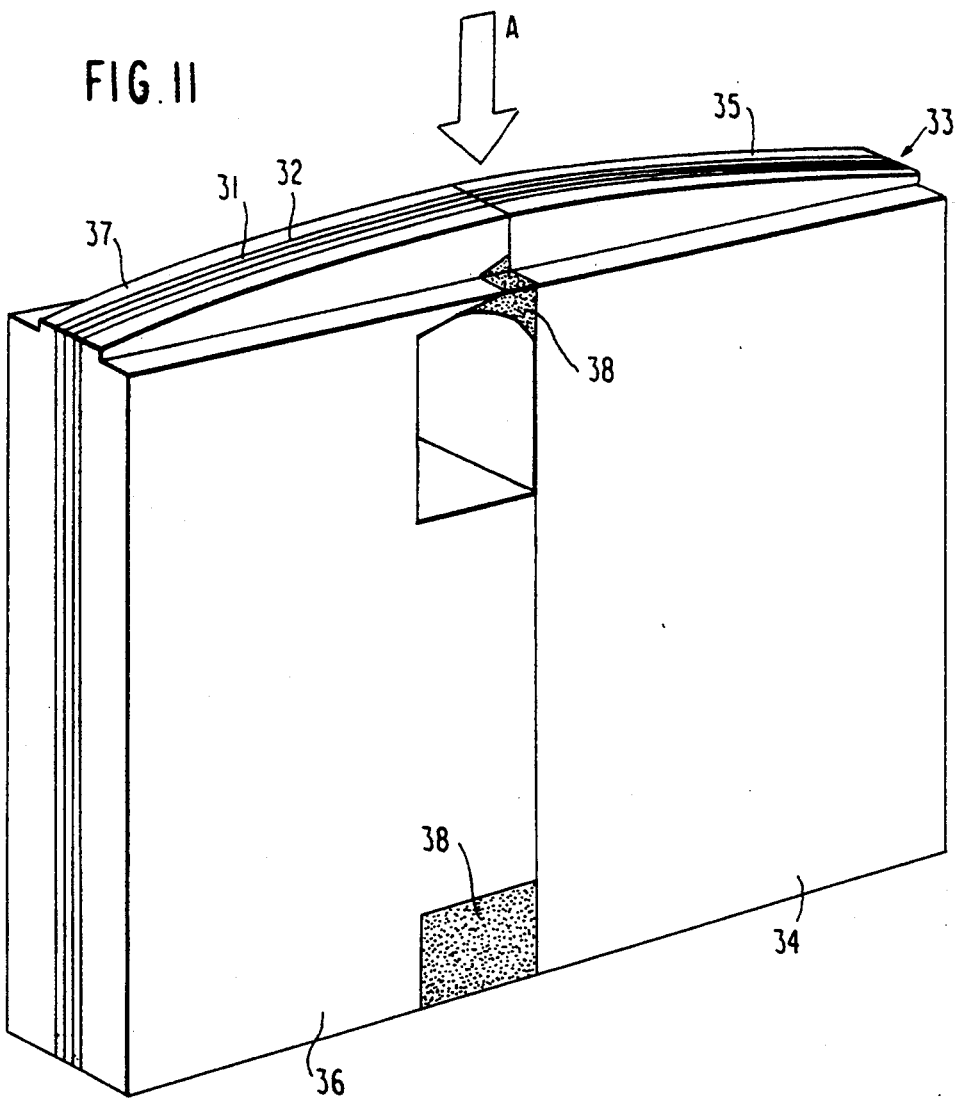
FIG. 11 is an enlarged perspective view showing an end part of an embodiment of the composite magnetic head of the present invention.
Figure 12:
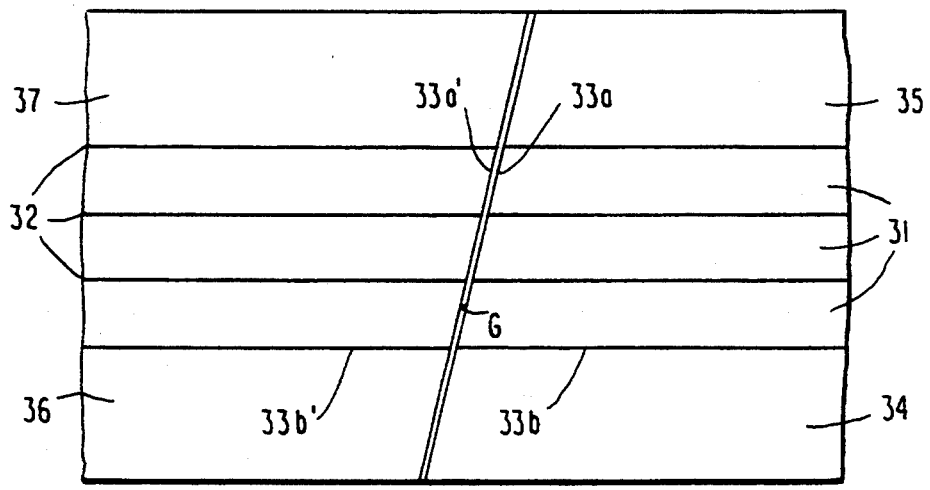
FIG. 12 is an enlarged diagrammatic view, viewed along an arrow in FIG. 11 showing the composite magnetic head.

FIG. 11 is an enlarged cross-sectional view showing the end part of a farther embodiment of a composite magnetic head according to an embodiment of the present invention, and FIG. 12 is an enlarged diagrammatic view, as viewed along the arrow A, of the surface of the composite magnetic head facing the recording medium.

A magnetic head core 33 is formed by alternately laminating soft magnetic layers 31 and insulating layers 32 of, e.g., $SiO_2$, and is provided with opposing end faces 33a, 33a' and recesses 33b, 33b' set back from these opposing end faces on which end faces of the soft magnetic layers are exposed. Thus the major portion of the opposing surfaces are formed by the end faces of the soft magnetic layers. A gap layer G formed of $SiO_2$ is formed between the opposing surfaces. The lateral sides of the magnetic head core 33 are connected to non-magnetic substrate portions 34–37. Glass-fill sections 38 are disposed (and filled with glass) between the non-magnetic substrate portions 34, 36 to enhance the bonding strength of the overall magnetic head.

The magnetic head of the present embodiment has the soft magnetic layer of a higher hardness as compared with the conventional magnetic head, so that, even with the above mentioned composite magnetic head, its surface facing the recording medium exhibits a higher wear resistance, i.e., higher durability.

As the soft magnetic layers, the three soft magnetic layers aforementioned in Example 12 are employed.

Example 15

Figure 22:
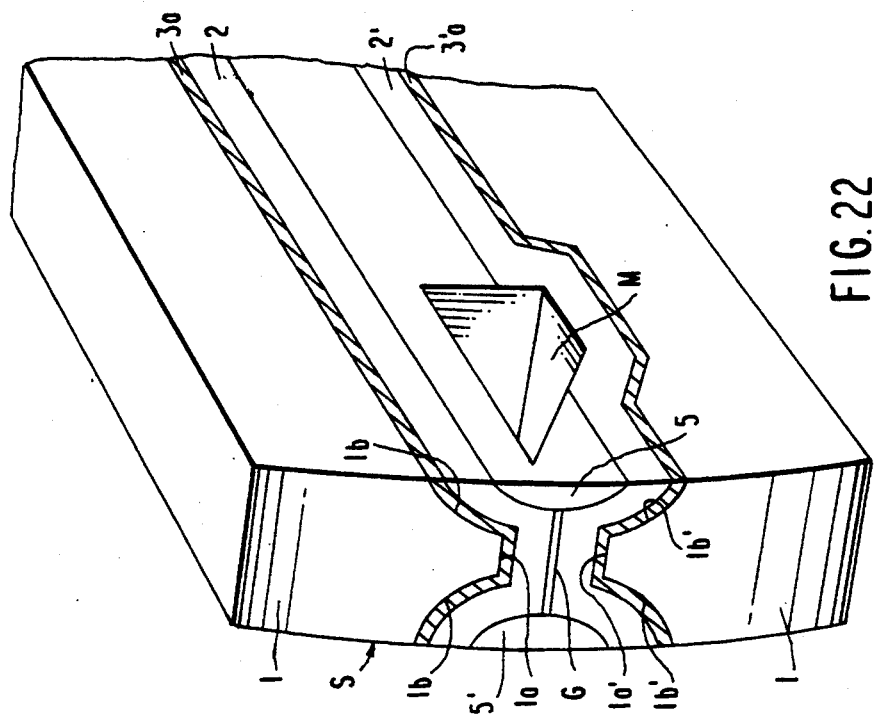
FIG. 22A is a perspective view showing the end part of an embodiment of the composite magnetic head of the present invention.

FIG. 22 is an enlarged perspective view showing the end part of the composite magnetic head, wherein S denotes a surface directed to the recording medium.

A ferrite core 1 is provided with opposing end faces 1a, 1a' and recesses 1b, 1b' set back from the opposing end faces, and is formed as a unitary structure by bonding at a predetermined position, not shown. The opposing end faces 1a, 1a' and the recesses 1b, 1b' receded from the opposing end faces are sequentially provided with diffusion preventive $SiO_2$ layers 3a, 3a', each 5 nm (50 Å) thick, and soft magnetic layers 2, 2' having the composition specified by the present invention. Here, the diffusion preventive layers 3a, 3a' are very thin such that the soft magnetic layers 2, 2' form a part of the magnetic head core. The portions of the soft magnetic layers existing between the opposing end faces 1a, 1a' of the ferrite core 1 opposite to each other and an $SiO_2$ gap G 200 nm (2000 Å) thick is formed between the opposing end faces of the soft magnetic layers. The portions of the soft magnetic layers provided at the opposing end faces (or additionally recesses of the ferrite core by the interposition of the $SiO_2$ diffusion preventive layer are unified with glasses 5, 5'. M denotes a groove for winding a coil, not shown.

As the soft magnetic layers, the three soft magnetic layers such as those employed in Example 12 can be employed.

A typical method for preparing the composite magnetic head shown in FIG. 22 will be hereinafter explained.

An $SiO_2$ layer 3a, serving as the diffusion preventive layer, is formed by a vapor deposition method, such as sputtering, on the end faces 1a and the recesses 1b receded from the end faces 1a of the ferrite core halves, and soft magnetic layers 2 are formed on the surfaces of the $SiO_2$ layers 3a by a method shown in the preparation example of the soft magnetic thin film or similar methods.

These soft magnetic layers 2 were formed by providing non-soft-magnetic amorphous alloy films on the ferrite core halves, by the interposition of $SiO_2$ diffusion preventive layers 3a, and heat-treating the alloy films at about 550° C. for one hour. No diffusion layers were formed between the ferrite core halves and the soft magnetic layer 2. Then, $SiO_2$ layers each having a thickness about half that of the gap G were formed on the surfaces of the soft magnetic layers formed on the end faces 1a of the ferrite core halves by the interposition of the $SiO_2$ layers 3a. In this manner, a multi-layered composite magnetic head half is provided consisting of the aforementioned three kinds of soft magnetic layers formed on the ferrite core half. A counterpart multilayered composite magnetic head half may also be produced in the similar manner.

The multilayered composite magnetic head halves are abutted in a predetermined direction and fused glasses are filled in the recesses of the head halves and cooled in situ to unify the head halves to produce the composite magnetic head.

Comparison of Periodic Fluctuation of Playback Characteristics

Figure 25:
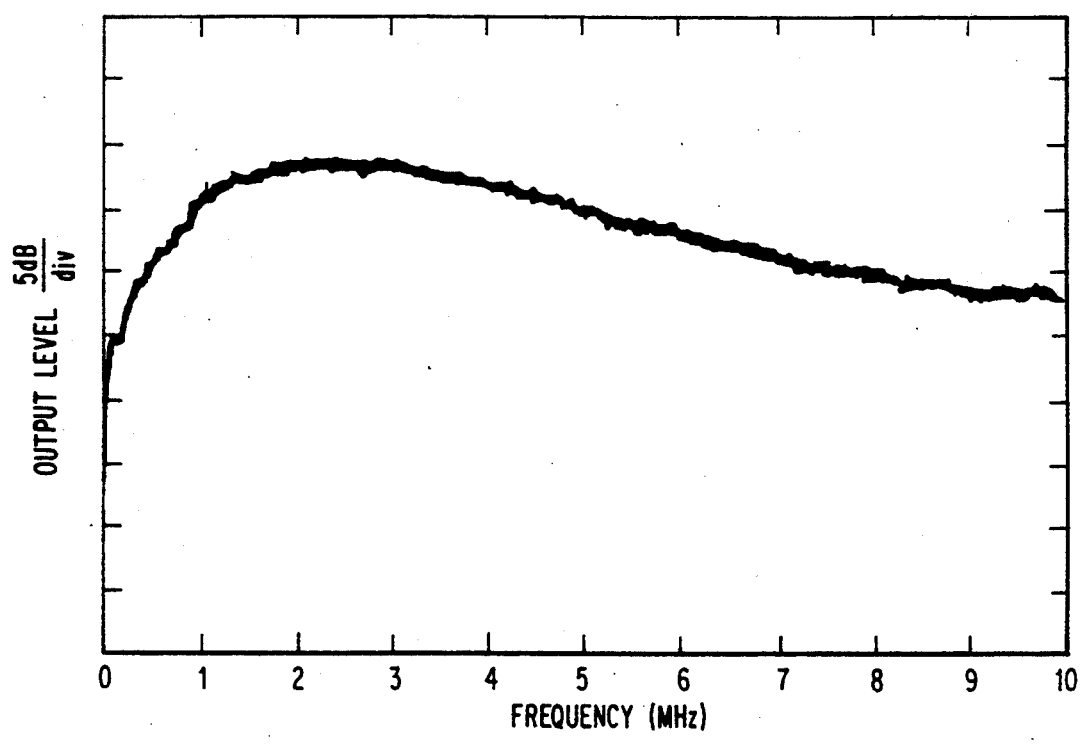
FIG. 25 shows frequency characteristics of reproduced signals of an embodiment of the composite magnetic head of the present invention.

Similarly to the above described method for preparing the composite magnetic head of the present invention, a magnetic head having $SiO_2$ diffusion preventive layers 5 nm (50 Å) in thickness, provided at an interface between the ferrite core and the $Fe_{80.9}Zr_{6.5}N_{12.6}$ soft magnetic layers, was produced. FIG. 25 shows the frequency characteristics of playback (reproducing) signals of the composite magnetic head. It is seen from FIG. 25 that the fluctuations of the frequency characteristics (beat) of the playback signals are suppressed to 1 dB or less.

Figure 26:
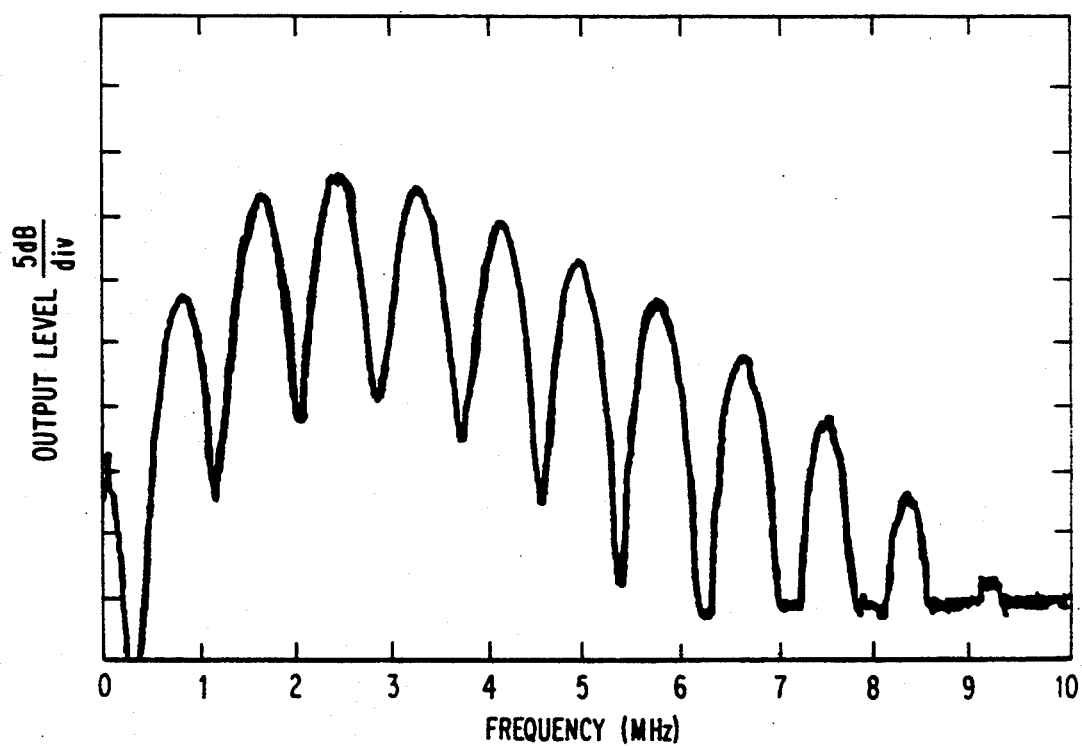
FIG. 26 shows frequency characteristics of reproduced signals of the composite magnetic head in which the interdiffused layer is formed.
Figure 27:
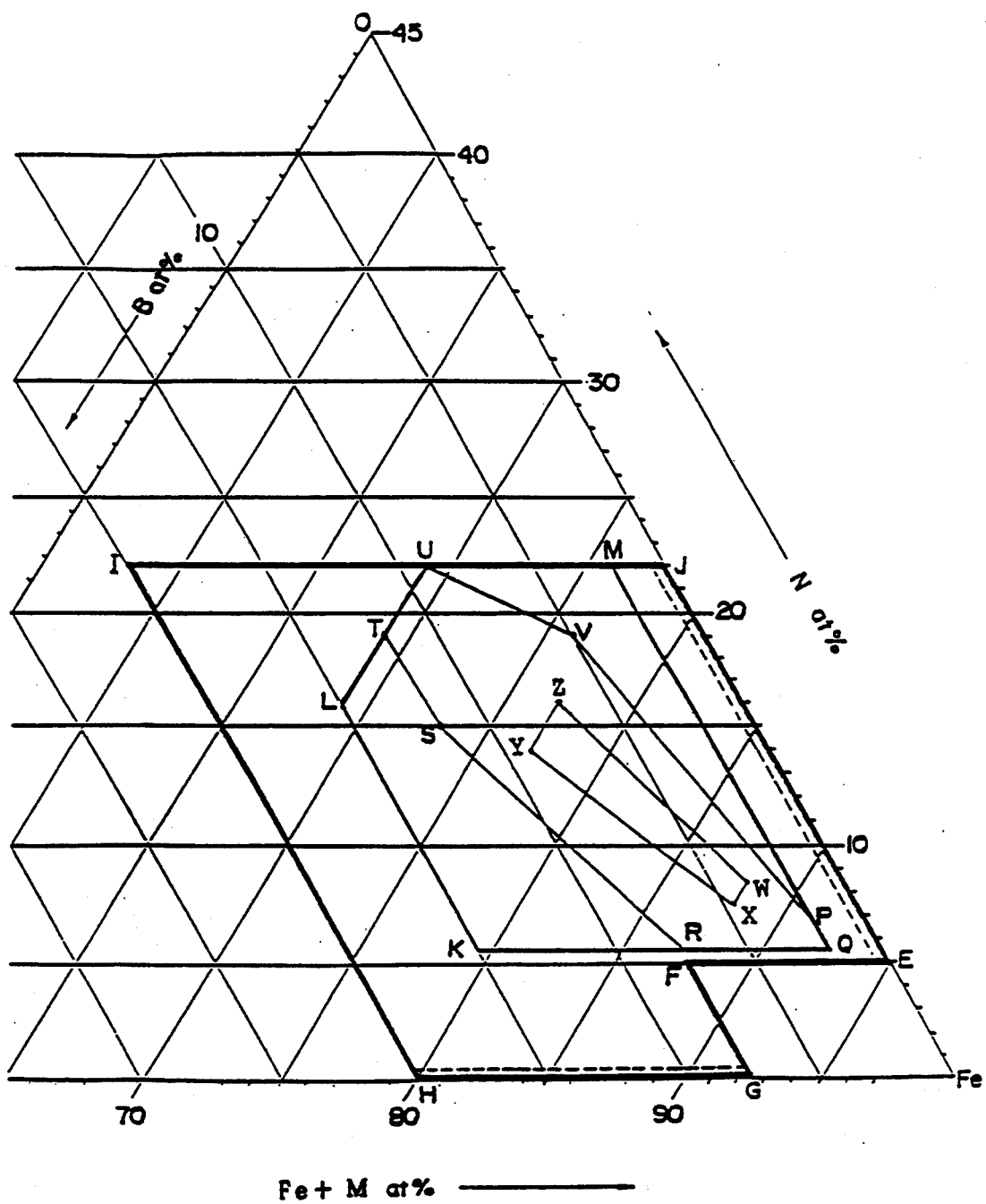
FIG. 27 shows the composition of the soft magnetic thin film according to the present invention.

Another composite magnetic head was produced in the same way as the aforementioned preparation example except that no diffusion preventive layers are interposed. Therefore, an interdiffusion layer having deteriorated magnetic properties was formed at the interface between the ferrite core and the soft magnetic layer. FIG. 26 shows the frequency characteristics of the playback signals of the composite magnetic head. It is seen from FIG. 26 that the fluctuations of the frequency characteristics of the reproduced signals are as high as about 20 dB.

In measuring the frequency characteristics of the playback signals of the composite magnetic heads, the relative speed was set to 6.7 m/s, and the recording medium coated with metal magnetic powders (trade name: FUJIX VIDEOFLOPPY HR) was used as the recording medium.

Examples of the Second and Third Aspects of the Invention

The effects of the second and third aspects of the present invention are hereinafter explained with reference to the following Examples.

Example 16

Using a target having a composition $Fe_{90-m}Co_mZr_{10}$ (m=1.5, 3.0 or 4.5 atomic percent), radio frequency sputtering was carried out in nitrogen containing argon gas atmospheres containing 0.0, 2.5, 5.0, 7.5, 10.0 and 12.5 mol percents of nitrogen to produce Fe—Co—Zr—N amorphous thin films of various compositions. These amorphous thin films were heat-treated in a magnetic field under conditions of 350° C.×1 hour or 550° C.×1 hour to produce various Fe—Co—Zr—N soft magnetic thin films. The results are shown in Table 10. The amount (%) of Zr in the total metal atoms (Fe, Co and Zr) in the soft magnetic thin film obtained by heat treatment at 550° C.×one hour, and the Ni/Zr ratio, are also shown in Table 10. The coercivity Hc, the anisotropic magnetic field Hk and the saturation magnetostriction λs, are also shown as magnetic properties of the soft magnetic thin films.

TABLE 10

COMPOSITION AND MAGNETIC PROPERTIES OF Fe—Co—Zr—N BASED FILMS

| Ex. 1 | | Sputtering conditions | | | Film composition after 550° C. × 1 H heat treatment | | | | Zr % in total metal atoms | N/Zr ratio N/Zr | After 500° C × 1 H heat treatment | | | After 350° C. × 1 H heat treatment | | |
|---|---|---|---|---|---|---|---|---|---|---|---|---|---|---|---|---|
| | | Target composition [at %] | | | N$_2$ Gas concentration in sputtering gas | | [at %] | | | | | | | | | |
| | Fe | Co | Zr | | Fe | Co | Zr | N | | | Hc [Oe] | Hk [Oe] | λs | Hc [Oe] | Hk [Oe] | λs |
| No. 1 | 88.5 | 1.5 | 10.0 | 0.0 | 88.6 | 1.6 | 9.3 | 0.5 | 9.3 | 0.05 | 13.4 | | | 32.9 | | |
| 2 | 88.5 | 1.5 | 10.0 | 2.5 | 79.5 | 1.4 | 6.8 | 12.3 | 7.8 | 1.81 | 6.6 | | | 8.4 | | |
| 3 | 88.5 | 1.5 | 10.0 | 5.0 | 80.3 | 1.4 | 6.4 | 11.9 | 7.3 | 1.86 | 1.1 | 3.9 | 2.9E-07 | 0.7 | 6.8 | 2.1E-06 |
| 4 | 88.5 | 1.5 | 10.0 | 7.5 | 79.0 | 1.4 | 6.6 | 13.0 | 7.6 | 1.97 | 1.1 | | | 0.8 | 8.2 | 2.5E-06 |
| 5 | 88.5 | 1.5 | 10.0 | 10.0 | 80.5 | 1.4 | 6.5 | 11.6 | 7.4 | 1.78 | 1.0 | 2.6 | 2.2E-07 | 0.7 | 13.2 | 4.3E-06 |
| 6 | 88.5 | 1.5 | 10.0 | 12.5 | 80.9 | 1.4 | 6.2 | 11.5 | 7.0 | 1.85 | 0.9 | 2.4 | 1.9E-07 | 0.8 | 14.8 | 4.9E-06 |
| 7 | 87.0 | 3.0 | 10.0 | 0.0 | 87.5 | 3.3 | 7.9 | 1.3 | 8.0 | 0.16 | 11.2 | | | 34.6 | | |
| 8 | 87.0 | 3.0 | 10.0 | 2.5 | 79.7 | 2.9 | 6.4 | 11.0 | 7.2 | 1.72 | 6.5 | | | 10.1 | | |
| 9 | 87.0 | 3.0 | 10.0 | 5.0 | 78.5 | 2.8 | 6.2 | 12.5 | 7.1 | 2.02 | 1.0 | 5.4 | 7.3E-07 | 0.7 | 8.6 | 2.6E-06 |
| 10 | 87.0 | 3.0 | 10.0 | 7.5 | 78.5 | 2.8 | 6.5 | 12.2 | 7.4 | 1.88 | 1.1 | 5.1 | 6.6E-07 | 0.7 | 9.8 | 3.0E-06 |
| 11 | 87.0 | 3.0 | 10.0 | 10.0 | 80.2 | 2.9 | 6.6 | 10.3 | 7.4 | 1.56 | 1.2 | 4.4 | 6.0E-07 | 0.8 | 18.5 | 6.6E-06 |
| 12 | 87.0 | 3.0 | 10.0 | 12.5 | 78.6 | 2.9 | 6.6 | 11.9 | 7.5 | 1.80 | 1.0 | 4.6 | 6.2E-07 | 0.7 | 16.4 | 5.8E-06 |
| 13 | 85.5 | 4.5 | 10.0 | 0.0 | 82.9 | 4.6 | 7.6 | 4.9 | 8.0 | 0.64 | 6.9 | | | 1.3 | | |
| 14 | 85.5 | 4.5 | 10.0 | 2.5 | 78.5 | 4.3 | 6.7 | 10.6 | 7.5 | 1.57 | 4.2 | | | 12.1 | | |
| 15 | 85.5 | 4.5 | 10.0 | 5.0 | 79.4 | 4.3 | 6.9 | 9.4 | 7.6 | 1.36 | 1.5 | 8.4 | 1.1E-06 | 1.0 | 10.7 | 3.4E-06 |
| 16 | 85.5 | 4.5 | 10.0 | 7.5 | 82.7 | 4.5 | 6.9 | 5.9 | 7.3 | 0.86 | 1.3 | 7.1 | 1.0E-06 | 4.0 | | |
| 17 | 85.5 | 4.5 | 10.0 | 10.0 | 78.4 | 4.2 | 6.8 | 10.6 | 7.6 | 1.56 | 1.3 | 9.4 | 1.3E-06 | 0.9 | 17.5 | 5.9E-06 |
| 18 | 85.5 | 4.5 | 10.0 | 12.5 | 76.4 | 4.2 | 6.6 | 12.8 | 7.6 | 1.94 | 1.3 | 11.1 | 1.6E-06 | 0.9 | 17.8 | 5.8E-06 |

Example 17

Amorphous thin films of various compositions were produced in the same manner as in Example 18. These amorphous thin films were heat-treated in a magnetic field at 550° C. for 1, 2, 3 and 4 hour to produce various soft magnetic thin films. The results as well as various properties of the produced soft magnetic thin films are shown in Table 11.

Reference Example

Fe—Zr—N amorphous thin films were produced by high frequency sputtering in a nitrogen-containing argon gas atmosphere containing 8.0 mol percent of nitrogen, using a target having a composition of Fe$_{90.0}$Zr$_{10.0}$, and, the produced thin films were heat-treated in the magnetic field at 550° C. for 1, 2, 3 and 4 hours to produce the Fe—Zr—N soft magnetic thin films. The results are shown in Table 11.

TABLE 11

COMPOSITION AND MAGNETIC PROPERTIES OF Fe—Co—Zr—N BASED FILMS

| | | Sputtering conditions | | | | Film composition after 550 × 1 H heat treatment | | | | | |
|---|---|---|---|---|---|---|---|---|---|---|---|
| | | Target composition [at %] | | | N$_2$ Gas concentration in sputtering gas | [at %] | | | | Zr % in total metal atoms | Nitrogen/ Zr ratio N/Zr |
| | | Fe | Co | Zr | | Fe | Co | Zr | N | | |
| Ex. 2 | No. 1 | 88.5 | 1.5 | 10.0 | 5.0 | 78.3 | 1.3 | 6.5 | 13.9 | 7.5 | 2.15 |
| | 2 | 88.5 | 1.5 | 10.0 | 7.5 | 81.0 | 1.3 | 6.7 | 11.0 | 7.5 | 1.65 |
| | 3 | 88.5 | 1.5 | 10.0 | 10.0 | 81.0 | 1.4 | 6.6 | 11.0 | 7.4 | 1.66 |
| | 4 | 88.5 | 1.5 | 10.0 | 12.5 | 81.7 | 1.3 | 6.7 | 10.3 | 7.5 | 1.54 |
| | 5 | 87.0 | 3.0 | 10.0 | 5.0 | 77.9 | 2.8 | 6.7 | 12.6 | 7.6 | 1.89 |
| | 6 | 87.0 | 3.0 | 10.0 | 7.5 | 79.6 | 2.8 | 6.7 | 10.9 | 7.5 | 1.62 |
| | 7 | 87.0 | 3.0 | 10.0 | 10.0 | 79.9 | 2.8 | 6.8 | 10.5 | 7.6 | 1.55 |
| | 8 | 87.0 | 3.0 | 10.0 | 12.5 | 80.1 | 2.8 | 6.8 | 10.3 | 7.6 | 1.50 |
| | 9 | 85.5 | 4.5 | 10.0 | 5.0 | 75.4 | 4.1 | 6.6 | 13.9 | 7.6 | 2.12 |
| | 10 | 85.5 | 4.5 | 10.0 | 7.5 | 73.6 | 4.0 | 6.5 | 15.9 | 7.7 | 2.46 |
| | 11 | 85.5 | 4.5 | 10.0 | 10.0 | 74.7 | 4.0 | 6.5 | 14.8 | 7.7 | 2.27 |
| | 12 | 85.5 | 4.5 | 10.0 | 12.5 | 74.4 | 4.0 | 6.6 | 15.0 | 7.8 | 2.28 |
| Ref. Ex. | | 90.0 | — | 10.0 | 6.0 | 83.3 | — | 7.2 | 9.5 | 8.0 | 1.32 |

| | | λs after 500° C. heat treatment [× 10$^{-7}$] | | | | Hk(h) after 500° C. heat treatment [Oe] | | | | Bs [kG] |
|---|---|---|---|---|---|---|---|---|---|---|
| | | After 1H heat treatment | After 2H heat treatment | After 3H heat treatment | After 4H heat treatment | After 1H heat treatment | After 2H heat treatment | After 3H heat treatment | After 4H heat treatment | After 4H heat treatment |
| Ex. 2 | No. 1 | 10.0 | 6.5 | 3.6 | 3.1 | 4.1 | 3.7 | 2.9 | 2.6 | 16.1 |
| | 2 | 6.5 | 0.6 | 0.3 | 0.0 | 3.7 | 2.2 | 2.0 | 2.1 | 15.9 |
| | 3 | 12.0 | 0.3 | 0.5 | 0.6 | 5.9 | 1.9 | 2.0 | 2.1 | 16.1 |

TABLE 11-continued

COMPOSITION AND MAGNETIC PROPERTIES OF Fe—Co—Zr—N BASED FILMS

|  |  |  |  |  |  |  |  |  |
|---|---|---|---|---|---|---|---|---|
| 4 | 6.9 | 0.3 | 0.3 | 0.4 | 4.8 | 1.8 | 1.9 | 1.8 | 15.8 |
| 5 | 6.3 | 6.0 | 6.0 | 6.5 | 2.4 | 2.3 | 2.3 | 2.4 | 16.5 |
| 6 | 5.7 | 4.4 | 4.2 | 5.6 | 2.4 | 2.5 | 2.7 | 2.5 | 15.9 |
| 7 | 6.1 | 4.6 | 5.4 | 4.7 | 2.6 | 3.6 | 2.3 | 2.8 | 16.0 |
| 8 | 5.6 | 5.0 | 5.6 | 5.3 | 2.3 | 2.3 | 2.2 | 3.5 | 15.8 |
| 9 | 10.0 | 8.1 | 8.5 | 9.9 | 2.6 | 2.7 | 3.3 | 2.5 | 16.8 |
| 10 | 9.4 | 9.8 | 9.2 | 9.7 | 4.0 | 3.0 | 4.2 | 4.1 | 15.9 |
| 11 | 10.0 | 9.9 | 9.7 | 9.0 | 3.6 | 3.3 | 3.5 | 4.4 | 16.1 |
| 12 | 9.1 | 9.5 | 10.0 | 9.8 | 3.3 | 3.1 | 3.1 | 2.7 | 16.7 |
| Ref. Ex. | −0.5 | −3.7 | −3.4 | −4.3 |  |  |  | ~0 | 14.5 |

Example 18

Using a target having a composition $Fe_{90-x}Ru_xZr_{10}$ (x=1.5, 3.0 or 4.5 atomic percent), radio frequency sputtering was carried out to form Fe—Ru—Zr—N amorphous thin films, which were heat-treated at 550° C. for 1 hour to produce various Fe—Ru—Zr—N soft magnetic thin films. The relation between the $N_2$ content in the sputtering gas atmosphere at the time of the formation of the abovementioned amorphous thin films and the saturation magnetostriction λs of produced soft magnetic thin films is shown in FIG. 28.

Example 19

Using a target having a composition $Fe_{92.6-x}X_xZr_{7.4}$ (X=Co, Cr or Ru), radio frequency sputtering was carried out to produce Fe—X—Zr—N amorphous thin films, which were then heat-treated to produce an Fe—X—Zr—N soft magnetic thin films. The relation between the amounts x of the element X contained in the soft magnetic thin films and the saturation magnetostriction λs of the soft magnetic thin films is shown in FIG. 29.

Figure 29:
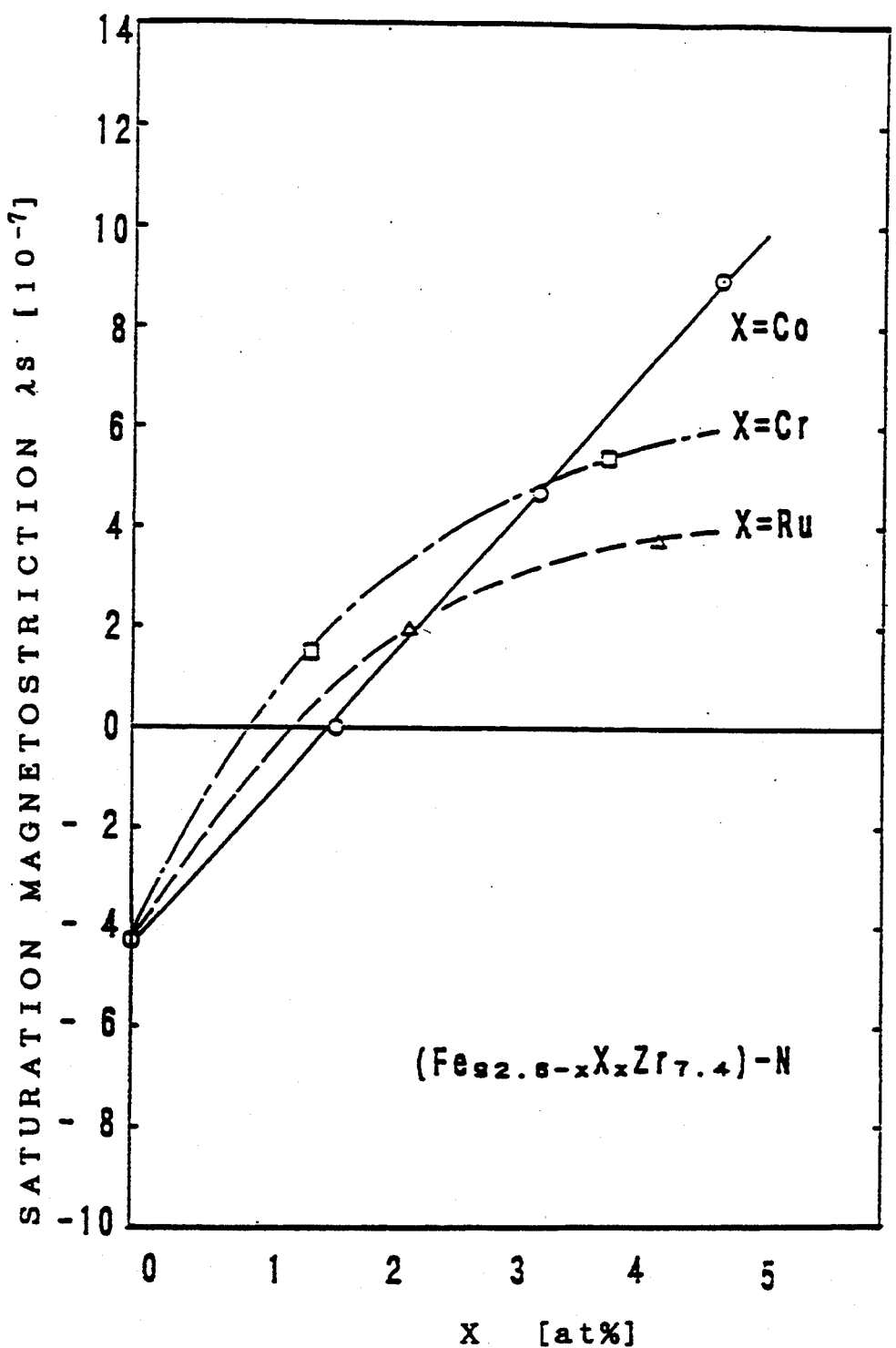
FIG. 29 is a graph showing the relation between the amount proportion x of the element X contained in the produced soft magnetic thin film and saturation magnetostriction λs of the soft magnetic thin film.

From FIG. 29, the following becomes apparent. The soft magnetic thin film free of Co, Cr or Ru, has a negative value of saturation magnetostriction λs, which is equal to $-4\times10^{-7}$. If, however, part of Fe is progressively replaced by one of Co, Cr or Ru, the saturation magnetostriction is changed into progressively increased positive values. Thus the soft magnetic thin film having the desirable saturation magnetostriction having an absolute value of $9\times10^{-7}$ or less, preferably $6\times10^{-7}$ and more preferably $2\times10^{-7}$ to 0, may be obtained by replacing part of Fe by corresponding specific amounts Co, Cr or Ru.

Example 20

Figure 30:
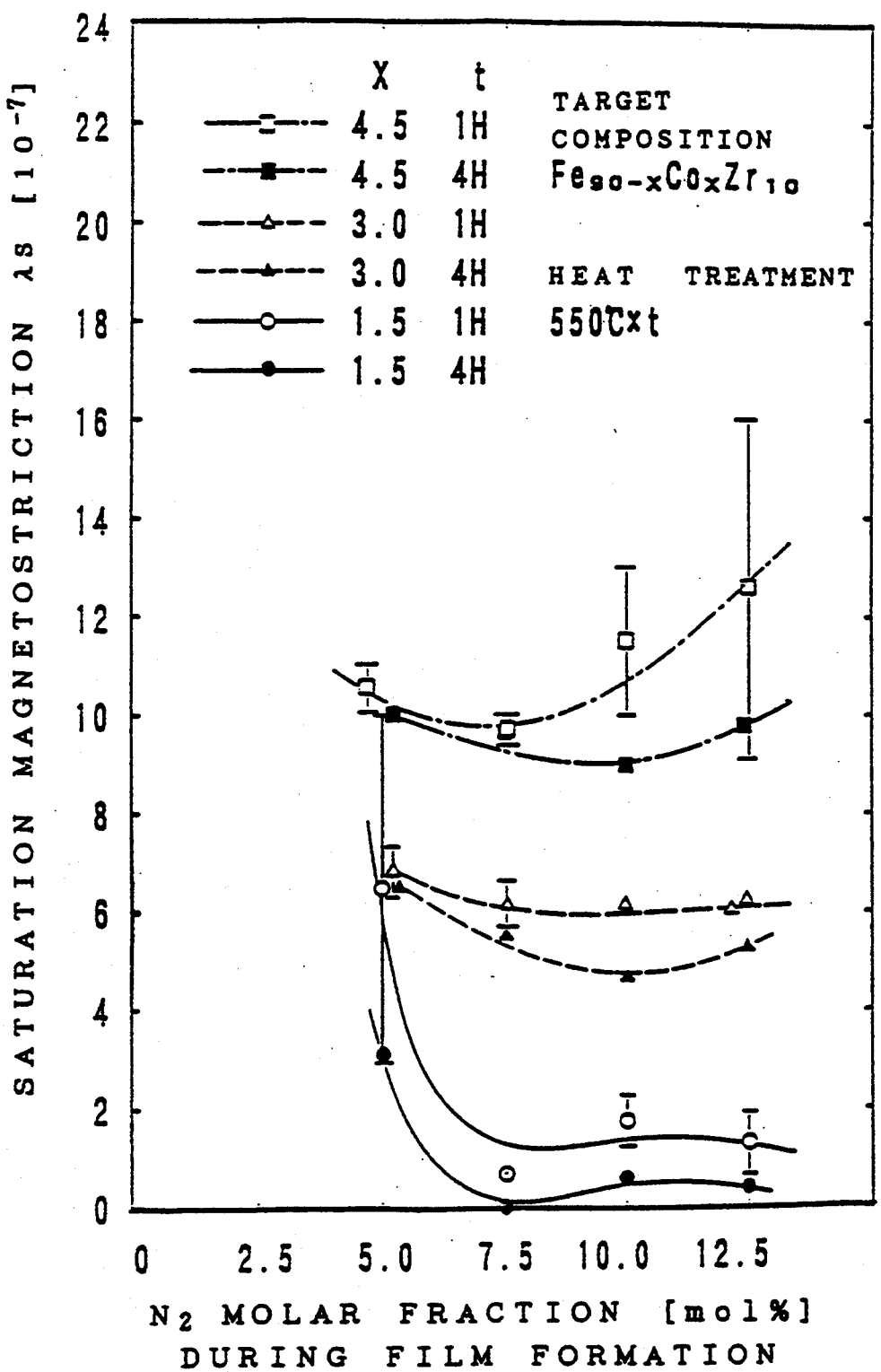
FIG. 30 is a graph showing the relation between the amount proportion of $N_2$ in the sputtering gas atmosphere during formation of the amorphous thin film and saturation magnetostriction $\lambda s$ of the produced soft magnetic thin film.

Using a target having a composition $Fe_{90-x}Co_xZr_{10}$ (x=1.5, 3.0 or 4.5 atomic percent), radio frequency sputtering was carried out to form Fe—Co—Zr—N amorphous thin films, which were then heat-treated at 550° C. for 1 to 4 hours to produce Fe—Co—Zr—N soft magnetic thin films. FIG. 30 shows the relation between the amount of $N_2$ in the sputtering gas atmosphere at the time of formation of the amorphous thin films and the saturation magnetostriction λs of the produced soft magnetic thin films.

Example 21

Figure 31:
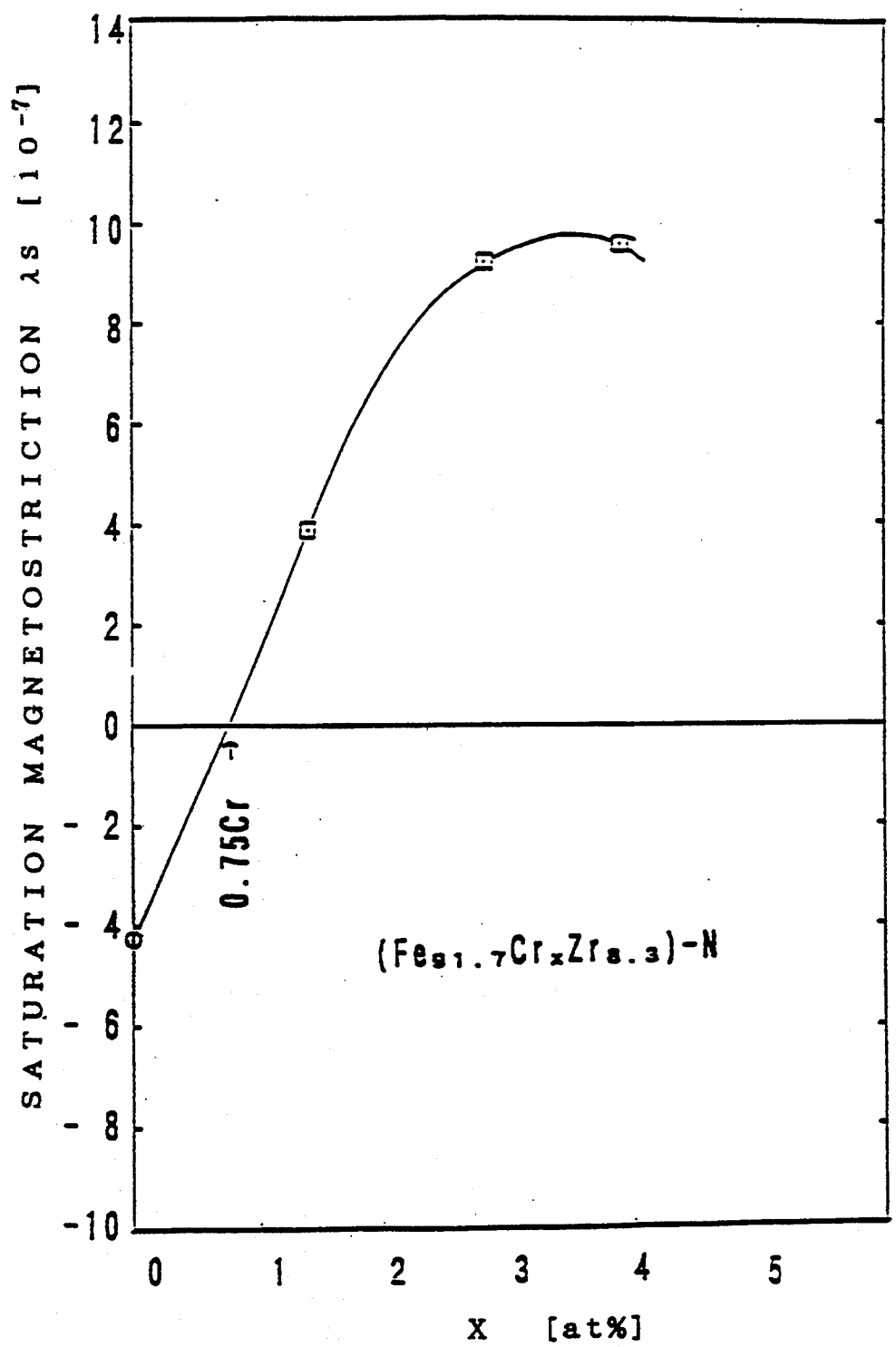
FIG. 31 is a graph showing the relation between the content proportion x of Cr in the produced soft magnetic thin film and saturation magnetostriction $\lambda s$ of the soft magnetic thin film.

Fe—X—Zr—N amorphous thin films were produced by radio frequency sputtering in a 10% $N_2$—Ar atmosphere, using a target of $Fe_{90-x}Cr_xZr_{10}$ (x=1.5, 3.0 or 4.5 atomic percent), and heat-treated at 550° C. for 4 hours to produce Fe—X—Zr—N soft magnetic thin films. The relation between the content x of the element X in the soft magnetic thin film and the saturation magnetostriction λs of the produced soft magnetic thin films is shown in FIG. 31. The values of the analytic magnetic field Hk and the electric resistivity ρ, are shown in Table 12.

From FIG. 31 and Table 12, the following is apparent. Even if Cr is contained up to x=4, saturation magnetostriction is not more than −6 powers of 10, such that satisfactory soft magnetic characteristics are displayed (Above all, optimum soft magnetic characteristics are displayed for x=0.75 at which saturation magnetostriction becomes zero). On the other hand, by addition of Cr, the electrical resistivity is approximately 100 μohm cm, which is higher than that of Sendust alloys thus enabling reduction of eddy current losses at higher frequencies. This is probably due to the amount of N being higher than that of the alloy not admixed with Cr.

TABLE 12

| Example 6 | Target composition Cr at % | Saturation magnetostriction λs [× 10⁻⁷] | Hk Oe | ρ μΩ cm | Composition Fe | Cr | Zr | N | N/Zr |
|---|---|---|---|---|---|---|---|---|---|
| No. 1 | 1.5 | +3.9 | 5.5 | 66.4 | 75.9 | 1.1 | 6.8 | 16.2 | 2.38 |
| 2 | 3.0 | +9.3 | 6.9 | 97.9 | 73.8 | 2.2 | 6.9 | 17.1 | 2.47 |
| 3 | 4.5 | +9.6 | 5.8 | 94.3 | 72.1 | 3.2 | 7.0 | 17.7 | 2.55 |
| Reference | 0 | −4.3 | 1.6 | 49.4 | 83.3 | 0 | 7.2 | 9.5 | 1.32 |

With the above described Examples of the present invention, soft magnetic thin films containing N in excess of invention, soft magnetic thin films containing N in excess of 10 atomic percent (or even 15 atomic percent) were obtained.

Example 22

Fe—M—Zr—N amorphous thin films (M=V, Cr, Mn, Co or Ni) were formed by radio-frequency sputtering in a 10% $N_2$—Ar atmosphere, using an Fe—M—Zr (M=Cr, Co) or an $Fe_{90}Zr_{10}$ target carrying small pieces of V, Mn or Ni thereon, and were heat-treated in the magnetic field at 550° C. for 4 hours to produce Fe—M—Zr—N soft magnetic thin films (M=V, Cr, Mn, Co or Ni).

FIGS. 32 to 36 show the saturation magnetic flux density Bs, saturation magnetostriction λs, anisotropic magnetic field Hk, electric resistivity ρ and N/Zr ratio in terms of the atomic percent, respectively. In each of these figures, the abscissa stands for the percentages m (atomic percents) of the elements M, that is V, Cr, Mn, Co or Ni, relative to Fe, M and Zr in the produced soft magnetic thin film. Table 13 shows the values of the analytic composition of these films, saturation magnetostriction, Bs, Hk, Hc and ρ.

frequencies to be reduced. On the other hand, the electrical resistivity was not increased significantly by adding about 5% of Co and Ni.

Figure 36:
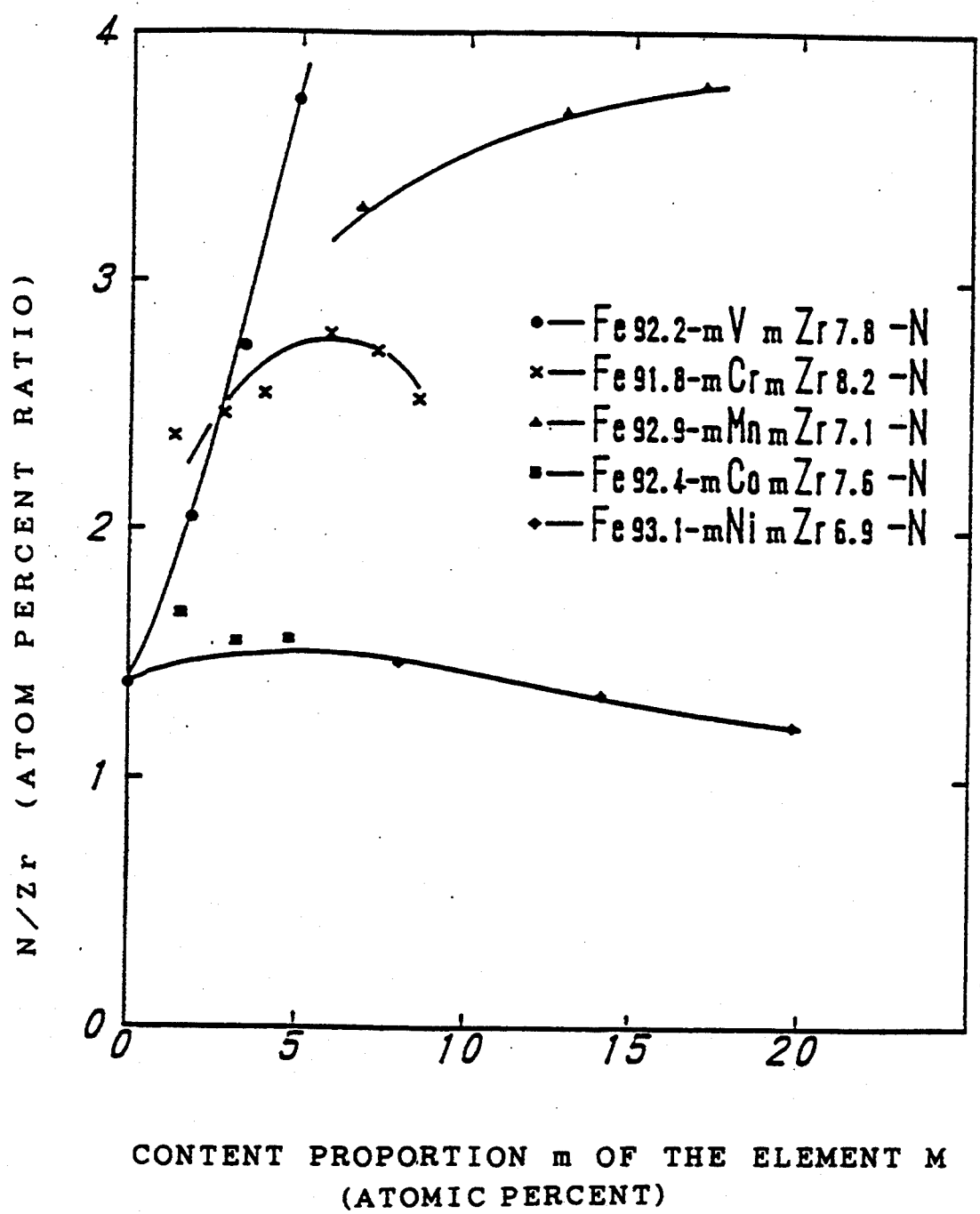
FIG. 36 is a graph showing the relation between the content proportion m of the element M in the soft magnetic thin film of the present invention and the ratio N/Zr.

FIG. 36 shows the relation between the proportion m of the element M and the N/Zr ratio. It may be seen from FIG. 36 that, V, Cr or Mn exhibit strong affinity with N as compared with Co and Ni. That is, if may be contemplated that, if V, Cr or Mn exists in the produced soft magnetic film, more N can exist than if Co or Ni exists.

TABLE 13

THE COMPOSITION AND MAGNETIC PROPERTIES OF Fe—M—Zr—N TYPE THIN FILM
(550° C. × 4H HEAT TREATMENT IN MAGNETIC FIELD)

| | | Target composition | | Magnetostriction $10^{-7}$ | Bs kG | Hk Oe | Hc Oe | ρ μΩcm | Composition | | | | Content proportion in all metal element | | | |
|---|---|---|---|---|---|---|---|---|---|---|---|---|---|---|---|---|
| | | M type | m % | | | | | | Fe | M | Zr | N | Fe | M | Zr | N/Zr |
| Ex. 7 | No. 1 | V | 9t | +0.9 | 15.48 | 3.2 | 0.86 | 62.7 | 77.7 | 1.5 | 6.8 | 14.0 | 90.3 | 1.8 | 7.9 | 2.05 |
| | No. 2 | V | 17t | +9.7 | 14.70 | 5.1 | 0.95 | 89.4 | 73.3 | 2.7 | 6.4 | 17.6 | 88.9 | 3.3 | 7.8 | 2.74 |
| | No. 3 | V | 25t | 13.4 | 13.89 | 6.5 | 1.03 | 109.1 | 67.6 | 3.8 | 6.0 | 22.6 | 87.3 | 4.9 | 7.8 | 3.73 |
| | No. 4 | Cr | 1.5 | +3.9 | 15.60 | 5.5 | 1.13 | 60 | 75.9 | 1.1 | 6.8 | 16.2 | 90.6 | 1.3 | 8.1 | 2.38 |
| | No. 5 | Cr | 3.0 | +9.3 | 14.51 | 6.9 | 1.21 | 88 | 73.8 | 2.2 | 6.9 | 17.1 | 89.0 | 2.7 | 8.3 | 2.47 |
| | No. 6 | Cr | 4.5 | +9.6 | 14.29 | 5.8 | 1.09 | 84 | 72.1 | 3.2 | 7.0 | 17.7 | 87.7 | 3.9 | 8.5 | 2.55 |
| | No. 7 | Cr | 6.0 | 13.6 | 13.66 | 6.2 | 1.14 | 118.2 | 70.3 | 4.8 | 6.6 | 18.3 | 86.0 | 5.9 | 8.0 | 2.79 |
| | No. 8 | Cr | 7.5 | 11.3 | 13.59 | 5.1 | 1.14 | 108.2 | 69.5 | 6.0 | 6.6 | 17.9 | 84.7 | 7.3 | 8.0 | 2.72 |
| | No. 9 | Cr | 9.0 | 9.8 | 13.16 | 4.5 | 1.14 | 108.7 | 68.9 | 7.0 | 6.8 | 17.3 | 83.3 | 8.5 | 8.2 | 2.53 |
| | No. 10 | Mn | 9t | 10.7 | 13.28 | 6.5 | 1.75 | 115.9 | 68.8 | 5.4 | 6.0 | 19.8 | 85.7 | 6.8 | 7.5 | 3.30 |
| | No. 11 | Mn | 17t | 12.6 | 11.62 | 5.3 | 1.55 | 139.5 | 63.5 | 10.2 | 5.6 | 20.7 | 80.0 | 12.9 | 7.1 | 3.68 |
| | No. 12 | Mn | 25t | +8.6 | 11.15 | 4.5 | 1.47 | 136.1 | 60.6 | 13.6 | 5.4 | 20.4 | 76.2 | 17.1 | 6.8 | 3.79 |
| | No. 13 | Co | 1.5 | +0.6 | 15.85 | 2.1 | 1.07 | 46 | 81.0 | 1.4 | 6.6 | 11.0 | 91.1 | 1.5 | 7.4 | 1.66 |
| | No. 14 | Co | 3.0 | +4.7 | 16.06 | 4.1 | 1.19 | 47 | 79.9 | 2.8 | 6.8 | 10.5 | 89.3 | 3.1 | 7.6 | 1.55 |
| | No. 15 | Co | 4.5 | +9.0 | 16.21 | 7.1 | 1.11 | 49 | 74.7 | 4.0 | 6.5 | 14.8 | 87.6 | 4.7 | 7.7 | 2.27 |
| | No. 16 | Ni | 9t | 10.0 | 15.13 | 3.9 | 0.98 | 61.8 | 76.7 | 7.2 | 6.5 | 9.6 | 84.8 | 8.0 | 7.2 | 1.47 |
| | No. 17 | Ni | 17t | +8.8 | 10.22 | 4.6 | 4.58 | 84.3 | 72.4 | 12.9 | 6.3 | 8.4 | 79.1 | 14.1 | 6.9 | 1.34 |
| | No. 18 | Ni | 25t | 12.6 | 8.82 | 3.5 | 2.90 | 94.7 | 68.3 | 18.4 | 6.0 | 7.3 | 73.7 | 19.8 | 6.5 | 1.22 |
| Ref. Ex. | | | 0 | −2.5 | 16.10 | 1.3 | 1.01 | 50.6 | 83.2 | 0.0 | 7.1 | 9.7 | 92.2 | 0.0 | 7.8 | 1.38 |

Figure 32:
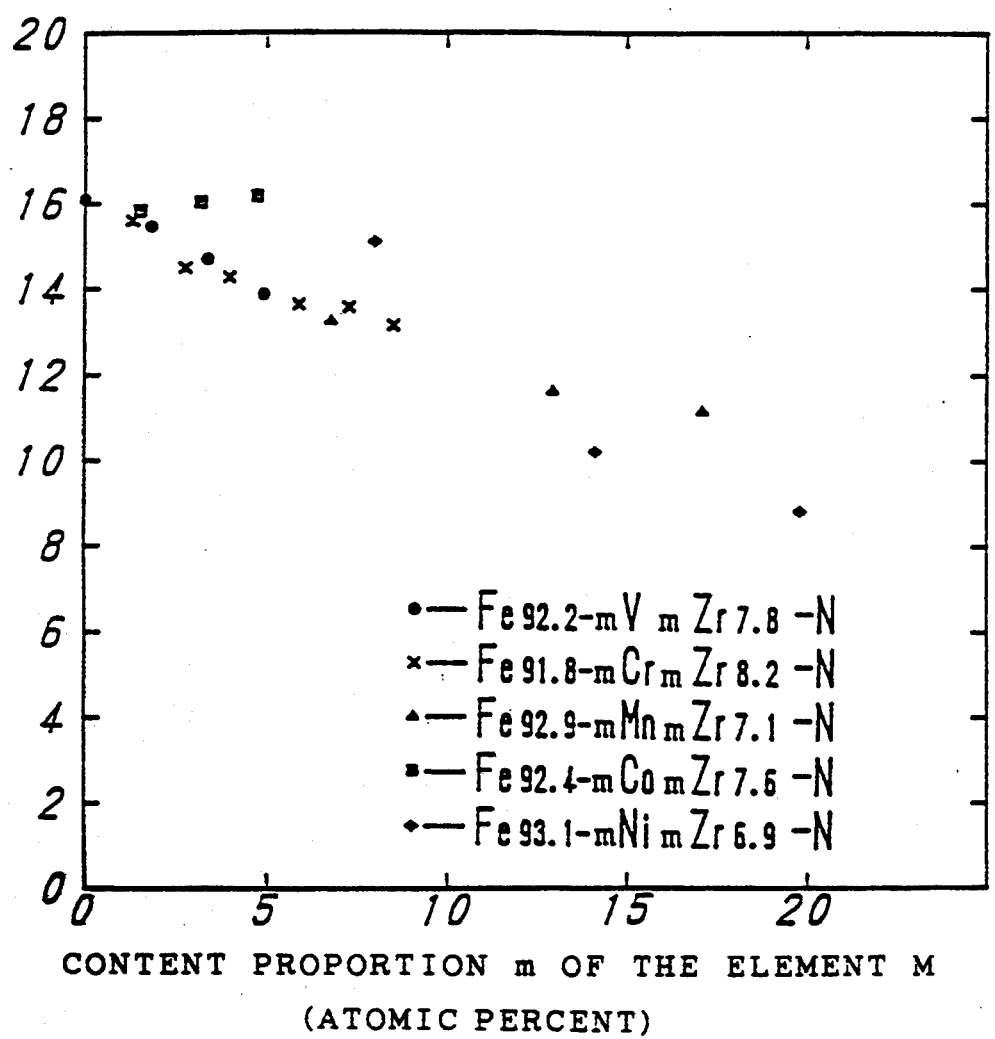
FIG. 32 is a graph showing the content proportion m (atomic percent) of the element M in the soft magnetic thin film of the present invention that is the content of M in Fe, M and Zr, hereinafter the same.

Target composition; $Fe_{90-m\%}Zr_{10}$; t designate complex target and indicate clip number M on $Fe_{90}Zr_{10}$ target FIG. 32 shows that the produced soft magnetic thin films exhibit high magnetic flux densities. Meanwhile, it is seen that, if Co is contained, in distinction from the case in which elements other than Co are contained, the saturation magnetic flux densities are increased with increase in the percentages of the element Co.

Figure 33:
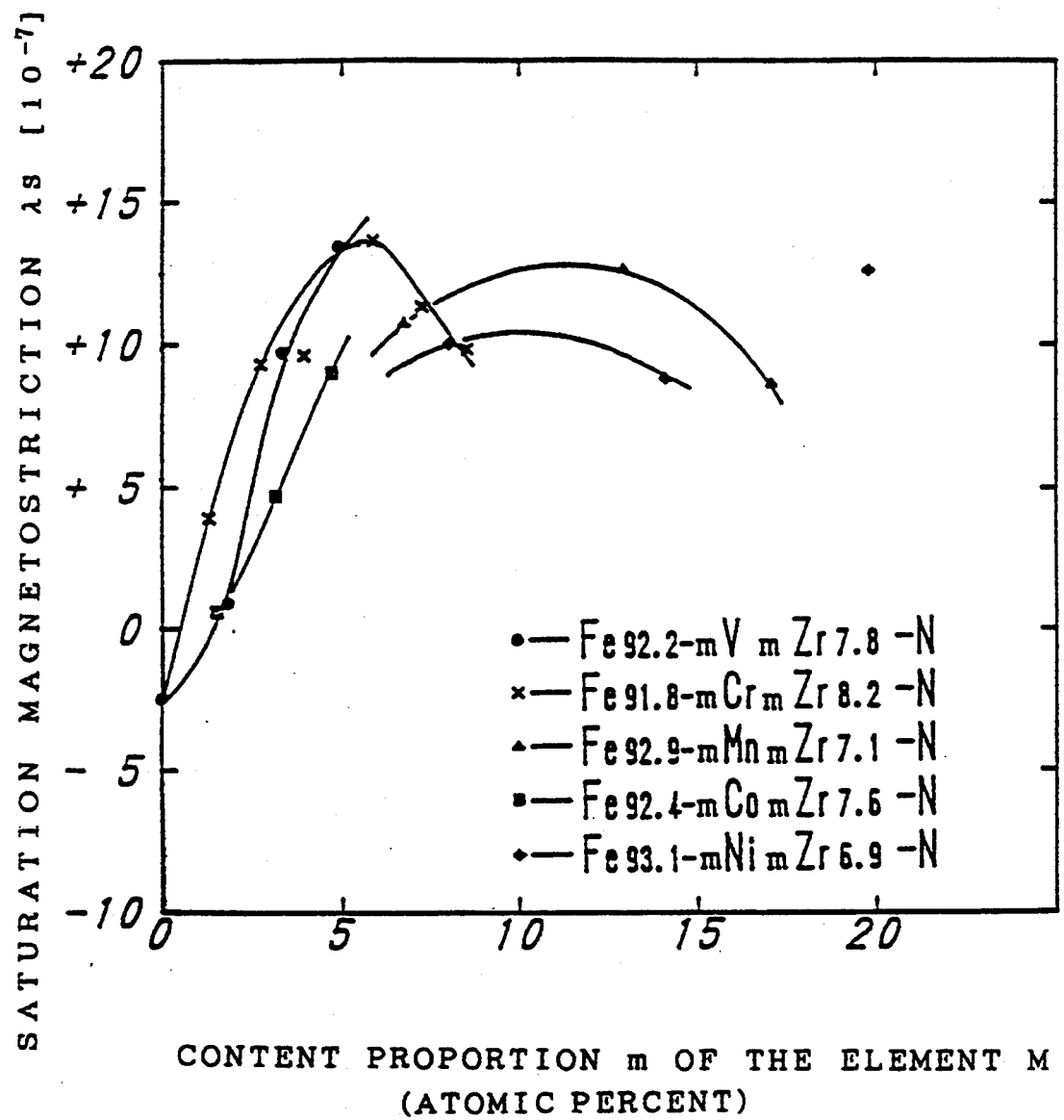
FIG. 33 is a graph showing the relation between the content proportion m of the element M in the soft magnetic thin film of the present invention and saturation magnetostriction $\lambda s$.

It may be seen from FIG. 33, saturation magnetostriction of the Fe—Zr—N soft magnetic thin film is negative ($-2.5 \times 10^{-7}$), however, it may be rendered to be zero or positive by the presence of the element M. Above all, saturation magnetostriction becomes zero for all of the elements M in a range of 0.5 to 1.5 atomic percent of m. On the other hand, even if a large amount of M is added, saturation magnetostriction is not more than about $10^{-6}$.

Figure 34:
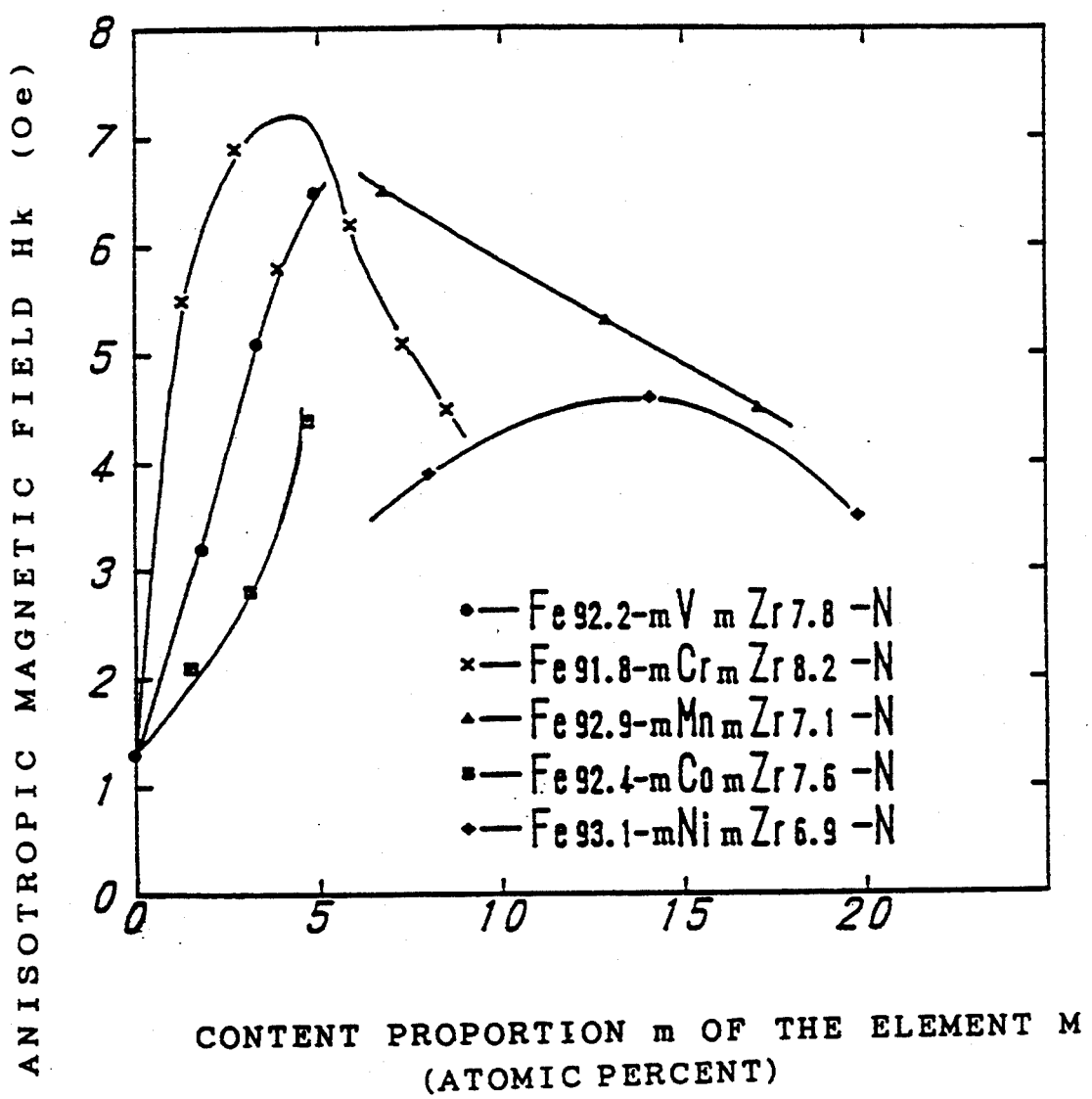
FIG. 34 is a graph showing the relation between the content proportion m of the element M in the soft magnetic thin film of the present invention and the anisotropic magnetic field Hk.

FIG. 34 shows changes in induced anisotropic magnetic field due to addition of the element M. While the uniaxial anisotropic magnetic field of an Fe—Zr—N soft magnetic thin film is 1.3 Oe, the anisotropic magnetic field may be increased, with any of the element M, by adding up to 3 atomic percent of the element M. However, in case of Cr, Mn and Ni, if these elements are added in an amount in excess of 3 atomic percent, the anisotropic magnetic field is diminished. Thus it is possible with the soft magnetic thin film of the present invention to afford induced magnetic anisotropy, high-frequency magnetic permeability may be achieved easily.

Figure 35:
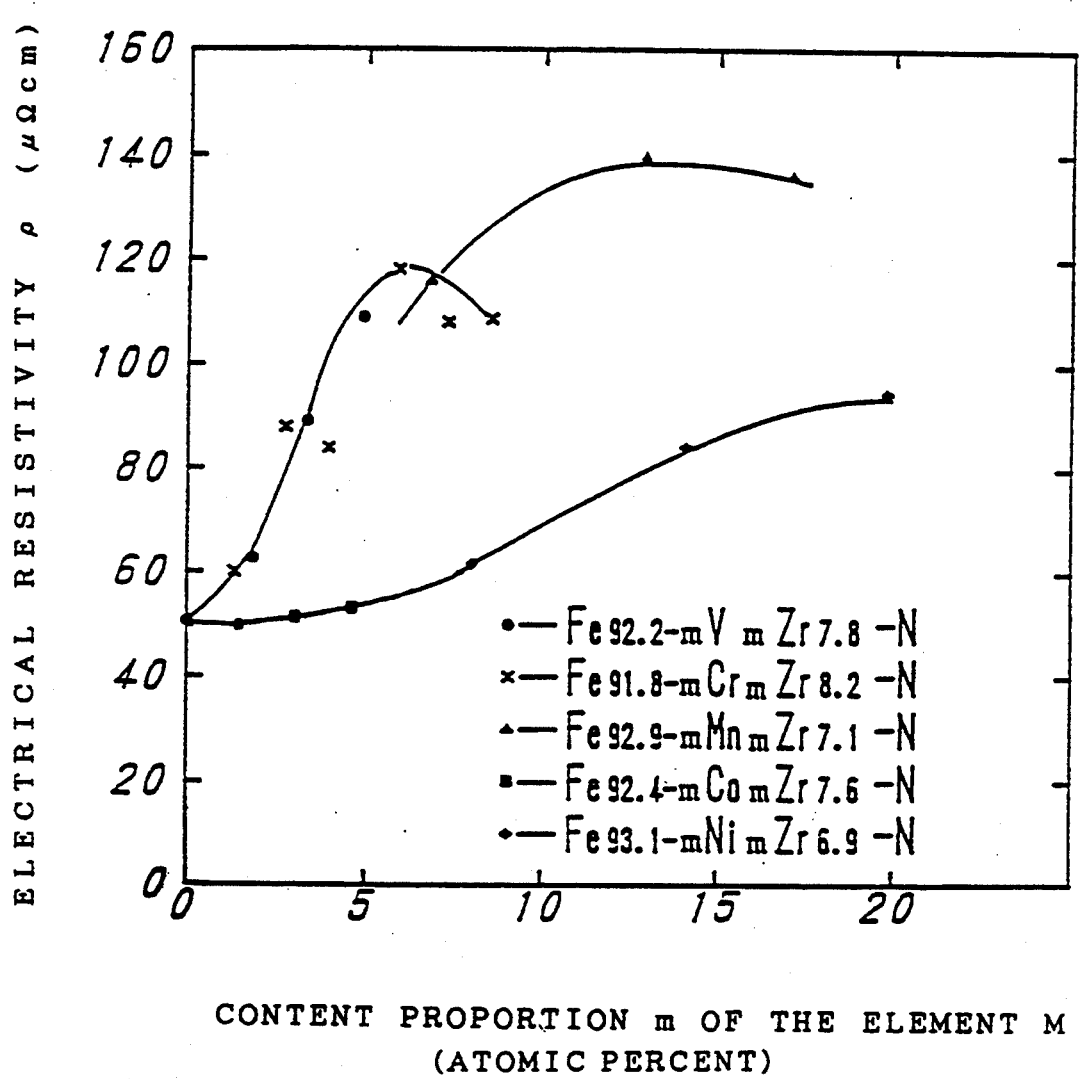
FIG. 35 is a graph showing the relation between the content proportion m of the element M in the soft magnetic thin film of the present invention and the electrical resistivity

FIG. 35 shows changes in electrical resistivity due to addition of the elements M. It was seen that, by adding about 5% of any of V, Cr or Mn, a marked increase in the electrical resistivity in excess of 100 μohm-cm could be realized. This allows eddy current losses at higher

Example 23

Using a target having a composition $Fe_{85.5}Zr_{10}Ru_{4.5}$, a 5×5 mm piece of Cr was placed on a target, and RF sputtering was carried out in an $N_2$-containing argon gas atmosphere containing 5 mol percent of Ni (electric power, 400 W). Fe—Zr—Ru—Cr—N amorphous thin films of various compositions (film thickness, about 1 μm) were produced. These amorphous thin films were heat-treated in a magnetic field at 550° C. for four hours to produce various Fe—Zr—Ru—Cr—N soft magnetic thin film of various compositions. The compositions (in atomic percent) and coercivities Hc (in Oe) along the axis of easy magnetization of the produced soft magnetic thin films are shown in Table 14.

It is seen from Table 14 that, if part of Fe is replaced by Ru, part of the remaining Fe may be replaced by 1.58 atomic percent of Cr to prevent coercivity due to prolonged heat treatment from being increased.

TABLE 14

| Example 23 | Fe at % | Zr at % | Cr at % | Ru at % | N at % | Hc [Oe] |
|---|---|---|---|---|---|---|
| No. 1 | 75.85 | 8.00 | 0.02 | 4.72 | 11.42 | 16.4 |
| No. 2 | 71.55 | 7.54 | 1.58 | 4.33 | 15.00 | 1.4 |
| No. 3 | 68.38 | 7.10 | 5.29 | 4.26 | 14.97 | 26.2 |

What is claimed is:

1. A soft magnetic thin film comprised of a single-layer structure of a substantially uniform composition represented by the compositional formula $Fe_aT_bN_c$, wherein a, b and c stand for atomic percent and T stands for at least one selected from the group consisting of Zr, Hf, Ti, Nb, Ta, V, Mo and W, and wherein the composition is in the range of $0.5 \leq b \leq 20$ and $0.5 \leq c \leq 22$ with the exclusion of the range wherein both $b \leq 7.5$ and $c \leq 5$, said soft magnetic thin film exhibiting a coercivity $H_c$ of 400 $Am^{-1}$ (5 Oe) or less.

2. A soft magnetic thin film according to claim 1, wherein the composition is within the range of $69 \leq a \leq 93$, $2 \leq b \leq 15$ and $5.5 \leq c \leq 22$.

3. A soft magnetic thin film according to claim 1, wherein the composition is within the range defined by a line interconnecting points P (91, 2, 7), Q (92.5, 2, 5.5), R (87, 7.5, 5.5), S (73, 12, 15), m (69, 12, 19), U (69, 9, 22) and V (76, 5, 19) in a ternary composition coordinate system (Fe, T, N).

4. A soft magnetic thin film according to any one of claims 1 to 3 wherein the crystal grain size is 30 nm or less.

5. A soft magnetic thin film according to claim 1, wherein T and N are present in a ratio c/b of 1.63 to 2.33.

6. A soft magnetic thin film according to claim 5, which has a coercivity Hc of 120 $Am^{-1}$ (1.5 Oe) or less.

7. A soft magnetic thin film according to claim 5, which has a coercivity Hc of 80 $Am^{-1}$ (1 Oe) or less.

8. A soft magnetic thin film according to claim 5, which has a magnetostriction $\lambda s$ of substantially zero.

9. A soft magnetic thin film according to claim 1 wherein the composition is within the range defined by a line connecting points W (88, 3.6, 8.4), X (88, 4.56, 7.44), Y (77, 8.74, 14.26) and Z (77, 6.9, 16.1) in a ternary composition coordinate system (Fe, T, N).

10. An amorphous alloy thin film comprised of a single-layer structure of a substantially uniform composition represented by the compositional formula $Fe_aT_bN_c$, wherein a, b and c stand for atomic percent and T stands for at least one selected from the group consisting of Zr, Hf, Ti, Nb, Ta, V, Mo and W, and wherein the composition is in the range of $0.5 \leq b \leq 20$ and $0.5 \leq c \leq 22$ with the exclusion of the range wherein both $b \leq 7.5$ and $c \leq 5$, said thin film exhibiting a coercivity $H_c$ of 400 $Am^{-1}$ (5 Oe) or less.

11. An amorphous alloy thin film according to claim 10 wherein the composition is within the range of $69 \leq a \leq 93$, $2 \leq b \leq 15$ and $5.5 \leq c \leq 22$.

12. An amorphous alloy thin film according to claim 10, wherein the composition is within the range defined by a line interconnecting points P (91, 2, 7), Q (92.5, 2, 5.5), R (87, 7.5, 5.5), S (73, 12, 15), T (69, 12, 19), U (69, 9, 22) and V (76, 5, 19) in a ternary composition coordinate system (Fe, T, N).

13. A amorphous alloy thin film according to claim 10, wherein said T and nitrogen (N) are present in a ratio c/b of 1.63 to 2.33.

* * * * *